US012353409B2

United States Patent
Rennie et al.

(10) Patent No.: US 12,353,409 B2
(45) Date of Patent: Jul. 8, 2025

(54) METHODS AND SYSTEMS FOR IMPROVED DOCUMENT PROCESSING AND INFORMATION RETRIEVAL

(71) Applicant: Pryon Incorporated, Raleigh, NC (US)

(72) Inventors: Steven John Rennie, Yorktown Heights, NY (US); Marie Wenzel Meteer, Arlington, MA (US); David Nahamoo, Great Neck, NY (US); Dominique O'donnell, Portland, OR (US); Vaibhava Goel, Chappaqua, NY (US); Etienne Marcheret, White Plains, NY (US); Chul Sung, Fort Lee, NJ (US); Igor Roditis Jablokov, Raleigh, NC (US); Soonthorn Ativanichayaphong, New York, NY (US); Ajinkya Jitendra Zadbuke, Cambridge, MA (US); Carmi Rothberg, New York, NY (US); Ellen Eide Kislal, Leawood, KS (US)

(73) Assignee: Pryon Incorporated, Raleigh, NC (US)

( * ) Notice: Subject to any disclaimer, the term of this patent is extended or adjusted under 35 U.S.C. 154(b) by 0 days.

(21) Appl. No.: 18/640,448

(22) Filed: Apr. 19, 2024

(65) Prior Publication Data

US 2024/0265041 A1 Aug. 8, 2024

Related U.S. Application Data

(63) Continuation of application No. PCT/US2023/027320, filed on Jul. 11, 2023.
(Continued)

(51) Int. Cl.
*G06F 17/00* (2019.01)
*G06F 16/2452* (2019.01)
(Continued)

(52) U.S. Cl.
CPC ...... *G06F 16/24522* (2019.01); *G06F 16/248* (2019.01); *G06F 16/3329* (2019.01);
(Continued)

(58) Field of Classification Search
CPC .......... G06F 16/3329; G06F 16/24522; G06F 16/248; G06F 16/93; G06F 16/90332;
(Continued)

(56) References Cited

U.S. PATENT DOCUMENTS 7,254,545 B2 *   8/2007   Falcon .................. G10L 15/193
                                                                704/275
8,024,338 B2 *   9/2011   Brei .................... G06F 16/3323
                                                                707/759
(Continued)

FOREIGN PATENT DOCUMENTS

CN    111897937 A    11/2020
CN    112199254 A     1/2021
(Continued)

OTHER PUBLICATIONS

Tianwei Xing et al., DeepSQA: Understanding Sensor Data via Question Answering. In Proceedings of the International Conference on Internet-of-Things Design and Implementation. Association for Computing Machinery, 106-118. <https://doi.org/10.1145/3450268.3453529>, May 2021.*
(Continued)

*Primary Examiner* — Greta L Robinson
(74) *Attorney, Agent, or Firm* — Occhiuti & Rohlicek LLP

(57) ABSTRACT

Disclosed are methods, systems, devices, apparatus, media, and other implementations that include a method for document processing (particularly for training of a machine learning question answering platform, and for ingestion of documents). The method includes obtaining a question data-
(Continued)

set (e.g., either from public or private repositories of questions) comprising one or more source questions for document processing by a machine learning question-and-answer system that provides answer data in response to question data submitted by a user, modifying a source question from the question dataset to generate one or more augmented questions with equivalent semantic meanings as that of the source question, and processing a document with the one or more augmented questions.

19 Claims, 9 Drawing Sheets

Related U.S. Application Data

(60) Provisional application No. 63/423,527, filed on Nov. 8, 2022, provisional application No. 63/388,046, filed on Jul. 11, 2022.

(51) Int. Cl.
*G06F 16/248* (2019.01)
*G06F 16/3329* (2025.01)
*G06F 40/30* (2020.01)
*G06N 5/04* (2023.01)
*G06N 20/00* (2019.01)
*G06V 30/414* (2022.01)

(52) U.S. Cl.
CPC ............ *G06F 40/30* (2020.01); *G06N 5/04* (2013.01); *G06N 20/00* (2019.01); *G06V 30/414* (2022.01)

(58) Field of Classification Search
CPC .......... G06F 40/30; G06F 40/35; G06N 5/04; G06N 20/00; G06N 5/046; G06N 5/022; G06N 3/0464; G06N 3/09; G06V 30/414
See application file for complete search history.

(56) References Cited

U.S. PATENT DOCUMENTS

| | | | |
|---|---|---|---|
| 8,478,780 B2 * | 7/2013 | Cooper | G06F 16/3344 707/771 |
| 11,010,284 B1 | 5/2021 | Santiago et al. | |
| 11,080,336 B2 | 8/2021 | Van Dusen | |
| 11,561,987 B1 | 1/2023 | Sager et al. | |
| 2007/0150458 A1 | 6/2007 | Chung et al. | |
| 2007/0288439 A1 | 12/2007 | Rappaport et al. | |
| 2008/0270380 A1 | 10/2008 | Ohrn et al. | |
| 2011/0196852 A1 | 8/2011 | Srikanth et al. | |
| 2012/0078873 A1 | 3/2012 | Ferrucci et al. | |
| 2014/0304250 A1 | 10/2014 | Sankar et al. | |
| 2015/0178853 A1 | 6/2015 | Byron et al. | |
| 2016/0364377 A1 | 12/2016 | Krishnamurthy | |
| 2017/0024465 A1 | 1/2017 | Yeh et al. | |
| 2017/0060990 A1 | 3/2017 | Brown et al. | |
| 2017/0308531 A1 | 10/2017 | Ma et al. | |
| 2017/0344640 A1 | 11/2017 | Goldstein et al. | |
| 2018/0046764 A1 | 2/2018 | Katwala et al. | |
| 2018/0143975 A1 | 5/2018 | Casal et al. | |
| 2018/0189630 A1 | 7/2018 | Boguraev et al. | |
| 2018/0232376 A1 | 8/2018 | Zhu et al. | |
| 2018/0260738 A1 | 9/2018 | Gabbai et al. | |
| 2019/0042988 A1 | 2/2019 | Brown et al. | |
| 2020/0257679 A1 | 8/2020 | Sheinin et al. | |
| 2021/0022688 A1 | 1/2021 | Lee et al. | |
| 2021/0097405 A1 | 4/2021 | McNeil et al. | |
| 2021/0157975 A1 | 5/2021 | Gelosi | |
| 2021/0287141 A1 | 9/2021 | Molloy et al. | |
| 2021/0319066 A1 | 10/2021 | Boxwell et al. | |
| 2021/0365481 A1 | 11/2021 | Chen | |
| 2021/0397609 A1 | 12/2021 | Yurtsev et al. | |
| 2021/0406264 A1 * | 12/2021 | Nahamoo | G06F 16/3349 |
| 2021/0406735 A1 | 12/2021 | Nahamoo et al. | |
| 2024/0135291 A1 | 4/2024 | Steenstra et al. | |
| 2024/0154941 A1 | 5/2024 | Nagpal et al. | |

FOREIGN PATENT DOCUMENTS

| | | |
|---|---|---|
| CN | 114090760 A | 2/2022 |
| KR | 100347799 B1 | 8/2002 |
| KR | 10-2019-0079805 A | 7/2019 |
| KR | 10-2019-0118744 A | 10/2019 |
| KR | 10-2022-0083450 A | 6/2022 |
| WO | 88/10470 A1 | 12/1988 |

OTHER PUBLICATIONS

International Search Report and Written Opinion, PCT Application No. PCT/US2023/027230, mailed Nov. 20, 2023 (10 pages).

* cited by examiner

METHODS AND SYSTEMS FOR IMPROVED DOCUMENT PROCESSING AND INFORMATION RETRIEVAL

CROSS REFERENCE TO RELATED APPLICATIONS

This application is a continuation of international application PCT/US2023/027320, filed on Jul. 11, 2023, which claims priority to U.S. Provisional Application No. 63/388,046, filed Jul. 11, 2022, and to U.S. Provisional Application No. 63/423,527, filed Nov. 8, 2022. The contents of each of these application are incorporated herein by reference in their entireties.

BACKGROUND

This invention relates to question-answer systems to generate responses to queries submitted by a user, and in particular to approaches to achieve improved training and ingestion of machine learning Q-A systems, and improved question/query processing.

Computer users often have access to vast amounts of data, whether accessible through public networks (such as the Internet) or private networks, that the users can a search to find answers and information to specific or general queries about some topic or issue. For example, organizations often collect large number of documents that constitute a repository of information, be it administrative of technical information, that the organization's employees may access and perform searches on. For instance, a corporation may have a large library of human resource documents, which together define, in a hopefully consistent manner, the HR policies and procedures of the corporation. A user, such as a corporate employee, can search the collection of documents to answer a question, such as "how much vacation time am I entitled to?"

Depending on the level of specificity of a submitted query, the question-answer system may produce a large number of search results. The user might then be presented with an unwieldly large number of possible answers whose actual relevance and responsiveness to the submitted query can only be ascertained by reading through the answers, whether by reading short snippets or summaries presented on a search result user interface, or accessing an identified document associated with a result.

SUMMARY

The present disclosure is directed to a machine-learning question-answering ("Q-A") platform with improved document processing and information retrieval operations achieved by improved intake processing (ingestion) of user data and by improved training processes of machine learning information retrieval models used by the Q-A platform. Several techniques relating to various aspects training the Q-A platform and to ingestion of source documents are presented herein. The proposed Q-A training and document ingestion approaches seek to improve the quality of searching operations during runtime (search-time). The various techniques and implementations described herein include: i) approaches for modifying training questions to expand overly-terse training questions, and conversely to simplify overly-formed (overly specific) training questions, ii) approaches for tagging contextual information (discovered or extracted) to source content to allow improved content filtering and matching during search-time, iii) approaches for cleansing and normalizing source content so as to exclude semantically unimportant content parts, or to associate them with search weights that would down-weight matching scores, and iv) approaches for adjusting training-time and search-time operations of the Q-A platform based on availability of computing resources.

Advantageously, the proposed approaches and solutions described herein improve searching performance by producing better quality searchable content (through contextual information tagging, and through cleansing and normalization operations), and by more optimally training the Q-A platform to achieve improved performance.

Thus, in certain variations, a first method is provided that includes obtaining a question dataset comprising one or more source questions for document processing by a machine learning question-and-answer system that provides answer data in response to question data submitted by a user, modifying a source question from the question dataset to generate one or more augmented questions with equivalent semantic meanings as that of the source question, and processing a document with the one or more augmented questions.

Embodiments of the first method may include at least some of the features described in the present disclosure, including one or more of the following features.

The first method may further include adding the one or more augmented questions to an augmented question dataset.

Processing the document with the one or more augmented questions may include one or more of, for example, training the machine learning question-and-answer system using the document and the one or more augmented questions, and/or ingesting the document with the one or more augmented questions, subsequent to completion of the training of the machine learning question-and-answer system, to generate an ingested document that is searchable by the machine learning question-and-answer system.

The first method may further include analyzing the source question to determine specificity level for the source question.

Analyzing the source question may include one or more of, for example determining a word count for the source question, determining intent associated with the source question, and/or classifying the source question using a machine-learning question specificity model.

Analyzing the source question may include determining the source question is one of overly verbose or overly terse based on a comparison of the determined specificity level to one or more specificity threshold values.

Modifying the source question may include simplifying the source question, in response to a determination that the source question is overly verbose, to exclude one or more semantic elements of the source question to generate a terse question with an equivalent semantic meaning to the source question.

Simplifying the source question may include excluding the one or more semantic elements of the source question according to one or more of, for example, a term-weighing scheme to assign values for words appearing in the source question, and/or one or more natural language processing (NPL) rules applied to the source question.

The term-weighing scheme may include a term frequency-inverse document frequency (TF-IDF) scheme. Simplifying the source question may include computing weight values for the words appearing in the source question according to the (TF-IDF) scheme, and removing one or more of the words appearing in the source question based on the computed weight values, and subject to the NPL rules.

The source question includes unstructured keywords, and modifying the source question may include expanding the source question, in response to a determination that the source question is overly terse, to include structural components for the unstructured keywords.

Expanding the source question may include determining a statement of intent and/or other contextual information associated with the keywords of the source question, and adding to the source question semantic structural components determined based on the statement of intent and/or other contextual information.

Modifying the source question may include generating a question variant message comprising the source question and one or more required output characteristics for a resultant augmented question paraphrasing of the first query, and providing the question variant message to a generative large language model system configured to generate a resultant augmented question based on the source question and the one or more required output characteristics.

The first method may further include iteratively modifying the one or more augmented questions to generate additional sets of augmented questions with similar semantic meanings as that of a preceding set of augmented questions.

In some variations, a first question-and-answer (Q-A) system is provided that includes one or more memory storage devices to store one or more documents, and a processor-based controller communicatively coupled to the one or more memory storage devices. The controller is configured to obtain a question dataset comprising one or more source questions for document processing by a machine learning question-and-answer system that provides answer data in response to question data submitted by a user, modify a source question from the question dataset to generate one or more augmented questions with equivalent semantic meanings as that of the source question, and process a document with the one or more augmented questions.

In some variations, a first non-transitory computer readable media is provided that is programmed with instructions, executable on one or more processors of a computing system, to obtain a question dataset comprising one or more source questions for document processing by a machine learning question-and-answer system that provides answer data in response to question data submitted by a user, modify a source question from the question dataset to generate one or more augmented questions with equivalent semantic meanings as that of the source question, and process a document with the one or more augmented questions.

Embodiments of the first system and the first computer readable media may include at least some of the features described in the present disclosure, including at least some of the features described above in relation to the first method.

In various examples, a second method is provided that includes determining contextual information associated with a document comprising multiple content portions, and tagging one or more of the multiple content portions with metadata elements determined based on the contextual information, with answer data from the document being identified in response to query data submitted by a user based, in part, on the metadata elements tagged to the one or more of the multiple content portions of the document.

Embodiments of the second method may include at least some of the features described in the present disclosure, including any of the features described in relation to the first method, system, and computer readable media, as well as one or more of the following features.

Determining the contextual information may include determining one or more concepts, from an ontology of concepts determined to be relevant to the document, representative of semantic meaning of a particular content portion from the one or more content portions.

Determining the one or more concepts representative of the semantic meaning of the particular content portion may include determining, for each of the one or more concepts, a concept tuple comprising a category label and a respective category label value determined from a plurality of values associated with the determined category label.

Determining the one or more concepts representative of the semantic meaning of the particular content portion may include determining intent-of-use concept associated with the particular portion, the intent-of-use concept representative a common activity or use associated with one or more of, for example, the particular content portion, or at least one of the one or more determined concepts for the particular portion.

Determining the one or more concepts may include determining the one or more concepts based on a machine learning ontology model configured to generate predicted labels, representative of the one or more concepts, in response to inputting at least part of the particular content portion to the machine learning ontology model.

Determining the contextual information may include determining one or more of, for example, document-related contextual information, and/or content-embedded contextual information included within content of the document.

The document-related contextual information may include one or more of, for example, storage-information representative of storage location of the document, and/or origin information representative of creation information of the document. The content-embedded contextual information may include one or more of, for example, tags embedded in HTML objects within the document, user-inserted non-renderable information included in the document, and/or content headings and markers.

The storage information may include a network address corresponding to source location of the document, and/or a file path for the document within a storage device. The origin information may include one or more of, for example, date of creation of the document, time of creation of the document, authorship of the document, and/or version number of the document.

Determining the contextual information associated with the document may include determining high-importance contextual information associated with one of the multiple content portions of the document, and tagging the one of the multiple portions of the document and at least one additional portion of the multiple content portion with metadata derived based on the determined high-importance contextual information.

Tagging the one or more of the multiple content portions with the metadata elements determined based on the contextual information may include one or more of, for example, including a metadata element determined for a particular content portion as a separate data structure linked to the particular content portion, and/or adding the metadata element for the particular content portion into the particular content portion to generate a resultant combined content portion, wherein identification of answer data to the query submitted in relation to the document includes determining a matching level between the query data and the resultant combined content portion comprising the content portion and the added metadata element.

The second method may further include receiving, at a time instance following the tagging, the query data submitted by the user, determining query contextual information associated with the query data submitted by the user, and determining the answer data based, in part, on matching levels of the query contextual information to the metadata elements tagged to the one or more multiple content portions of the document.

Determining the answer data may include excluding from the answer data at least one of the tagged content portions in response to a determination that the respective metadata elements of the at least one of the tagged content portions do not match at least part of the query contextual information. Determining the answer data may include computing matching scores based, in part, on closeness of the query contextual information to the respective metadata elements of the tagged one or more content portions, and ranking at least some of the tagged content portions to the query based on the respective matching scores for the tagged one or more content portions.

The metadata elements may include one or more concepts from an ontology of concepts relevant to the document. Determining the query contextual information may include determining query concepts, from the ontology of concepts determined to be relevant to the document, representative of semantic meaning associated with one or more query terms of the query data. Determining the answer data may include matching the query concepts to the one or more of the multiple content portions tagged with the metadata elements comprising the one or more concepts from the ontology.

The metadata elements may include one or more information type classifications selected from one or more information type categories. Determining the query contextual information comprises determining a question type classification representative of information type, from the one or more information types categories, the user is searching for. Determining the answer data may include matching the question type classification for the query data to information type classifications for the one or more of the multiple content portions tagged with metadata elements comprising the information type classification.

Tagging the one or more of the multiple content portions with the metadata elements determined based on the contextual information may include adding at least some of the metadata elements to respective at least some of the multiple content portions. Determining the query contextual information may include modifying the query data to include augmented query terms derived from the query contextual information. Determining the answer data may include determining matches between the modified query data and the at least some of the multiple content portions with the added respective at least some of the metadata elements.

In further examples, a second question-and-answer (Q-A) system is provided that includes one or more memory storage devices to store one or more documents, and a processor-based controller communicatively coupled to the one or more memory storage devices. The controller is configured to determine contextual information associated with a document comprising multiple content portions, and tag one or more of the multiple content portions with metadata elements determined based on the contextual information. Answer data from the document may be identified in response to query data submitted by a user based, in part, on the metadata elements tagged to the one or more of the multiple content portions of the document.

In certain variations, a second non-transitory computer readable media is provided, that is programmed with instructions, executable on one or more processors of a computing system, to determine contextual information associated with a document comprising multiple content portions, and tag one or more of the multiple content portions with metadata elements determined based on the contextual information. Answer data from the document is identified in response to query data submitted by a user based, in part, on the metadata elements tagged to the one or more of the multiple content portions of the document.

Embodiments of the second system and the second computer readable media may include at least some of the features described in the present disclosure, including at least some of the features described above in relation to the first and second methods, and the first system and the first computer-readable media.

In further variations, a third method is provided that includes receiving source content for a source document, determining required editability for at least one portion of a plurality of different portions of the source content based on one or more of, for example, relative location of the at least one portion in the source document, visual structure of the at least one portion, and/or lexical structure of the at least one portion, and generating a resultant edited source document with content derived based on at least one portion of the source content and the respective determined required editability for the at least one portion, with the resultant edited source document being provided to downstream information retrieval system processing.

Embodiments of the third method may include at least some of the features described in the present disclosure, including any of the features described in relation to the first and second methods, systems, and computer readable media, as well as one or more of the following features.

Determining required editability for the at least one portion may include determining information importance level for the at least one portion based on one or more of, for example, the relative location of the at least one portion in the source document, the visual structure of the at least one portion, and/or lexical content of the at least one portion.

Generating the resultant edited source document may include modifying the source document to produce a modified source document based on the determined information importance level for the at least one portion.

Determining the information importance level may include one or more of, for example, applying pre-determined rules to one or more of the plurality of different portions and/or applying a machine learning language model to the one or more of the plurality of different portions to derive the information importance level for the at least one portion.

The third method may further include determining a document type, from a plurality of types, associated with the source document. Applying the pre-determined rules or applying the machine learning language model may include selecting a set of pre-determined rules from a plurality of sets of pre-determined rules based on the determined document type associated with the source document, or selecting the machine learning language model from a plurality of machine learning language model based on the determined document type associated with the source document.

Generating the resultant edited source document may include computing, for the at least one portion, an information importance score, and, in response to a determination that the information importance score for the at least one portion is greater than an importance threshold value, including the at least one portion in the generated edited source document.

The third method may further include excluding the at least portion from the resultant edited source document when the computed information importance score is less than or equal to the importance threshold value.

The third method may further include deriving a search weight based on the information importance score for the at least one portion when the information importance score is greater than the importance threshold value, but less than or equal to a down-weight threshold, with the search weight associated with the at least one portion being used to compute one or more matching scores for one or more search results determined using the at least one portion in response to a query submitted by a user.

The relative location of the at least one portion may include one or more of, for example, a document table of content location, a document footer location, and/or a document bibliography location.

Determining required editability for the at least one portion may include determining semantically equivalent terms used within the source content, and generating the resultant edited source document with multiple occurrences of a uniform normalized term to replace the semantically equivalent terms.

Determining semantically equivalent terms may include identifying different instances of equivalent acronyms within the source content. Generating the resultant edited source document with the multiple occurrences of the uniform normalized term may include replacing the different instances of the equivalent acronyms with a single uniform acronym representation of the different instances of the equivalent acronyms.

Determining semantically equivalent terms may include identifying instances of different representations of a particular entity. Generating the resultant edited source document with the multiple occurrences of the uniform normalized term may include replacing the instances of different representations of the particular entity with a uniform entity representation.

In various examples, a third question-and-answer (Q-A) system is provided that includes one or more memory storage devices to store one or more documents, and a processor-based controller communicatively coupled to the one or more memory storage devices. The controller is configured to receive source content for a source document, and determine required editability for at least one portion of a plurality of different portions of the source content based on one or more of, for example, relative location of the at least one portion in the source document, visual structure of the at least one portion, and/or lexical structure of the at least one portion. The controller is further configured to generate a resultant edited source document with content derived based on at least one portion of the source content and the respective determined required editability for the at least one portion, with the resultant edited source document is provided to downstream information retrieval system processing.

In some variations, a third non-transitory computer readable media is provided, that is programmed with instructions, executable on one or more processors of a computing system, to receive source content for a source document, determine required editability for at least one portion of a plurality of different portions of the source content based on one or more of, for example, relative location of the at least one portion in the source document, visual structure of the at least one portion, and/or lexical structure of the at least one portion, and generate a resultant edited source document with content derived based on at least one portion of the source content and the respective determined required editability for the at least one portion, with the resultant edited source document being provided to downstream information retrieval system processing.

Embodiments of the third system and the third computer readable media may include at least some of the features described in the present disclosure, including at least some of the features described above in relation to the first and second methods, systems, and computer-readable media, and the third method.

In some additional variations, a fourth method is provided that includes determining available computing resources for a question-and-answer (Q-A) system configured to perform Q-A searches on stored content corresponding to one or more source documents, and dynamically adjusting operational characteristics of the Q-A system based on the determined available computing resources.

Embodiments of the fourth method may include at least some of the features described in the present disclosure, including any of the features described in relation to the first, second, and third methods, systems, and computer readable media, as well as one or more of the following features.

The Q-A system may be configured, in response to a received query, to perform a coarse Q-A search of the one or more documents according to a coarse transform representation of the query and content of the one or more documents, and to perform a subsequent fine-detail Q-A search of the one or more documents according to determined search results of the coarse Q-A search using a fine-detail transform representation of the query and content of the one or more documents. Dynamically adjusting the operational characteristics of the Q-A system may include adjusting number of determined results of the coarse Q-A search, for which the subsequent fine-detail search is to be performed, based on the determined available computing resources.

The Q-A system may be trained, in part, using a training set comprising positive training data to generate expected positive training predicted output data of the Q-A system to be within a desired set of output data, and further comprising negative training data to generate expected negative training predicted output data of the Q-A system to be outside the desired set of output data. Dynamically adjusting the operational characteristics of the Q-A system may include dynamically selecting from a pool of negative training examples an adjustable-size subset of one or more negative training examples based on one or more selection criteria.

Dynamically selecting the adjustable-sized subset may include increasing the adjustable-sized subset of the one or more negative training examples in response to an increase in an availability of the computing resources, or decreasing the adjustable-sized subset of the one or more negative training examples in response to a decrease in the availability of the computing resources.

Dynamically selecting the adjustable-size subset of the one or more negative training examples may include dynamically selecting the adjustable-size subset of the one or more negative training examples to include negative training examples determined to result in predicted output of the Q-A system that is within one or more pre-determined closeness matching levels to the desired set of output data.

Dynamically selecting the adjustable-size subset of the one or more negative training examples may include selecting from the pool of negative training examples processed by the Q-A system during a first training iteration one or more confusing negative training examples that produced predicted output, during the first training iteration, with a closeness level to the desired set of output data produced by positive examples satisfying a closeness criterion.

Dynamically selecting the adjustable-size subset of one or more negative training examples may include processing at least some negative examples from the pool of negative training examples according to a current configuration of a machine learning searching model of the Q-A system, and identifying based on output resulting from processing the at least some negative examples a pre-determined number of negative examples that produced output closest to the desired output expected to be produced using the positive examples.

Processing the at least some negative examples according to the current configuration of a machine learning searching model may include applying the machine learning searching model in its current configuration to the at least some negative examples to produce respective predicted output by the machine learning searching model.

Processing the at least some negative examples according to the current configuration of a machine learning searching model may include deriving the output based on an approximation of behavior of the machine learning searching model in its current configuration.

The fourth method may further include populating the subset of negative training examples with the identified pre-determined number of negative examples, and performing a training iteration for the machine learning searching model of the Q-A system to adjust the current configuration of the machine learning searching model into a re-trained configuration that produces, in response to the identified pre-determined number of negative examples, re-trained predicted output that is farther away from the desired output expected to be produced using the positive examples than the output produced with the current configuration of the machine learning searching model.

In additional variations, a fourth question-and-answer (Q-A) system is provided that includes one or more memory storage devices to store one or more documents and computer executable instructions and a processor-based controller communicatively coupled to the one or more memory storage devices. The controller is configured to determine available computing resources for the Q-A system, and dynamically adjust operational characteristics of the Q-A system based on the determined available computing resources.

In further variations, a fourth non-transitory computer readable media is provided, that is programmed with instructions, executable on one or more processors of a computing system, to determine available computing resources for a question-and-answer (Q-A) system configured to perform Q-A searches on stored content corresponding to one or more source documents, and dynamically adjust operational characteristics of the Q-A system based on the determined available computing resources.

Embodiments of the fourth system and the fourth computer readable media may include at least some of the features described in the present disclosure, including at least some of the features described above in relation to the first, second, and third methods, systems, and computer-readable media, and in relation to the fourth method.

Any of the above variations and embodiments of the system, methods, and/or computer readable media may be combined with any of the features of any other of the variations of the systems and the methods described herein, and may also be combined with any other of the features described herein.

Other features and advantages of the invention are apparent from the following description, and from the claims.

BRIEF DESCRIPTION OF THE DRAWINGS

These and other aspects will now be described in detail with reference to the following drawings.

Like reference symbols in the various drawings indicate like elements.

DESCRIPTION

1 Overview

Disclosed are implementations for a question-and-answer information retrieval system (also referred to as a question-answering system or Q-A system) that include various techniques for processing input data either during the training stage or during the ingestion phase (when source document content used for answering user queries is processed).

The proposed approaches and techniques described herein refine the training data and/or the source data ingested so that during search time the information retrieval framework can return better quality responses. The proposed approaches may be used individually or in combination to provide overall improved capabilities of the information retrieval system (be it a Q-A system, or some other type of information retrieval platform). One or more examples of Q-A systems that may be modified to include one or more of these processes are describe in International Application published as WO2021/263138, on Dec. 30, 2021, and filed on Jul. 21, 2021, as PCT/US2021/039145, titled "DOCUMENT PROCESSING AND RESPONSE GENERATION SYSTEM," which is incorporated herein by reference.

Some examples of the techniques and approaches discussed herein include keyword backoff and query tersification (paraphrasing training questions to capture variations of a particular query that may be submitted during search time), more particularly discussed below in relation to FIGS. 3-4. Under these approaches, variants of pre-assembled training questions (available as public or private question datasets) are generated to augment the training questions dataset with simplified question variants of training questions that are determined to be too complex, or with expanded question variants for training questions that are deemed to be too terse. These approaches can therefore provide alternative ways by which users might ask questions, and thus perform a more robust training on the Q-A platform.

Other examples of the techniques and approaches discussed herein include source content tagging with data elements (metadata) derived based on contextual information, more particularly discussed below in relation to FIGS. 5-6. Under the tagging approaches described herein, contextual information associated with a particular content portion is discovered (e.g., an ontological concept representative of the content portion is determined) or extracted (e.g., from available sources of contextual information). The contextual information is used to tag the content portion to better match user-submitted queries to the tagged content.

Figure 7:
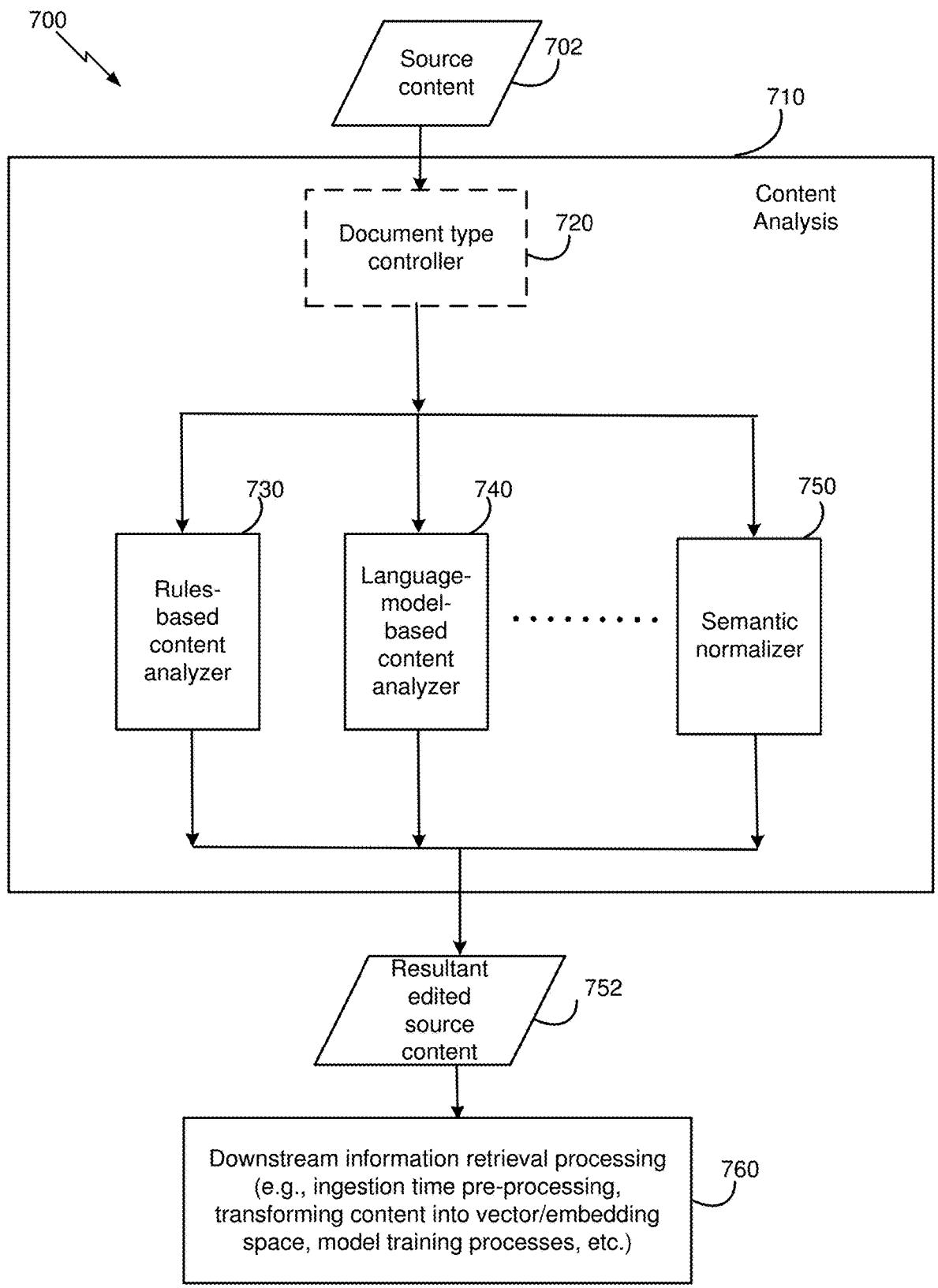
FIG. 7 includes a flow diagram of an example cleansing/normalization framework.
Figure 8:
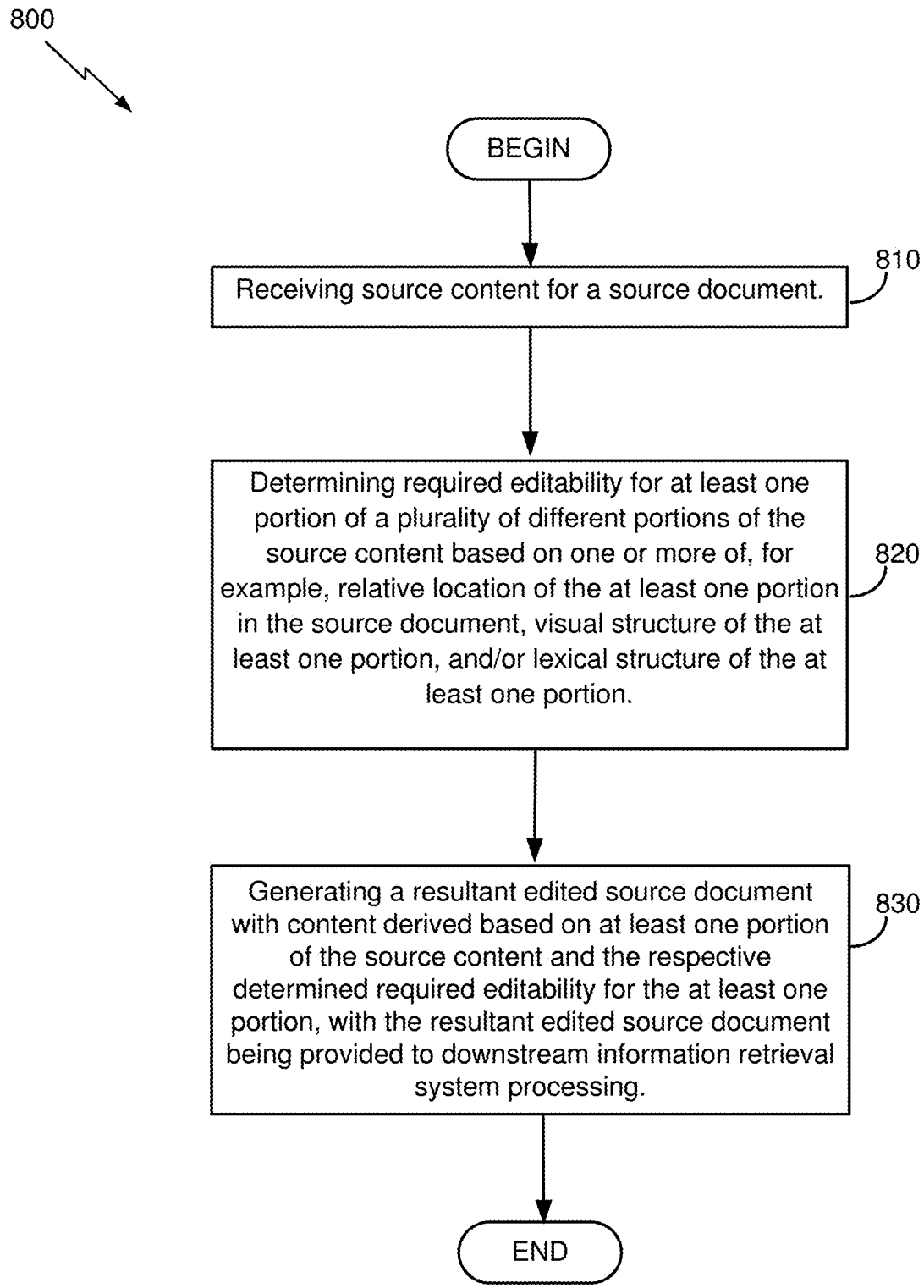
FIG. 8 is a flowchart of an example document processing procedure to perform cleansing and normalization operations on a particular document.

Additional examples of the processes described herein relate to content cleansing and normalization techniques, as more particularly described in relation to FIGS. 7-8. Under these approaches, source content is edited prior to being ingested to, for example, remove semantically unimportant parts that would otherwise be matched to a user-submitted question. The editing of source content also includes tagging semantically unimportant content parts with searching weights that down-weigh resultant matching scores for those tagged content parts in response to user-submitted queries of those tagged parts to user-submitted questions, and the normalization of semantically equivalent content elements (acronyms) into a uniform element.

Figure 9:
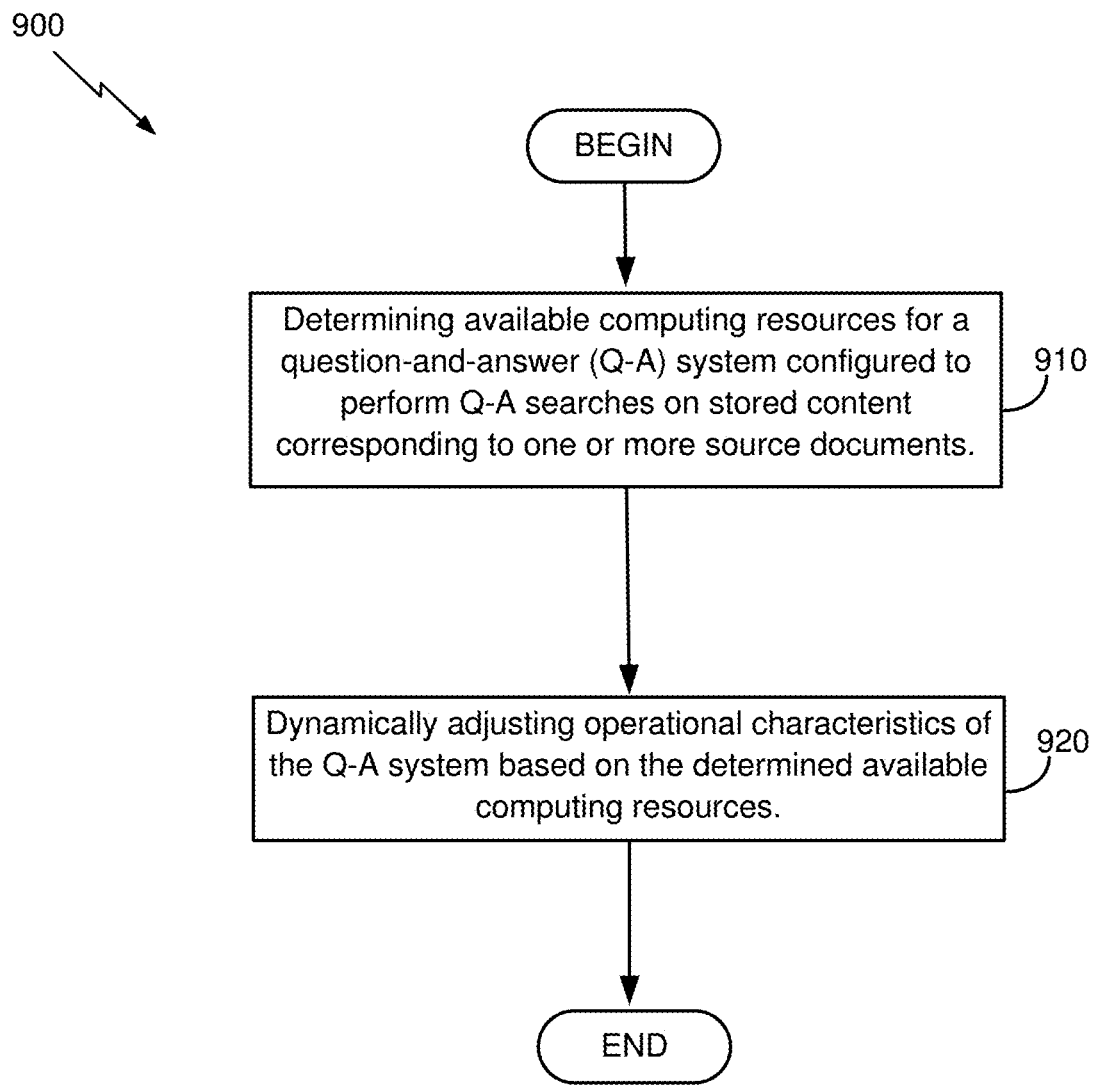
FIG. 9 is a flowchart of a procedure to adjust operations of a question-and-answer information retrieval system based on availability of computing resources.

Further examples of the processes described herein relate to adjustment of operations performed by the Q-A platform based on the availability of computing resources (this type of operation adjustment is also referred to as auto-scaling), as more particularly described in relation to FIG. 9. In one example, training operations may be adjusted if computing resources become scarce. Such an adjustment can be achieved through careful selection of negative training examples to achieve a more optimal configuration of the machine learning models given computing resources constraints. In another example, the number of coarse search results (in a two-prong searching approach) is adjusted in the event of a reduction of available computing resources, without significantly affecting the quality of the matches that the subsequent fine-detail search yields.

The approaches and solutions described herein may be implemented on any computing framework with searching capabilities (in the form of question-and-answers, or otherwise). For the sake of illustration only, and without limitation, some example embodiments of the improved searching approaches and solutions will be discussed in relation to the architecture depicted in FIG. 1 into which these approaches may be integrated. This architecture is described in greater detail in the following section.

2 Example Question-and-Answer System Architecture

Figure 1:
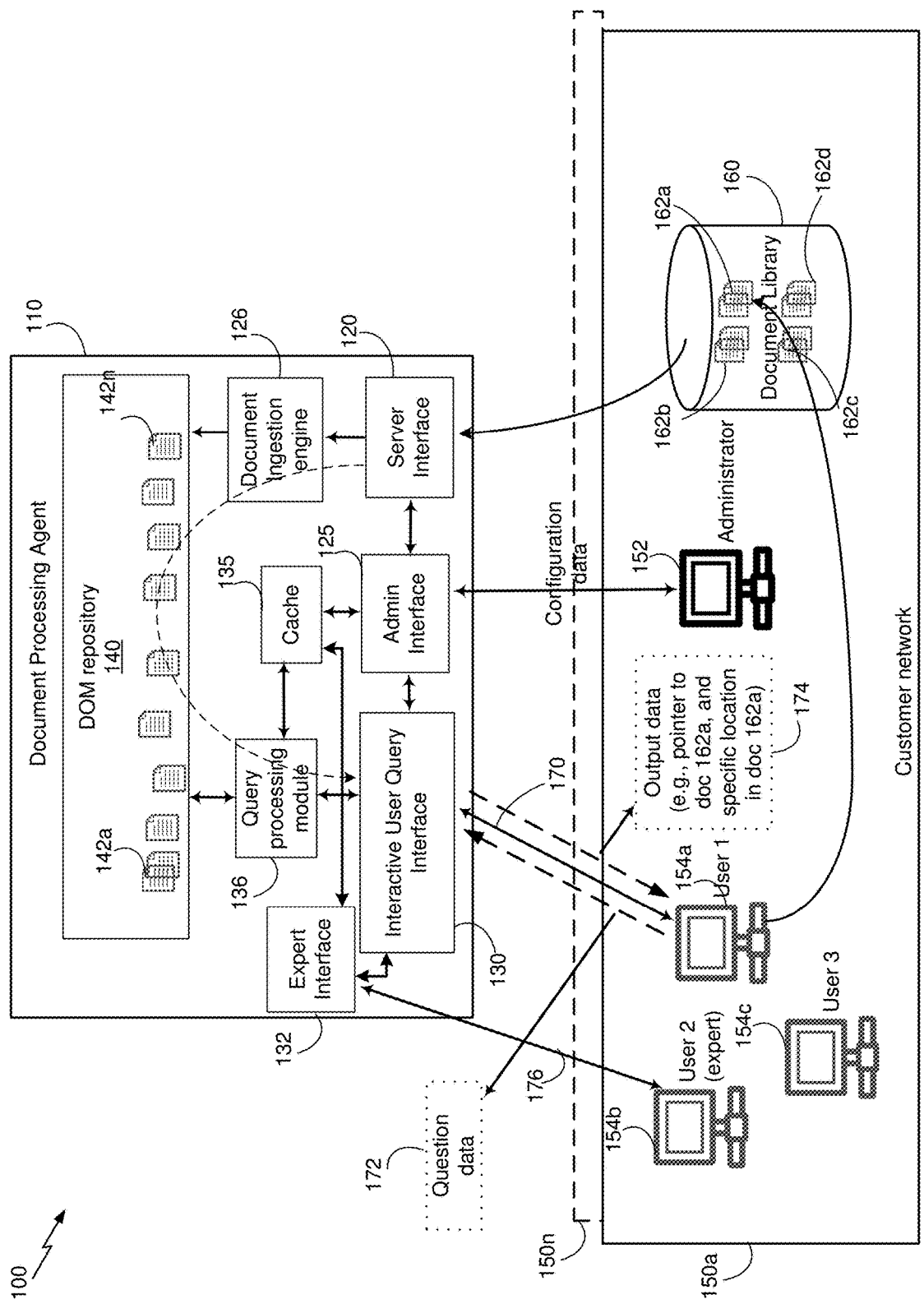
FIG. 1 is a diagram of an example Question-and-Answer document processing and response generation system.

With reference to FIG. 1, a diagram of an example document processing and information retrieval platform (implemented as a question-answering (Q-A) system 100) is provided. Further details regarding the system 100 are provided in international application No. PCT/US2021/039145, entitled "DOCUMENT PROCESSING AND RESPONSE GENERATION SYSTEM," the content of which is hereby incorporated by reference in its entirety.

The system 100 is configured to ingest source documents (e.g., a customer's voluminous library of documents, or other repositories of data such as e-mail data, collaborative platform data, third-party data repositories, etc.) to transform the documents to document objects (referred to as document object model, or DOM, documents) that represent a mapping from the source documents to searchable resultant objects (resultant transformed) documents. Those document objects may be stored in a DOM repository (also referred to as knowledge distillation, knowledge domain, or KD, repository). A user associated with the customer that provided that document library (e.g., an employee of the customer) can subsequently submit a query (e.g., a natural language query, such as "how many vacation days does an employee with 2 years seniority get a year?") that is processed by the system 100, and, in situations where a quick answer is not otherwise available from a cache for commonly-asked-questions, the query is processed and transformed into a format compatible with the format of ingested documents to identify portions in one or more of the ingested documents that may contain the answer to the user's query.

The system returns output data that includes, for example, a pointer to a location within one or more of the source documents (corresponding to the identified one or more ingested documents) which the user then accesses directly to retrieve an answer to the query. The output may alternatively, or additionally, include, in some embodiments, the answer to the user's query and/or a portion of a document, e.g., a paragraph, that contains the answer. Advantageously, the output returned to the user does not need to (although, in some examples, it may, if desired) include the specific information sought by the user, but rather just includes a pointer to a portion of source document stored in a secured site that cannot be accessed by parties not authorized to access that source document. This answer-determination approach therefore enhances the security features of transmitting sensitive information (e.g., confidential or private). In situations where a query produces multiple answers (some of which may have conflicting values), the output may include dynamically generated prompts asking the user to provide feedback to resolve ambiguity in the returned answers.

In certain examples, searching the document object repository to find an answer to a query typically may include a multi-pronged (e.g., two or more) procedure: (1) first, a process referred to as Fast-Search or Fast Match (FM) process is performed, and (2) the Fast-Match process is then followed by a process called Detailed-Search or Detailed-Match (DM) process (also referred to herein as "fine-detail" search). Both the FM and DM processes can be based on BERT (Bidirectional Encoder Representations from Transformers) language transform model or some other language transform model. In the FM case, the model results (in some implementations) in, for example, one vector for a query and one vector for one paragraph (e.g., 200 words window, which may also include contextual data). In the DM, there are typically multiple vectors per query or per paragraph, in proportion to the number of, for example, words or subwords, in the query or paragraph.

It is to be noted that, in some examples, the transformations of the query and/or the source documents may be performed at a customer's network, with the transformed query and/or transformed content then communicated to a central server. Such embodiments can improve privacy and security for communicating sensitive data across networks since resultant vectors (derived through the transformation of content or query data) are created in the secure space of the customer (client), and consequently only the resultant transformed vectors (rather than the actual content or query data) are available or present at the centralized cloud server. The transformation of the content or query data at the client's device can act as a type of encryption applied to the data being transformed and will thus result in secure processing that protects the data from attacks on the server cloud. In some embodiments, the data being transformed at the client's network can additionally be encrypted to provide even further enhanced secured communication of the client's data (be it source data or query data).

As depicted in FIG. 1, the system 100 includes a document processing agent 110 (some modules of which may be AI-based implementations) in communication with a customer's network 150a (which is one of n customer networks/systems that access, in the example system 100, the document processing agent 110). The document processing agent 110 can be implemented as an independent remote server that serves multiple customers like the customer systems 150a and 150n, and can communicate with such customers via network communications (be it a private network, or a public network such as the Internet). Communication with customers' units is realized via a communication unit comprising one or more communication interfaces (such as a server interface 120, an admin interface 125, an interactive user query interface 130, and/or expert interface 132, all of which are represented schematically in FIG. 1), which would generally include communication modules (e.g., transceivers for wired network communications and/or for wireless network communication, with such transceivers configured according to various appropriate types of communication protocols). Alternatively, the document processing agent 110 does not need to be located at a remote location, but may be a dedicated node within the customer network. For example, it can be implemented as a process running on one of the customer's one or more processor-based devices, or may be a logical remote node implemented on the same computing device as a logical local node (it is to be noted that the term "remote device" can refer to the customer station, while "local device" can refer to the document processing agent 110, or vice versa). An arrangement where the agent 110 executes within the customer's network (such as any of the customer networks 150a-n) may improve data security, but may be more expensive to privately run.

Yet in other alternative embodiments, some portions of the system (e.g., the ingestion units configured to perform the pre-processing and vectorization (parametrization) operations on source documents and/or on queries submitted by users) may be located inside the firewall of a customer's network, while storage of ingested documents (and optionally search engines to search ingested content) may be located outside the customer's network's firewall (e.g., on a centralized cloud server(s)). In such alternative embodiments, data sent to the cloud servers (e.g., to perform the search at a centralized location) may already have been processed into encoded (ingested) content (e.g., through vector/transform processing that may have been implemented through coarse transform, e.g., applied to fixed sized input segments, and/or fine-detail transforms applied to smaller portions than the portions processed by the coarse transformer) that is unintelligible to third parties unauthorized to make use of the data, thus adding another measure of privacy and security protection to data that is to be processed using the system 100. In these alternative embodiments, the initial part of the processing of the input query may also be processed inside the customer network's firewall. In addition to performing the transformation (of the source content and/or the query) within a client's firewall, such transformed data may further be encrypted (using symmetric or asymmetric encryption keys) before being transmitted to the document processing agent 110, thus increasing the level of security/privacy realized for communications between a customer's network and the centralized document processing agent (which serves multiple customers).

The example customer network 150a may be a distributed set of stations, potentially with a dedicated secured gateway (protected by a firewall and/or other security measures) that can be controlled (from a station 152) by an administrator. The customer generally has amassed a large volume of electronic documents (including, e.g., technical documentation relevant to the customer's operations, administrative documents such as Human Resource documents, and all other types of written documents in electronic form). Those documents may be arranged in a document library 160 (which may be part of the computing platform of the customer network 150a), and are accessible by various authorized users at user stations 154a-c within the network 150a, and by an administrator (via an administrator station 152). Any number of stations may be deployed in any particular customer network/system. The administrator station 152 can control access to the documents in the library 160 by controlling privileges, and otherwise managing the documents (e.g., access to specific documents within the library 160, management of content to conceal portions that do not comply with privacy requirements, etc.) As will be discussed in greater detail below, in addition to the library 160 (containing documents relating to operation of the entity operating on the network), other sources of data or information may be available from various applications employed by the customer (e.g., an e-mail application, a chat application such as Slack, customer relationship applications such as Salesforce, etc.) to process through the document processing implementations described herein.

The administrator station 152 is configured to communicate with the document processing agent 110 via, for example, an admin interface 125. Among other functions, the administrator can provide the document processing agent 110 with information identifying location(s) of the source documents in the repository (library) 160 maintaining the plurality of source documents, control configuration and operation of the functionality of the document processing agent 110 in relation to the customer network 150a, review data produced by the agent 110 (e.g., override certain answers), provide the document processing agent 110 with training data, etc. Communication between the station 152 and the admin interface 125 can be established based on any communication technology or protocol. To enhance security features, communications between the document processing agent 110 and the administrator station 152 may include authentication and/or encryption data (e.g., using symmetric or non-symmetric encryption keys provided to the document processing agent 110 and the administrator station 152). Using the communication link established between the administrator station 152 and the interfaces 120 and 125, the administrator provides information necessary for the document processing agent 110 to access the document library. For example, the administrator station can send a message providing the document processing agent 110 with a network address for the document library 160 (and/or identity of documents within that library that the agent 110 is to access and process). The administrator station can, in turn, receive an encryption key (e.g., a private symmetric key, or a public key corresponding to a private asymmetric key used by the agent 110) that is to be used to encrypt content of documents that are to be transferred to the agent 110. The communication between the administrator station 152 and the admin interface 125 (or any of the other interfaces, such as interfaces 120 and 130, with which the administrator can communicate) can also be used to establish other configuration settings controlling the exchanges of data and information between the customer network 150a and the document processing agent 110, as will be described in greater detail below.

Once the document processing agent has been provided with the location (e.g., represented as a network address) of the document library 160, and the communication features controlling the transmission of data between the customer network 150a and the agent 110, the agent 110 can begin receiving data transmissions of the documents from the repository (library) 160. The administrator station 152 can control the content sent, and perform some pre-transmission processing on the documents to be sent to the document processing agent 110, including removing sensitive content (e.g., private details), encrypting the content (e.g., using a public key corresponding to a private key at the document processing agent 110), authenticating the data to be transmitted, etc. The document processing agent 110 receives data transmitted from the customer network 150a via the server interface 120, and performs data pre-processing on the received data, including authentication and/or decryption of the data, format conversion (if needed), etc. As discussed herein, some additional pre-ingestion processing that may be performed by the server interface 120, or by the document ingestion engine 126, include tagging of content with data elements derived based on contextual information associated with the received content, performing cleansing operations (removing or down-weighing semantically unimportant sections of the content that would otherwise skew the searching operations) and normalization operations (replacing semantically equivalent content terms with a uniform, canonicalized, term), etc.

The server interface 120 then passes the data corresponding to the documents sent from the document library 160 (subject to any pre-processing performed by the interface 120) to a document ingestion engine 126 that processes the received documents to transform (convert) them into a representation that allows the determination and generation of answers to queries provided by a user of the network 150a. Typically, prior to applying the transformation(s), the source document is segmented into portions (e.g., 200-word portions, or any other word-based segment), with the content segmentation performed according to various rules for adjoining content from various parts of the documents into discrete segments. An example of a pre-processing (i.e., pre-transformation) rule is to construct segments using a sliding window of a fixed or variable length that combines one or more headings preceding the content captured by the sliding window, and thus create a contextual association between one or more headings and the content captured by the window. Such a rule ensures that the transformation performed on a segment combines important contextual information with content located remotely (e.g., farther away in the source document) from the segment being processed. Other examples of important contextual context that may be used to tag multiple segments (or even to embed such contextual information directly into the content of the segment) include ontological concepts determined for one or more segments.

Having segmented the source document, and/or or performed other types of pre-processing, the document ingestion engine 126 is configured to apply one or more types of transformations to the document segments to transform the segments into searchable segments (e.g., question-and-answer searchable segments). One type of transformation that can be applied to the segment is based on transforming the fixed-sized (or substantially fixed-sized) segments, typically comprising multiple words/tokens, into numerical vectors (also referred to as embeddings) in order to implement a fast-search process. Such a search is typically a coarse search, in that it generally returns (in response to a query submitted by a user) a relatively high number of results (hits) because the search is based on matching vectors produced from input data comprising a relatively large number of words (tokens or features), and as a result the resolution achievable from such a transformation is lower than what can be achieved from transforming smaller segments. Thus, results based on coarse vector transformations might not provide as accurate representations of the textual meaning of the transformed content as other transformations applied on smaller segments. On the other hand, as the name suggests, the fast-search can be performed relatively quickly, and thus may be used to winnow the possible candidates of possible answers (to the submitted query) to a size or number that can then be more carefully searched (possibly through a search based on another type of transformation). As will be discussed in greater detail below, in some embodiments, the number of returned fast-searched candidate can be adjusted in response to the availability of computing resources. For example, during periods of high usage of resources, the number of returned fast-search candidates may be reduced (e.g., from the top scoring 1000 results per query to the top scoring 200 results).

Another transformation that may be applied by the ingestion engine is one for generating fine-detail vector transformations that are used to more narrowly pin-point locations of answers with some text-segment (e.g., paragraphs) specific answer word sequences. Generally, document segments on which the fine-detail transformations are applied may be at a finer grain (resolution) than fast-search segments (which are generally of a fixed size, e.g., 200 words, and thus cannot typically pinpoint the exact location of an answer, if one exists, within the segment).

More specifically, a fast-search transformation (e.g., implemented through neural networks, filters, etc.) is applied to the segment to yield vectors with values that are based, and therefore are representative of, the content of the document segments. As will be discussed in greater detail below, several approaches may be applied by the document ingestion engine 126 to transform the data according to the fast-search transformation. In one example, the data representative of the content may be transformed into vector representations (e.g., fixed size vector, or variable size vectors). Thus, in such an example, the transform converts textual content into a vector of numerical values, which may or may not be associated with metadata (e.g., text-based metadata, providing additional information that can be used for further processing) or other contextual information. The resultant transformed vector can be representative of possible questions and answers that are associated with the input segment that was transformed. An example of a transformation that yields such vector-value representative of the content of the input (including contextual relationships) is the Bidirectional Encoder Representation from Transformers (BERT)

Under the BERT approach, when a query is received, relevant sequences in the content representation of previously processed source documents can be identified quickly (possibly from a set of objects that may have been earlier identified using, for example fast-search processing) by identifying a part of a document (e.g., a paragraph) that may contain the answer, and identifying the span of words in that part of the document that contains the specific answer. In some examples, under the BERT approach the question and the answer are concatenated (tokenized for example using WordPiece embeddings, with suitable markers separating the question and the answer) and processed together in a self-attention-based network. The output of the network may indicate a score for each possible starting position for the answer and a score for each possible ending position for the answer (with the overall score for a span of the answer being, in some embodiments, the sum of the corresponding start and end positions of the answer). That is, a self-attention method is used where embedded vectors of a paragraph and a query are mixed together through many layers followed by a decision-maker layer and segmenter logic to provide an efficient method to determine if a question is answerable by a paragraph, and if so, determine where exactly the span of the answer lies in the paragraph.

In the BERT-based approach, a network may first be trained on a masked language model task in which a word is omitted from the input, and predicted by the network by an output layer that provides a probability distribution over words of the vocabulary. Having trained the network on the masked language model task, the output layer is removed, and in the case of the question answering task, a layer is added to yield the start, end, and confidence outputs responsive to the query. The network is further trained (e.g., fine-tuned, transfer learning) on supervised training data for the target domain (e.g., using Stanford Question Answering Dataset, or SQUAD). Having trained the network for question answering for the target domain, further training may be used to adapt the network to a new domain (e.g., fine-tuning of the trained model to improve its capacity to answer question related to the desired domain to which the Q-A system is to be adapted). Another training strategy used for BERT is the next-sentence prediction, in which the learning engine is trained to determine which of two input segments (e.g., such segments may be neighboring sentences of a text-source) is the first of the two segments. When training the model, both the masked-language and next-sentence training procedures may be combined by using an optimization procedure that seeks to minimize a combined loss function. Alternatively, or additionally, other training strategies (to achieve context recognition/understanding) may be used separately, or in conjunction with, one of the aforementioned training strategies for BERT.

As will be discussed below, the present framework described herein may also be configured to run improved training processes that aim to make the framework more robust, and to perform meaningful training iterations even during times that computing resources are scarce (e.g., during high congestion/usage time). For example, when fewer computing resources are available, the Q-A system is configured to identify and select appropriate training examples (e.g., negative examples) that are determined to be more challenging for the Q-A system to handle. That is, during times of computing resource scarcity, the system is adapted to focus on training examples that have caused the most difficulty for the system (resulting in confusing or incorrect predicted output), and can therefore be used to adapt the framework to achieve more meaningful improvement in its performance than would be achieved with less challenging examples. Another training procedure that may be implemented by the Q-A system is directed to generating an expanded set of training questions (typically generated from pre-assembled sets of training data) so as to use a larger set of possible questions that users are likely to use. For example, for previously-compiled datasets with well-formed questions, a proposed approach described herein simplifies (tersifies) the questions while seeking to maintain minima information loss. Conversely, pre-compiled questions that are under-specified may also not reflect natural question-asking by users, and thus, under the approaches presented herein, such questions are expanded to, for example, include statements of intent (possibly based on available contextual information) or to otherwise supplement the under-specified questions.

In example embodiments based on the BERT approach, an implementation, referred to as a Two-Leg BERT approach, may be used in which much of the processing of a query is separated from the processing of parts of a document (e.g., paragraphs) in which answers to the query may be found. Generally, in the two-leg-BERT approach, the neural network architecture has two "legs," with one leg for processing the query, and one for processing the paragraph, and the outputs of the two legs are sequences of embeddings/encodings of the words of the query and the words of the paragraph. These sequences are passed to a question-answering network. A particular way this approach is used is to precompute the BERT embedding sequences for paragraphs, and complete the question-answering computation when the query is available. Advantageously, because much of the processing of the paragraphs is performed before a query is received, a response to a query may be computed with less delay as compared to using a network in which the query and each paragraph are concatenated in turn and processed together. The paragraphs are generally much longer than the queries (e.g., 200-300 words versus 6-10 words) and therefore the pre-processing is particularly effective. When successive queries are applied against the same paragraph, the overall amount of computation may be reduced because the output of the paragraph leg may be reused for each query. The low latency and reduced total computation can also be advantageous in a server-based solution. As noted, in the implementations described herein, the BERT-based processing of the source documents produces transformed content that is typically stored in a repository (such as the DOM repository 140 of FIG. 1). The underlying documents from which the BERT-based transformed content is generated may be retained as well, and associated with the resultant transformed content (as well as associated with corresponding transformed content obtained via other transforms).

In some embodiments, the BERT-based transformers (e.g., used for the fast, coarse, transformation, and/or for the fine-detail transformation) may be implemented according to encoder-based configuration. For example, a BERT-based transformer structure may include multiple stacked encoder cells, with the input encoder cell receiving and processing the entirety of an input sequence (e.g., a sentence). By processing the entirety of an input sentence, a BERT-based implementation can process and learn contextual relations between individual portions (e.g., words in the input sequence). An encoder layer may be realized with one or more self-attention heads (e.g., configured to determine relationships between different portions, such as words in a sentence, of the input data), followed by a feedforward network. The outputs of different layers in an encoder implementation may be directed to normalization layers to properly configured resultant output for further processing by subsequent layers.

In some embodiments, other language models may be used (in addition to or instead of the BERT-based transform) to transform (content, as part of the pre-processing operations implemented by a pre-processor 110 of FIG. 1, of source documents and/or queries). Examples of such additional language model transforms include:

- GPT3 language model—An autoregressive language model that is based on a transformer implementation.
- T5 language model—a text-to-text transformer-based framework that predicts output text from input text fed to the model.
- BART language model—a denoising autoencoder that uses a standard transformer architecture implemented with a Gaussian Error Linear Unit (GeLU) as its activation function elements, and that is trained by corrupting text with an arbitrary noising function, and uses a learning model to reconstruct the original text.
- RAG language model—the Retrieval-Augmented Generation (RAG) language model combines pre-trained parametric and non-parametric memory for language generation.
- UniLM language model—a unified language model framework that is pre-trained using three types of language model tasks, namely, unidirectional, bidirectional, and sequence-to-sequence prediction. The unified modeling is achieved by employing a shared transformer network and utilizing specific self-attention masks to control what context the prediction conditions on.
- Megatron language model—a transformer framework with a large number of parameters.
- ROBERTa language model—a model that is similar to the BERT approach, but with some of BERT's hyperparameters optimized.
- ELECTRA language model—this approach uses a generator unit to replace (and thus corrupt) tokens in the input data with plausible alternatives. A discriminator unit then tries to predict which tokens in the altered (corrupted) input were replaced by the generator unit.
- XLNet language model—an autoregressive pretraining framework that uses contexts associated with text to predict neighboring text. The XLNet framework is configured to maximize the expected log likelihood of a sequence with respect to all possible permutations of the factorization order.
- Albert language model—this model is similar to the BERT model, but with a smaller parameter size.

Other different language models, implementing different prediction and training schemes, may similarly be used in the implementation of the proposed framework of FIG. 1.

It is to be noted that, in some embodiments, the fast-search vector transformation (transforming a segment into a compact-sized numerical vector) may be applied to a tokenized version of the text (e.g., some transformation, such as transformations achieved through the BERT process, may have already been performed to produce an intermediary (e.g., tokenized) content, to which the fast-search transform is then applied).

The transform modules (BERT-based, or based on any other language transform model) may be implemented through neural networks (or through other machine learning architectures) that have been pre-trained to produce transformed content associated with question-answer pairs. Other transform implementations may be realized using filters and algorithmic transforms. Training of neural network implementations may be achieved with a large training samples of question-answer ground truths that may be publicly available, or may have been internally/privately developed by the customer using the system 100 to manage its document library.

For the fine-detail transformation performed by the document ingestion engine 126, the source data (e.g., text-based portions segmented from a source document according to one or more rules or criteria, with the segmented portions typically being smaller in size than the source segments used for the fast-search transformation) is typically transformed into multiple vectorized (numerical/parametrized) transformed content. The fine-detail transform may also be implemented according to BERT or some other language transform model. The processing by the document ingestion engine 126 can include natural language pre-processing that determines at least some linguistically based information, such as detection and recording of locations of named entities (e.g., person and company names) in the document, expansion of structured data, such as tables, into searchable form of equivalent text, information conversion into knowledge representations (such as a predefined frame structure), extraction of semantic meaning, etc. In some embodiments, the resultant fine-detail transformed data may be combined with the original content that is being transformed, along with derived or provided metadata that represents contextual information for the content and/or a high-level ontological concept associated with the content (although such metadata is not critical, it can facilitate the performance of intelligent searching and question answering for a document). In various examples, the combination of the transformed content and the source segment can be further augmented with automatic questions that may be germane to the source segment, so that these generated questions are combined with the particular segment (or in a particular location in a full document that includes the entirety of the source content and the corresponding transformed content), or with a particular information field. When processing questions from a user, a similarity between the user's question and such automatically generated questions can be used to answer the user's question by returning the information (e.g., a pointer or actual user-understandable content).

Figure 2:
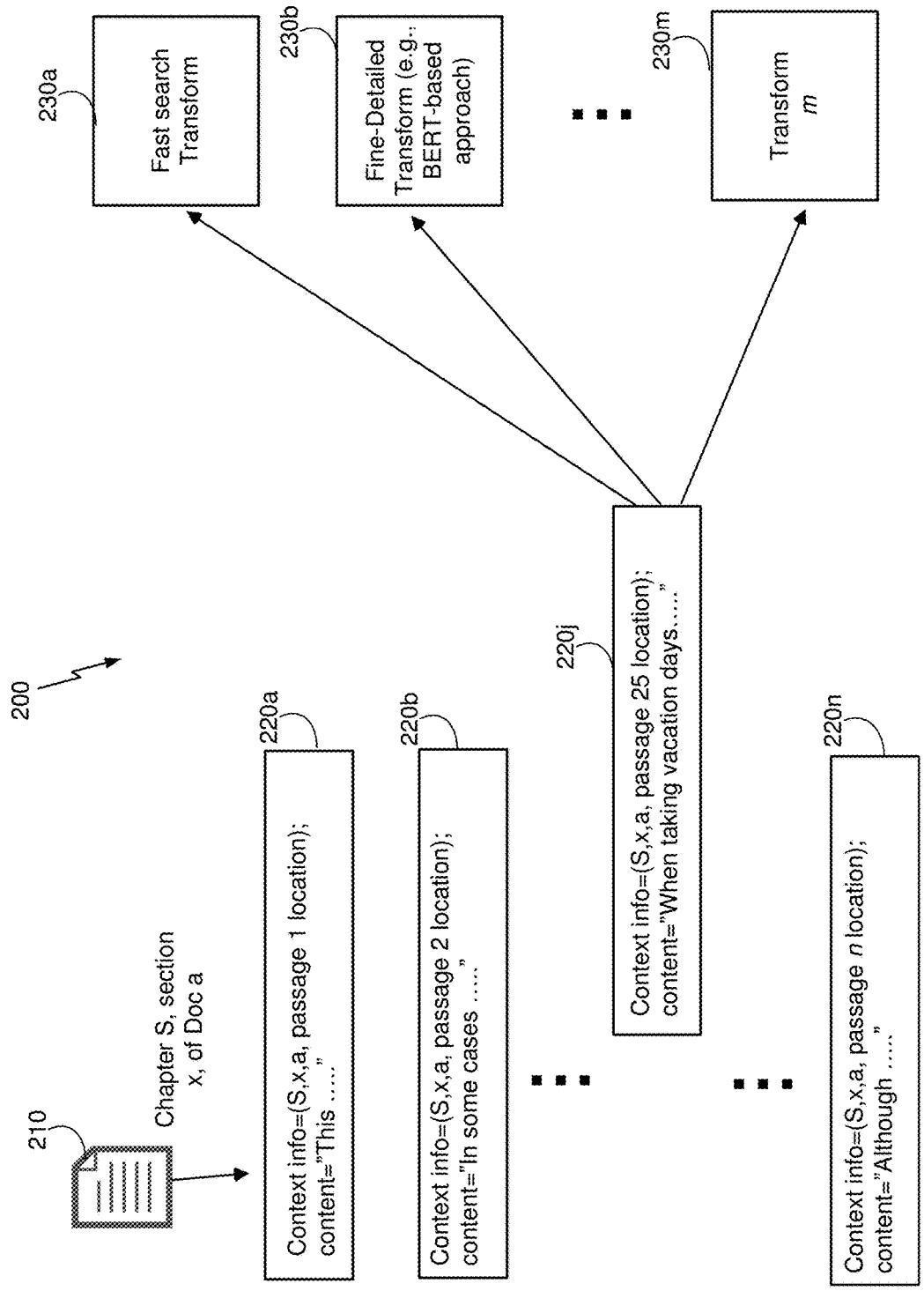
FIG. 2 is a diagram of an example document ingestion procedure.

FIG. 2 is a flow diagram 200 illustrating some of the pre-processing and ingestion operations discussed above. A source content 210 (which may be part of a source document) is segmented into segments 220a-n. Each segment has its own individual segmented content (resulting from applying a segmenting window to the source content), that may be combined with contextual information (which may be text information, numerical information, or both) associated with each segment. As noted, such contextual information can include ontological concepts determined for the segment (based on its semantic content). As can be seen, at least some of the contextual information, namely the document identity ("Doc a"), the Chapter information (Chapter S), and the heading information (section x) is common to the segments illustrated in FIG. 2. This allows the transformations that are subsequently applied to the segment to preserve at least some of the contextual information (including ontological concepts that are deemed to be of high importance to more than just the current segment), and thus preserve some of the relevance of the segment being transformed to the subject matter. To simplify the segmentation process (so as to facilitate more efficient searching and retrieval), the source documents may be segmented to create overlap between the sequential document segments (not including the contextual information that is separately added to each segment). Thus, for example, in situations where a segment is created by a window of some particular size (constant or variable), the window may be shifted from one position to the following position by some pre-determined fraction of the window size (e.g., ¾, which for a 200-word window would be 150 words). As a result of the fractional shifting, transformations (e.g., language transformations models) applied to overlapped segments results in some correlation between the segments, which can preserve relevancy between consecutive segments during search time. In some embodiments, heading information (and other contextual information) may be added directly to partitioned segments (i.e., they may be incorporated directly into the content). Alternatively, headings and contextual information may either be transformed into vectors that are then added to the vectors resulting from transformation operations applied to the content extracted by the sliding window, or may be combined with the content extracted by the window before the transformation is applied to the resultant combined data. By associating neighboring segments with each other (e.g., through fractional shifting of the window over a document to form the segments, and/or through combining metadata, document headings, and so on, to multiple chunks/segments), identification of relevant paragraphs (responsive to submitted queries), for the retrieval and presentation processing for top paragraphs and associated answer snippets, is improved.

Another pre-process that can be applied during segmentation of the source document relates to the handling of table information (i.e., when the original content is arranged in a table or grid). This pre-processing is used to expand structured data arranged in tables (or other types of data structures) into searchable form such as equivalent text. For example, upon identifying a portion of the source document as being a multi-cell table, substitute portions are generated to replace the multi-cell table, with each of the multiple substitute portions including a respective sub-portion content data and contextual information associated with the multi-cell table. Additional examples of pre-processes include a procedure for associating contextual information with one or more portions of the source document based on, for example, a) information provided by a user in response to one or more questions relating to the source document that are presented to the user, and/or b) based on one or more ground truth samples of question-and-answer pairs.

As noted, in some examples, contextual information might not be explicitly included with a segment, but instead may need to be discovered, and included with document segments as augmented information (in this case, augmented contextual information). For example, entity discovery (determining identity of relevant entities referenced in the document) can be used to help speed up the search, and to improve searching accuracy. Discovery of ontological concepts to associate with document segments is another example of discovering contextual information.

Consider the following example implementations:

Each search unit (e.g., 200-word windows, paragraphs, documents, etc.) is analyzed with respect to the inherent entities associated with the search unit, and also analyzed with respect to metadata associated with entities for a particular task (e.g., HR, author, organization etc.)

Each search unit is tagged with the appropriate inherent and metadata entities.

During the search, different heuristics can be used which could eliminate many of these search units by identifying them as irrelevant to the query at hand. For example, in one use case, where the user's question is determined with a high degree of confidence to relate to some specific subject matter (e.g., because the user explicit identification of the subject matter, e.g., a question stating "I have a financial question," or because the subject matter can be inferred, through rules or classification engines, to pertain to the particular subject matter), all documents/document objects for other subject matters (HR, security, etc.) can be eliminated from further consideration, and those documents do not need to be searched in response to the submitted query.

The by-product of such filtering is to speed up, for example, the FM and DM searching. Additionally, potential answer units from irrelevant categories do not create mis-recognition errors, and consequently this helps to improve the accuracy of searches.

Information about a specific entity (or entities) relevant to a user's search can also be used to generate more accurate additional questions (e.g., to determine different ways to paraphrase the input query so that additional possible question-answer pairs can be generated), and also to provide additional context that can be used to search the repository of data (be it DOM objects in transformed form, or user-readable data formatting).

In some embodiments, document pre-processing can be performed as two separate tasks. In one processing task, the source document is properly segmented and organized into small chunks, e.g., paragraphs, with additional augmentations (e.g., the vector sequence that represents the heading of a section can be appended to the vectors of every paragraph in that section). These augmentations are used to improve the retrieval accuracy. In a parallel task, a document is segmented in the most appropriate way for presentation purposes. The two different resultant segmentation outputs need to be associated with each other such that when, during retrieval processing, the top paragraphs and associated answer snippets are identified, but what is presented to the user are the presentation contents (rather than the identified answer snippets) associated with the identified answer snippets. In other words, the system can ingest a particular passage to facilitate searching operations, and separately ingest that particular passage to facilitate presentation operations. In this example, upon identifying the passage as a result of matching a query to the searchable ingested content, the presentation content associated with the identified passage is outputted.

Having segmented a source document into multiple segments, each segment may be provided to one or more content transforms (or transformers) 230a-m that transform the segment (content, and optionally the contextual information, although in some embodiments the contextual information may be preserved without transforming it) into a resultant transformed content that is associated with question(s) and answer(s) related to the original content of the respective segments. In the example of FIG. 2, m transforms are shown, each being applied to any one of the segments (such as the segment 220j). Although the same segment, for example 220j, is shown as being provided to each of the transforms, in some embodiments, different segmentations procedures may be applied to obtain segments of different sizes and configurations as may be required by each of the individual transforms (e.g., the coarse, fast-search BERT-based transform 230a may be configured to be applied to a segment of a first segment size, while the fine-detail BERT-based transform 230*b* may be configured to be applied to a segment of a second, different size (e.g., strings of several words)). As noted, any language transform model may be used in implementations of the platform 100.

The transform modules may be implemented through neural networks (or other machine learning architectures) that have been pre-trained to produce transformed content associated with question-answer pairs. Other transform implementations may be realized using filters and algorithmic transforms. Training of neural network implementations may be achieved with a large training samples of question-answer ground truths that may be publicly available, or may have been internally/privately developed by the customer using a document processing system (such as the system 100 of FIG. 1) to manage its document library.

Turning back to FIG. 1, ingested content produced by the document ingestion engine 126 is stored in document object model (DOM) repository 140. The repository 140 is typically implemented on one or more data storage devices (distributed, or available at a single local location) that can be accessible from multiple access/interfacing points between the repository 140 and other modules/units of the document processing agent 110. In the diagram of FIG. 1, the repository 140 is depicted as having two access points, with one access point being a one-directional link between the ingestion engine 126 and the repository 140 (i.e., a link to allow writing content from the engine 126 into the DOM repository 140) and a bi-directional access point connected to a query processing module 136 that provides query data to the DOM repository 140 (in order to search the DOM records stored in the repository) and receives search results that are forwarded to the user (optionally after performing further processing, such as disambiguation processing via an interactive iterative exchange with the user, drilled-down or broadening (backoff) query processing, query-re-write processes, etc.) that submitted the query. In some embodiments, the access point to the repository can be implemented as a single point connected to a module configured to perform the query processing and the document ingestion operations.

The DOM repository 140 is configured to (in conjunction with the document ingestion engine 126 and/or the query processing module 136) store, manage, and search DOM records 142*a-n*. Content of a DOM record typically depends on the transformation performed by document ingestion engine 126. A DOM record can include data items associated with a particular source document or a source document portion. For example, one DOM record may be a collection of items that includes an original portion of a source document, metadata for that source document portion, contextual information associated with that source document portion, a corresponding coarse vector(s) resulting from a transformation applied to one or more fixed-sized (or substantially fixed-sized) segments of the original portion of the source document (to facilitate a fast-search process), corresponding resultant fine-detail transformed content resulting from a fine-detail transformed (to facilitate a more accurate and refined textual search), etc. Thus, if the transformation resulted in a vector of values representative of the textual content of a segment, that vector is stored in the repository, possibly in association with metadata (vector or original form<which has been added or embedded into the vector), and/or in association with the original content (in situations where the actual original text-content is preserved; in some embodiments, for security or privacy reasons, the source content may be discarded upon its ingestion, or may be available only at the customer's site). Metadata associated with the transformed content may include contextual information associated with the original source content, and document location information that indicates the location or position of source content that resulted in the transformed content within the larger source document. Such document location information can be provided in the form of pointer information pointing to a memory location (or memory offset location) for the source document stored in the customer network, i.e., so that when the pointer information is returned to a requesting user, it can be used to locate the memory location where the relevant content constituting an answer to the user's query can be found.

The transformed content (which may include several transformed content items, resulting from the various transformations applied to segmented content), metadata, and/or source content stored in the repository 140 together may define a unified record structure, in which each of the transformed content, metadata, and/or original source content is a field or a segment of the unified record structure. Individual records, when they correspond to discrete document segments of a larger source document, can be associated with each other (e.g., by arranging them sequentially or through logical or actual links/pointers) to define larger document portions (e.g., chapters for a particular document), or to define the entire original document that was segmented and ingested.

As further shown in FIG. 1, the document processing agent 110 further includes the query unit (also referred to as a query stack) that is configured to receive inputs (data representative of queries from one or more users authorized to submit queries in relation to at least some of the ingested documents arranged in the DOM repository 140), and in turn provide output data returned to the initiating user. The query stack includes the user query interface 130 (which may be similar to, or implemented using the same hardware and software as the server interface 120) in communication with a query processing module 136 (also referred to as a query engine). As will be discussed in greater detail below, the query processing module may include a transform engine to apply to queries submitted by users similar transformation(s) to generate transformed query data that is compatible with the transformed content in the DOM records 142*a-n* maintained within the DOM repository 140. The transformed query can include coarse numerical vector type transformed data that can be used to search numerical vector transformed content in the repository 140, fine-detail transformed query (that can be used to search similarly formatted fine-detail transformed content in the repository 140), or any other transformed format that may have been used to ingest the source document. In various examples, the interactive interface 130 is configured to not only receive and process query data from the user, and provide query output back to the user, but also to determine (on its own or in combination with other modules of the agent 110) disambiguation information. That disambiguation information may include initially-provided (with the query) disambiguation information to help with the initial searching/matching operations (e.g., prefiltering operations) performed on the searchable content managed by the agent 110 (either in the DOM repository 140 or the cache 135). For example, pre-search disambiguation operations may include determining if the query is in-domain (e.g., pertains to local data collections) or out-domain. Disambiguation operations may also be used to determine whether a query is related to a previous query (e.g., in situations where the current query implicitly relies on query terms used in a previous query).

The disambiguation information may also include post-searching disambiguation information dynamically generated that is presented to the user to solicit the user to provide clarifying information to resolve ambiguity present in two or more of the query results. For example, when two answers are associated with the same or similar concept/category of information (be it an entity name, associated contextual information, or some abstract concept derived using natural language processing or a learning machine implementation) but have different concept/category values, intermediary output may be provided to the user (e.g., as a visual disambiguation prompt, or an audio disambiguation prompt) requesting the user to provide clarification information specifying which of the identified concepts is more relevant to the user's query. The disambiguation information returned by the user is then used to select one or more of the initial matches (and may eliminate some other matches), and/or to rank (based on computed relevance determined using the returned input from the user) the initial or remaining matches. Further details regarding disambiguation processing are provided in non-provisional application Ser. No. 18/083,733, entitled "Contextual Clarification and Disambiguation for Question Answering Processes," the content of which is hereby incorporated by reference in its entirety. In some embodiments, post-searching results may trigger back-off or drill-down operations to identify better quality search results.

As noted, in examples in which the repository 140 includes multiple types of transformed source content, the search of the repository 140 may be implemented as a multi-pronged search. For example, because coarse numerical vector representation is generally more compact and easier to search (but may not be as accurate as fine-detail transformed representations, whether achieved by a BERT-based transformation or some other transformation), a first prong of a search to determine an answer to a submitted query may be to convert the query data into coarse vector representation, and to use that first transformed query representation to search records in the repository 140 matching (e.g., according to some closeness criterion that may represent the distance, or difference, between the transformed vector query data and the transformed vector ingested content data) the coarse numerical-based transform of the query data. This type of initial searching may be referred to as fast-search. The results of the search may result in the identification of one or more answer candidates (e.g., identify 1000, or any other number, of possible segments that may contain an answer word sequence responsive to the query submitted by the user). The identified first batch of possible results can then be used to perform the second stage of the search by converting the query to a fine-detail transformed query and searching fine-detail transformed content associated with the search results identified in the first stage of the search process. This searching stage may be referred to as the detailed, or fine-grained, search. It is to be noted that, in some embodiments, the fast search may be used to identify the original portions of source content associated with the identified candidates, and those identified portions may then be transformed into fine-detail transform content. In such embodiments, the repository 140 does not need to maintain fine-detail transformed content, but rather the transformation of source content is done based on which portions have been identified by the fast-search as possibly containing an answer to the query. In alternative examples, searching for answer to a query may be performed directly on the entire fine-detail transformed content records without first identifying possible candidate portions of source content through a fast-search of fast-searched transformed content records.

Thus, in some embodiments, the query stack (e.g., the query processing module 136) is configured to transform the query data into transformed query data compatible with the transformed source content (e.g., compatible with one or more of the transformed content records in the DOM repository 140). For example, the fast-search-compatible transformation may be a coarse BERT-based transformation (e.g., using a learning engine implementing the same or similar trained learning model used to produce the searchable transformed content from the source data) that is applied to the entire query data (e.g., a natural language question) to produce a single vector result. The query processing module may, for example, launch a fast-search process in which it identifies one or more candidate portions in the transformed source content (with respective numerical vectors resulting from the coarse transformation) matching, according to some closeness criterion, the transformed query data. For example, the matching operation may be based on some closeness or similarity criterion corresponding to some computed distance metric between a computed vector transformed query data and various vector transformed content records in the repository 140. The closeness criterion can be based on such measures as a transform-based distance (TBD) scores. As described herein, in some embodiments, the transformed content may include vectors corresponding to possible questions (combined with or separated from other document content) that users may ask, and to which the source content provides a possible answer.

The query processing module 136 may be further configured to determine, from one or more fine-detail transformed content records corresponding to the one or more candidate portions identified based on their coarse transformed vectors, at least one fine-detail transformed content record matching, according to a second criterion (e.g., some other closeness or similarity metric, or the same criterion applied with respect to the coarse transformation data), a fine-detail transformed data of the query data. Alternatively, in embodiments in which a fast-search is not performed, the query processing module 136 may be configured to identify one or more candidate portions in the transformed source content with respective fine-detail transformed content records matching, according to the second criterion, the transformed query data.

In some embodiments, the interface 130 and/or the query processing module may be coupled to a query cache 135 and a question generation unit (which may be part of the cache 135 or of the query processing module 136, or may be a separate unit). The query cache 135 stores, among other things, answers/contents corresponding to frequently asked questions. Such answers/contents may include content previously retrieved and/or distilled from the DOM documents (and/or from their corresponding raw source content) in response to previously submitted queries. The content available on the cache storage may also include original content (i.e., content not retrieved or distilled automatically from the content repository) curated by a subject matter expert. Counters associated with such cached answers can track the frequency at which specific questions and answers have been submitted and/or retrieved. The cache 135 can also be configured to discard cached content that has not been requested within some reference (threshold) time interval. As noted, content in the answer cache may also have been stored by a subject matter expert, or by the administrator (e.g., operating from a station, such as the station 152 via the admin interface 125) in anticipation of some likely questions that users of the customer system (network) 150*a* were expected to submit, or to override content that may have been retrieved from the DOM repository 140 (e.g., content that, based on subsequent feedback from users, was determined to be inaccurate or unresponsive to the query submitted). Thus, in some embodiments, the query stack is configured to determine whether received query data matches (semantically, as may be determined by a machine learning semantic matching model, or is some other sense) one of pre-determined questions (which may be stored in the answer cache), and to generate the output data based on one or more answer data records (possibly stored within the answer cache) in response to determining that the received query data matches one of the pre-determined questions. In some embodiments, the matching of query data to the past questions and associated answers stored in cache is performed by computing a score that is based on the combination of the questions and their answers, and ranking the computed scores to identify one or more likely matching candidates.

The query processing module may also include a question generation engine that can determine (e.g., based on a trained learning engine and/or using a repository of question data) follow-up or related questions to one or more questions submitted through the query data. Follow-up questions can be generated by paraphrasing the query submitted, e.g., transforming and/or normalizing the submitting query to modify the question submitted using, for example, a trained learning engine. In some embodiments, answer data determined for the submitted query (e.g., based on content retrieved from the DOM repository 140 via the query processing module 136) may be processed (by a separate module) to formulate further questions from the answer. Such derived questions can then be re-submitted to the query processing module to retrieve follow-up answers. This process can be iteratively repeated up to a pre-determined number of times. In some situations, the content stored in the DOM repository 140 may associate multiple questions (represented in whichever transformation format(s) that was applied during the document ingestion stage or may be presented in a regular linguistic format) with each processed segment of the source document. As noted, generation of transformed content may include, for each processed segment, data representative of questions associated with the processed segment, metadata, and content that may be provided in transformed format and/or the original source content. Thus, upon submission of a query (generally in transformed format computed, for example, according to a coarse-BERT or a fine-BERT type transformation), at least one DOM record/element will be identified. That search result may possibly be associated with multiple questions, including the question that may have resulted in a match between the identified resulted and the submitted query. One or more of the additional questions (i.e., other than the question that was matched to the query) may be used as a separate query to re-submit for searching to identify additional content that may be germane to the original query submitted by the user.

As further shown in FIG. 1, the determination of an answer to a query can be initiated by a user submitting a query 172 via a link 170 established between a station 154*a* and the interface 130 (as noted with respect to the links established to transfer source documents for ingestion, the links can be based on any type of communication technology or protocol, including wired and wireless communication protocols). The query 172 may be an actual unprocessed question submitted by the user, or may be partially or fully transformed (e.g., for privacy and security reasons). For example, the station 154*a* may apply a transformation commensurate with the transformation applied by the ingestion engine 126 (in which case, performing a similar transformation at the query stack may become unnecessary). Alternatively or additionally, authentication and encryption processing may be performed on the query 172. The query (question data) 172 is transmitted to the document processing agent 110, and is received at the user query interface 130. Upon receipt of the query, a determination may be made as to whether appropriate answers are available in the cache 135 of pre-determined answers. If there is a pre-determined question-and-answer (e.g., the query data matches semantically, or otherwise, one or more pre-determined questions), one or more of the pre-determined answers is used to generate the output data (illustrated as output data 174) that is returned to the user via the link 170 (or through some other link).

Generally, the query data is transformed (if it was not already transformed at the station 154*a*) by the query stack into transformed query data. The transformed data may provide the query in one or more transform formats that are compatible with the formatting of the transformed source content stored in the DOM repository 140. In some embodiments, the query data may also be used to generate one or more additional questions (e.g., follow-up questions, questions related to the original query submitted by the user, questions with re-written terms that are semantically equivalent to one or more terms from a submitted query, etc.) In situations where an answer to the query is available from an answer cache, that answer itself may be used as a basis for generating further one or more questions that may be related to the cached answer(s). The query or the transformed query is used to search, via the query processing module 136, the DOM repository 140. As noted, the searching may be performed as a multi-pronged process according to multiple transformation formats used to store data in the DOM repository 140.

The output generated in response to a submitted query generally may include a pointer to the source content available at the customer network 150*a*. Because the data stored in the repository 140 is ingested based on source documents maintained at a document library available at the customer network, to which the user submitting the query has access, and because the source document might not have been stored in their original form at the document processing agent 110 (e.g., for security reasons, in order to protect sensitive data from being compromised), the output that is returned to the user does not require that actual answer data be sent back to the user. Instead, the pointer returned as the output of the query can identify the address or location of the answer with the appropriate document available to the user at the user's network 150. For example, in the illustrated example of FIG. 1, the output data is shown as a pointer to the specific location of the answer in the document 162*a* (stored in the library 160 along with documents 162*b-d*). Such a pointer may thus include data representing the document 162*a*, e.g., a network address or a memory location where the start of the document is located, and a specific location of the portion(s) of the document that represents the answer to the question asked by the user at the station 154*a* (e.g., a relative offset from the beginning of the starting location of the document 162*a*, or an actual address or memory location where the starting point of the identified portion(s) is located). The pointer data provided in the output data may have been included in a metadata field of a DOM record that included transformed content data determined (e.g., by the query processing module 136) to match (according to one or more applied matching criteria) the query submitted by the user. In some embodiments, the output data may include, in addition to or instead of the pointer data, at least part of the source content corresponding to the at least one portion of the transformed content and/or a summary of the source content corresponding to the at least one portion of the transformed content.

3 Keyword Backoff and Completion/Terse and Expanded Queries

Disclosed are training or ingestion procedures configured to improve the quality, and number, of returned search results responsive to subsequently submitted queries. The example training or ingestion procedures implement an information-based query paraphrasing (also referred to as "tersification") procedure. Particularly, to mitigate the mismatch between pristine QA training queries and terse deployment queries, training data is augmented with "tersified" paraphrases of the user queries, with noisy minimum description as a model for transforming pristine training queries to realistic ones. During the tersification process, the information content of the constituent words in the query may be assessed under a joint probability model over queries and documents, and a tersified query is then sampled based on a distribution over information retained in the translation from pristine to terse query (which can utilize, but does not require any parallel pristine-terse query data). The tersification implementations augment the training data by transforming existing full natural language (NL) questions into sub-statements by just keeping certain content words. The implementations described herein also include query expansion procedures to add semantic structure to sparse keyword queries that are under-specified.

Current data sets that are used for training language models (such as BERT or any other transform-based model for processing Q-A queries, or other types of NLP models) are basically very pristine. Such datasets use full-form, grammatically correct complete questions to define their QA pairs. Those datasets, or portions thereof, may also be used during ingestion time to create document object models (DOM) by determining Q-A pairs for an input source document. At the other extreme, there are some keyword databases that include coarser queries (to train a Q-A model or to ingest a document) where only a small number of keywords may be specified, and that need to be matched up with one or more answer paragraphs that are to be retrieved. The middle ground between well-formed complete questions/queries (for training or ingestion), and datasets with coarse (succinct) questions (e.g., questions that may be akin to the type of questions asked by a user through a Google search) is not well captured with most current datasets.

Thus, the implementations described herein include solutions to modify fully-specified queries with complete questions (available from one or more datasets) and tear them down, or tersify them, into queries with medium level of specificity (e.g., Google-like queries, that fall between overly sparse keyword-type searches and well-formed complete queries). The key idea, therefore, is to basically degrade well-formed queries (available, for example from datasets of example training queries) based on minimal information loss, and to generate tersified queries that are substantially equivalent to the well-formed source queries but are representative of differing amount of information about what users may be looking for. The differing amount of information in tersified queries can be a distribution of information over the tersified transformation. The tersification implementations described herein thus seek to augment the training sets for Q-A search engines so that not only are pristine queries available for training (and/or for document ingestion), but also to have terse queries available to render the Q-A system more robust to different styles of questions/queries submitted by different users. By controllably degrading the source pristine questions, the resultant tersified questions maintain a level of confidence (for identifying and retrieving meaningful answer information), while augmenting the training data to obtain more robustness. The tersification approach helps to ensure that the Q-A document processing framework works well for natural language queries, well formed (and/or overly detailed) questions, for tersified searches, and for coarser keyboard searches.

Consider a tersification example where the source training set may have included a question such as "how many weeks of vacation do I get if I'm in the Paris office?" To improve the likelihood that meaningful answers can be returned when a user (during runtime) submits a coarser query, the tersification implementations may be configured to generate a degraded alternative questions that is equivalent to the above example question. Such an example degraded question/query might be "vacation in Paris office," or "weeks vacation Paris office," or some other possible equivalent formulation of the query. It is to be noted that while the augmentation of the training (or ingestion) dataset with degraded/tersified dilutes the well-formed questions dataset, the ranking performance of the Q-A system (e.g., during runtime) trained with the augmented tersified questions is generally not affected.

An example implementation for performing question tersification/degradation processing on well-formed questions may be based on a term frequency-inverse document frequency (TF-IDF) approach. The TF-IDF approach provides statistical numerical values that represent the importance of terms, words, or expressions in a document in view of a collection of documents. A TF-IDF procedure may be configured to derive TF-IDF values for words and phrases of a document (e.g., based on the frequency of words/terms within the collection of documents). Generally, a TF-IDF value increases proportionally to the number of times a word (or phase) appears in a given document. This increase may be adjusted (decreased) in consideration of the number of documents in the collection of documents that contain the word. There are various ways to compute the TF-IDF value (as a ratio, or through some more complex expression) to discount common words that do not necessarily contain a lot of information in a way that would be helpful for performing a query (e.g., the word "the" may be a frequently-occurring word, but it does not possess much query-helping information). The inverse document frequency is generally a good indicator of how informative a word is in terms of the match. The TF-IDF values, which may be computed for some words appearing in the source set of well-formed questions, can thus be used to determine how to degrade the query. For example, words within a particular well-formed question that have TF-IDF values below some threshold may indicate that those words are of lesser importance for forming the query and/or obtaining meaningful search results, and can thus be excluded in a tersified alternative augmented query.

Certain example embodiments may include other constraints or criteria, used in addition to or instead of the TF-IDF-based procedure, to degrade the source well-formed question into tersified augmented questions. For example, various natural language processing (NLP) constraints may be imposed for the formation of augmented questions (e.g., requiring that certain words that are generally paired together remain paired in a resultant tersified query). In another example, when a resultant tersified query eliminates all proper noun that were present in the source well-formed question, the tersification procedure implemented may be configured to reinstate at least one of the proper nouns (e.g., based on the TF-IDF values of the proper nouns in the source question, or based on some other criterion).

As noted, examples described herein also include situations where the starting point (for training or ingestion) are questions included in a keyword dataset. The implementations described herein can augment such sparse keyword queries into more detailed queries by expanding the source keyword into a more natural (better-formed) questions or paragraphs. In an example, the expansion of under-specified (sparse) queries can be performed by determining contextual information related to the query or source document. For instance, for the query "give an entity," the document processing platform may be able to determine that the intent for the query is missing. A possible intent (that may be inferred from contextual information, user feedback, or based on some intent-determining process) can be identified and added to the otherwise under-specified query. For example, "I need help" is a good statement of intent, and can be added to the entity name in the source query to form an augmented query "I need help with an entity". In this example the entity name is simply added to the intent statement "I need help." By extending just the entity with that intent statement, the augmented query is made correctly usable for the information retrieval for question answering (IRQA) system.

Accordingly, the example embodiments described herein include implementations to perform data augmentation to take a full-formed query, strip it down into various holographic, or keyword-based versions, and add it to the training set. The example embodiments also include implementations of expanding an under-specified queries (e.g., by adding statement of intent or some other standard carrier question).

Figure 3:
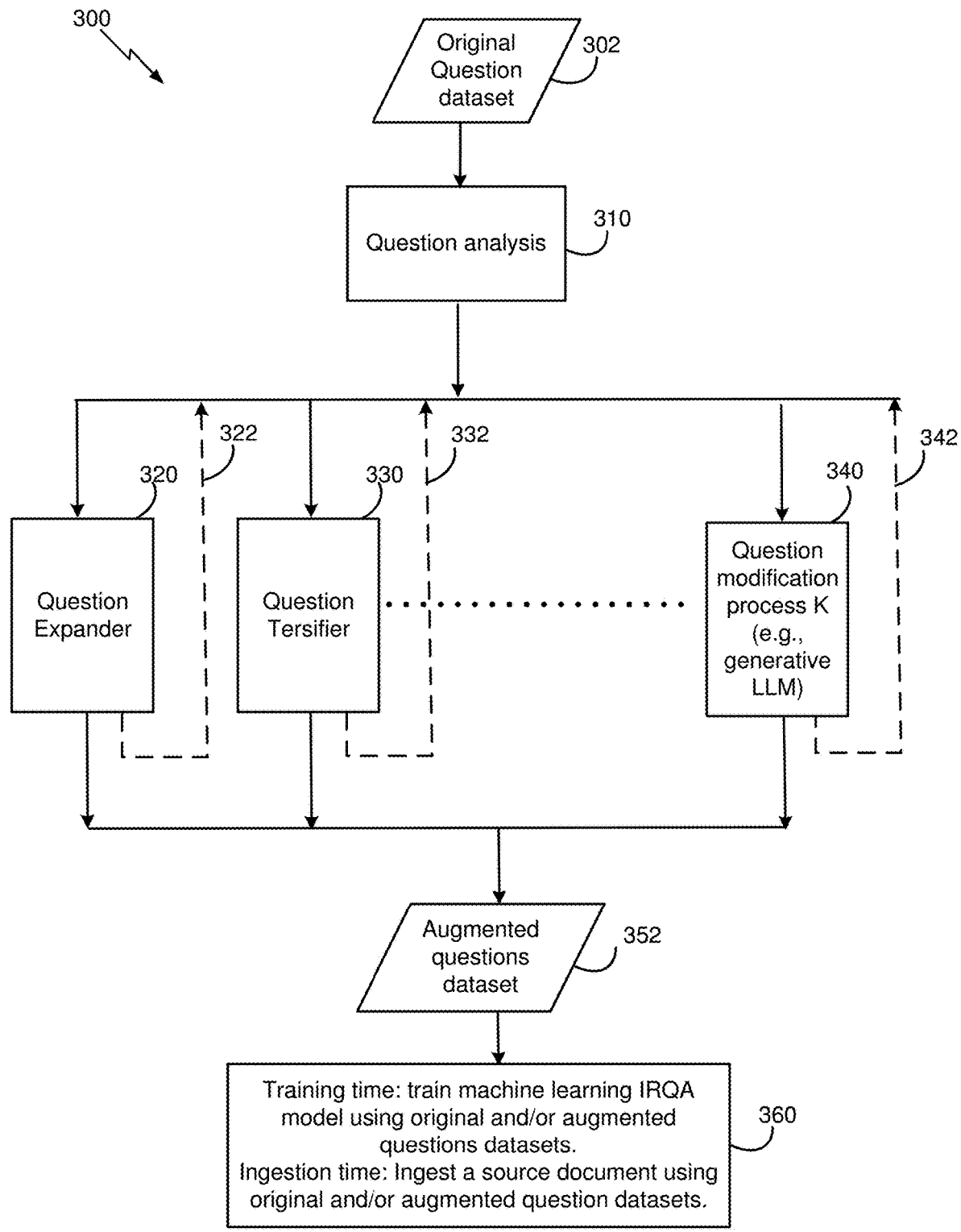
FIG. 3 is a flow diagram of an example question augmentation framework to improve quality of the training of machine learning information retrieval models, and/or improve the quality of document ingestion by such trained models.

With reference now to FIG. 3, a flow diagram illustrating an example question augmentation framework 300 to improve quality of the training of machine learning information retrieval models, and/or ingestion of source documents maintained on an information retrieval system, is shown. Generally, the framework 300 may be implemented as part of the document ingestion engine 126 of FIG. 1 (which may also be configured to control the training of the machine learning engine that produces the predicted output in response to a source document input), or as part of one of the other modules of the document processing agent 110. For example, the document processing agent 110 may include a training controller (not shown) that processes training data (defining ground truths) to compute the weight coefficients of the machine learning engine of the IRQA system according to some optimization process that matches output predicted by the engine to desired output.

As depicted in FIG. 3, the framework acquires an initial question set 302 comprising a library of questions (and/or corresponding answers) that are used for training purposes or are applied to source documents during ingestion (to create searchable content that conforms to question-answering query processing). The initial questions set may pertain to a specific subject matter, and may be selected from a repository of question sets covering different subject matter areas. In situations where the question set is retrieved for the purpose of ingesting a source document, some initial classification of the source document may have been performed (e.g., performed by a human user providing information identifying the subject matter relevant to a source document to be ingested, or alternatively analyzed by a machine-learning subject matter classification model) in order to select and retrieved an appropriate initial question set for use during the ingestion.

One or more questions in the initial set 302 (and in some situations, the entirety of the set) are analyzed by the question analysis unit 310 to determine if the question analyzed is overly structured (e.g., it is pristine in a way that would otherwise be unnatural for human users) or overly terse or vague (in a way that may create ambiguity resulting in low scoring responses). The analysis of a question can be performed according to various processes (e.g., algorithmic/rules-based processes) applied to a question to determine its level of specificity, and/or based on a machine learning classification model to determine if a question is overly detailed or too terse. For example, some processes that may be applied by the document analysis unit 310 include counting the number of words comprising the query (for comparison against a threshold that can be used as one criterion to determine an overly specific/verbose or an overly terse query), identifying the inclusion or lack of query-related wording (e.g., interrogative words, like "what," "who," etc., words/expressions indicating), determining if the question lacks wording specifying some intent or desire of the user for information, etc., determining the number of identifiable concepts or entities (the presence of multiple words that relate to a particular concept may be deemed to lower the likelihood that the question is too terse), and so on. In another example, a machine learning classification model that has been trained to identify well-formed questions and/or poorly formed questions could be used to generate a prediction or label indicative of a level of specificity for a question.

Based on the results of the analysis process(es) performed by the question analysis unit 310 (multiple responses/results produced by different processes may be combined according to a weighing process or some algorithmic or rules-based result-combining process), the document analysis unit 310 may generate output to indicate what process needs to be applied to the question(s) that has been analyzed to produce (if needed) augmented questions. For example, if the question analyzed is too short/vague, the question analysis unit may send the question to a downstream process, such as question expander process 320, to generate supplemental questions that can be used instead of, or in addition to, the analyzed question from the initial set 302. A question expansion process would generate augmented questions with a higher degree of precision and specificity that may be more in line with questions that a typical user might ask about the passage/subject matter against which the initial question and its augmented new questions are to be applied (whether for training or ingestion). Conversely, if the question analyzed by the unit 310 is determined to be too detailed, a process such as question tersification (i.e., a questions simplifier) 330 may be applied to the question to produce augmented questions with a similar semantic meaning to the analyzed question, but with a simpler and more natural syntax that potentially could be asked by users in relation to a corresponding passage.

Other processes for generating augmented questions (as illustrated by block 340 of FIG. 3, marked as "Question modification process K") may be invoked based on the results of the analysis performed by the document analysis unit 310.

With continued reference to FIG. 3, in the event that the question analysis unit 310 has determined that a particular question (from the initial question set 302) is considered to too short or to lack specificity in a way that could reduce the quality of model training or the quality and searchability of an ingested source document, the question is transferred to the question expander unit 320. The question expander unit is configured to, for example, when the interrogative wording or a question intent is missing, to extend/expand the question by prepending an intent to the query. If the question's intent can be inferred from contextual information associated with the question set that is being analyzes, the expander determines the question intent and prepends to a question an appropriate interrogative (or some other wording expressing a question's intent) to generate the expanded question. The generated expanded question is added to an augmented question set 352.

If a question intent cannot be ascertained for the question being analyzed, the question expander may generate multiple augmented questions with different intents (as expressed by different interrogatives, or other expressions of intent that can be added to a question). It is noted that when there are multiple possible questions intents, the different generated augmented questions may be applied to the training passage or source document being ingested to determine response matching scores. The augmented questions that yielded the best matching scores may be further used for the training or ingestion process, with the other generated augmented questions discarded.

To illustrate, consider the example in which a question provided in the initial question set recites "help Dell laptop." Here, there are no interrogative words that can shed light on what the meaning or intent of the question may be. If it is clear from context what the intent of the question may be, the question expander can prepend the proper intent. For instance, if an accompanying document against which the question is to be applied is determined to be a catalog of laptops with pricing information, then the likely intent of the question is buying or shopping a Dell laptop, and one augmented question that may be generated is "help shopping for Dell laptop" (some other possible examples may be "how much does a Dell laptop cost in stores near me?," "where can I buy a Dell laptop near me?," etc.)

On the other hand, if the accompanying document against which the questions (original and augmented) are to be applied is an installation manual, the resultant generated question may be "help setting up Dell laptop." As noted, multiple augmented questions may be generated for every analyzed question from the initial set 302, and thus the question expander may generate multiple different augmented questions that have different intents.

Examples of contextual information that can be used by the question expander 320 to infer intent and to facilitate generation of augmented question (i.e., to add question-formulating expressions to the otherwise short or ambiguous questions) include contextual data associated with the query or user (such as location information, personal and device information associated with the question submitted or the user, etc.), information associated with an accompanying passage or document, information captured through various sensors on devices used by the user (e.g., image information showing the scene being viewed by the user, or showing captured barcode or QR codes), and so on.

The question augmentation framework 300 depicted in FIG. 3 also includes a question tersifier 330 that is configured to process overly-specified questions where the question is presented in a form that is somewhat unnatural (e.g., a form that a user, during search-time, might not use). Upon a determination, by the question analysis unit 310, that a particular question is overly-specified, the particular question is directed to the question tersifier 330 which is configured to simplify (degrade) the question into a simpler form that conforms more closely to natural questions asked by regular users. As noted, the question analysis 310 applies various processes on a particular selected question to, for example, count the number of words, identify the existence (or lack of) a statement of intent, classify the selected question (using a machine-learning model) as being one of overly specific (verbose), overly terse, or normal (other categories may be used), and possibly perform other processes to determine whether question augmentation is needed (and if so of what type).

The question tersifier 330 may simplify the received question using several different processes (possibly resulting in different augmented questions, from which one or more questions may be added to the augmented question set 352). As noted, in one example implementation, the question forwarded to the question tersifier 330 may be simplified using a term frequency-inverse document frequency (TF-IDF) approach. Under this approach, the question tersifier 320 computes statistical numerical values for words that comprise the question being processed. This statistical computation may be based on pre-determined tables that assign the specific word some pre-determined statistical (normalized value). Certain common words (e.g., "the") that do not carry much information about the semantic meaning of the question may be discounted, or may simply be assigned a low statistical value. In some embodiments, the TF-IDF may compute statistical numerical values for the words (or expressions or word-sequences) appearing in a question based on the occurrence of those words in the particular accompanying document to which the overly-specified question is to be applied. As noted, the TF-IDF values may be computed in different ways (as a ratio, through some more complex expression, etc.).

Having computed TF-IDF values for words of a question, a simplified question can be generated based on some degrading process. For example, words (or word sequences) in the question associated with TF-IDF values below some pre-determined threshold may be removed. The removal of wording can be performed subject to a constraint that a question meaning or question intent in the newly formed (simplified) question is retained. The processing implemented by the question tersifier 330 should thus ensure that the resultant simplified question does not incur too much of an information loss so that the resultant question(s) are substantially equivalent (in a semantic manner) to the well-formed source query, but are representative of differing amount of information about what users may be looking for. In some examples, the question tersifier may generate multiple resultant simplified questions that are added to the augmented questions datasets 352, with each of those simplified questions representing a different amount of information loss.

As also noted, in various examples, the question tersifier may implement other processes (to be run in addition to, or instead of, a TF-IDF-based process) to produce simplified questions. For example, various natural language processing (NLP) constraints may be imposed for the formation of augmented questions (e.g., requiring that certain words that are generally paired together remain paired in a resultant tersified query). In another example, when a resultant tersified query eliminates all proper noun that were present in the source well-formed question, the tersification procedure implemented may be configured to reinstate at least one of the proper nouns (e.g., based on the TF-IDF values of the proper nouns in the source question, or based on some other criterion). In further examples, the question tersifier may implement a trained machine learning process (different than the model used to implement the question-answering platform described herein) to generate semantically equivalent, but more concise questions. Such a machine learning model to tersify questions may be realized as a traditional machine learning classifier (to identify low information words, or to output pared down questions), or based on a language transform model (such as BERT). In yet additional examples, the statistical weighing of words/terms may be based on weighing schemes different from the derivation performed by the TF-IDF process. In some examples, contextual information relating to the question being analyzed and/or to an accompanying document or passage (e.g., the source document to be ingested, or a training passage) may be used in computing weights for the words comprising the questions and/or in applying rules to determine what words or word-sequences to maintain or eliminate. Examples of the types of contextual information are discussed in relation to the question expander unit 310.

Thus, the question tersifier applies one or more processes to generate one or more tersified questions from a particular question selected from the initial question set. The generated one or more tersified questions are added to the augmented question set 352.

As can further be seen from FIG. 3, the question augmentation framework may include any other number of processes (e.g., K processes, as indicated by the box 340 labeled "Question modification process K") that may be launched by, for example, the question analysis unit 310 (e.g., based on the analysis results determined by the question analysis unit 310). Such other processes may process a particular question (from the set 302) to modify the question according to various rules that may be applicable to different situations/circumstances determined through the question analysis. For example, different processes, implementing different rules and question modification schemes, may be invoked for different score ranges computed by the question analysis unit (based on the question specificity/sparsity criterion used) so as to generate an augmented (supplemental) questions appropriate for the particular initial question and/or the contextual information. It will be noted that in various examples a determination may be made by the question analysis unit 310 that no modification of an initial question is needed (e.g., because the question is neither overly-specific, nor overly terse).

Another possible process to perform question modification (e.g., represented by the block 340) to produce further augmented questions is one based on a generative large language model (LLM), which may be implemented locally (e.g., at the document processing agent 110 of FIG. 1) or may be implemented remotely at a third-party server (e.g., ChatGPT application). Under this approach, a question (original or variant) is provided to the generative LLM engine to produce a linguistically different question than that retrieved from the database 302, but with a semantically similar meaning. Such a linguistically different query may produce queries that reflect other conventional ways to ask the question, thus increasing the question diversity (in this case for the purposes of training and ingesting). In some embodiments, the invocation of a generative language model may include generating a message (provided to a local LLM engine that implements end-to-end transformations realized by generative deep networks such as transformed-based large language models, or alternatively sent to a remote LLM server) that includes the question to be paraphrased, and further includes a command or a prompt (specifying a query rephrasing instruction) that instructs the generative large language model to modify the query text according to edit/configuration parameters specified in the command or prompt. For example, for messages sent to ChatGPT, the message containing the content to be modified (in this case, the input question) may include a bracketed prompt specifying certain required characteristics for the desired output, such as the level of articulation (e.g., "[rephrase at a medium of perplexity]"; other options for the perplexity may be "high" or "low"). Other scaling and/or configuration parameters may also be used. The generated message is then provided to the generative language model system (e.g., when sent remotely, the message would be transmitted via a wired or wireless network link). The generative LLM engine returns a resultant augmented question that can be added to the augmented questions database 362. Thus, in embodiments in which a remote generative LLM is used to produce augmented questions, the controller of the searching system (e.g., the system 100, or more particularly the document processing agent 110 of the system 100) that is configured to modify the source question is configured to generate a question variant message comprising the source question and one or more required output characteristics for a resultant augmented question paraphrasing of the first query, and provide the question variant message to a generative large language model system configured to generate a resultant augmented question based on the source question and the one or more required output characteristics.

Additionally, in various examples the resultant queries of the various blocks 320, 330, and 340 may optionally be provided (via return paths 322, 332, and 342, respectively) to other processes to generate additional variants of the augmented queries generated by each of the blocks 320, 330, and/or 340. For example, a simplified (stripped) question produced by the question tersifier block 330 may be provided (via the optional return line 332) to the question expander block 320 so as to produce another variant from the simplified resultant question (e.g., adding a question intent, inferred from contextual information, to add to the simplified question produced by the question tersifier from the initial question). Similarly, an expanded question produced by the question expander block 320 may be provided (e.g., via the optional return line 322) to the question tersifier block 330 to strip away any semantically unimportant words, and to thus generate another question variant for the initial question. In a further example, any of the augmented questions produced by any of the blocks (e.g., 320, 330, and/or 340) may be provided to the generative LLM engine to produce further variants (semantically similar) of an initial questions from the dataset 302, or of any of its augmented question progenies. This process of iteratively producing additional variants by one or more of the question modifying processes (e.g., by the generative LLM engine, or any of the other blocks depicted in the question modifying stage of FIG. 3) may be performed repeatedly, optionally conditioning on set of factors that could include prompts that are pre-specified or even generated by another LLM so as to elicit a target (e.g., maximal) diversity in terms of information density, syntax, and phrasing, with those that pass verification (e.g., question variants meeting pre-specified linguistic requirements, question variants not being replicas of other variants, etc.) becoming the "complete" set of equivalent or related queries (questions). Accordingly, in various embodiments, the controller of the searching system (implementing, for example, the document ingestion engine) may further be configured to iteratively modify the one or more augmented questions to generate additional sets of augmented questions with similar semantic meanings as that of a preceding set of augmented questions. This iterative process may continue until a complete set of augmented questions (queries) is produced that satisfies certain conditions or constraints (e.g., exceeds some information diversity criterion, for example some pre-determined number N of variants) required for the completed set of augmented questions).

It is to be noted that the process of generating variants by feeding output of one question modification procedure to the input of another question modification procedure may continue over any number of iterations, subject to certain constraints or emergence of conditions that would terminate the iterative question variant generation process.

In some embodiments, the stripping (tersification), expansion, and verification operations may all be performed by one or more generative LLM engines configured to receive a source question and a command to generate a stripped (tersified) semantically similar question, and/or an expanded question (with an articulated intent). In such embodiments, the framework 300 may include a generative LLM engine(s) (such as the block 340) with a feedback path (such as the line 342) to feed generated questions (be it an expanded questions, tersified questions, or some other forms of semantically equivalent or similar questions to that of a preceding question) to the input of the generative LLM engines so as to repeat the operations to generate further augments questions based on variants generated by the generative LLM engine(s) in response to the source question. This feedback process may repeat, as noted above, until some question diversity criterion is met (e.g., some minimal number of distinct augmented questions). Thus, in such embodiments, the generative LLM engine(s) realize the "stripping down", "expanding", and "verification" processes discussed in relation to FIG. 3, and may also form the basis for covering more general instantiations, as a way to cover LLM augmentations in general. Accordingly, in embodiments in which a generative LLM is configured to generate the set of augmented question, the required output characteristics for a resultant augmented questions may include a parameter specifying whether the resultant augmented question is to be expanded, stripped, or retain a substantially unchanged level of verbosity relative to the source question (or preceding question if the next augmented question is based on an earlier augmented question from an earlier iteration).

Upon completion of the augmented question generation process(es), the initial question and/or the resultant augmented questions (maintained in the augmented question set 352) generated for that question are used (at block 360) for training the question-answering framework (such training is typically performed with a training content passage that is paired with the initial question(s) and/or the augmented questions generated by the question augmentation framework 300) and/or for ingesting source documents.

Thus, in various examples, a question-and-answer (Q-A) system that includes one or more memory storage devices to store one or more documents, and a processor-based controller communicatively coupled to the one or more memory storage devices are provided. The controller is configured to obtain a question dataset comprising one or more source questions for document processing by a machine learning question-and-answer system that provides answer data in response to question data submitted by a user. The controller is further configured to modify a source question from the question dataset to generate one or more augmented questions with equivalent semantic meanings as that of the source question, and process a document with the one or more augmented questions. In some embodiments, the controller may further be configured to analyze the source question to determine a specificity level for the source question.

Figure 4:
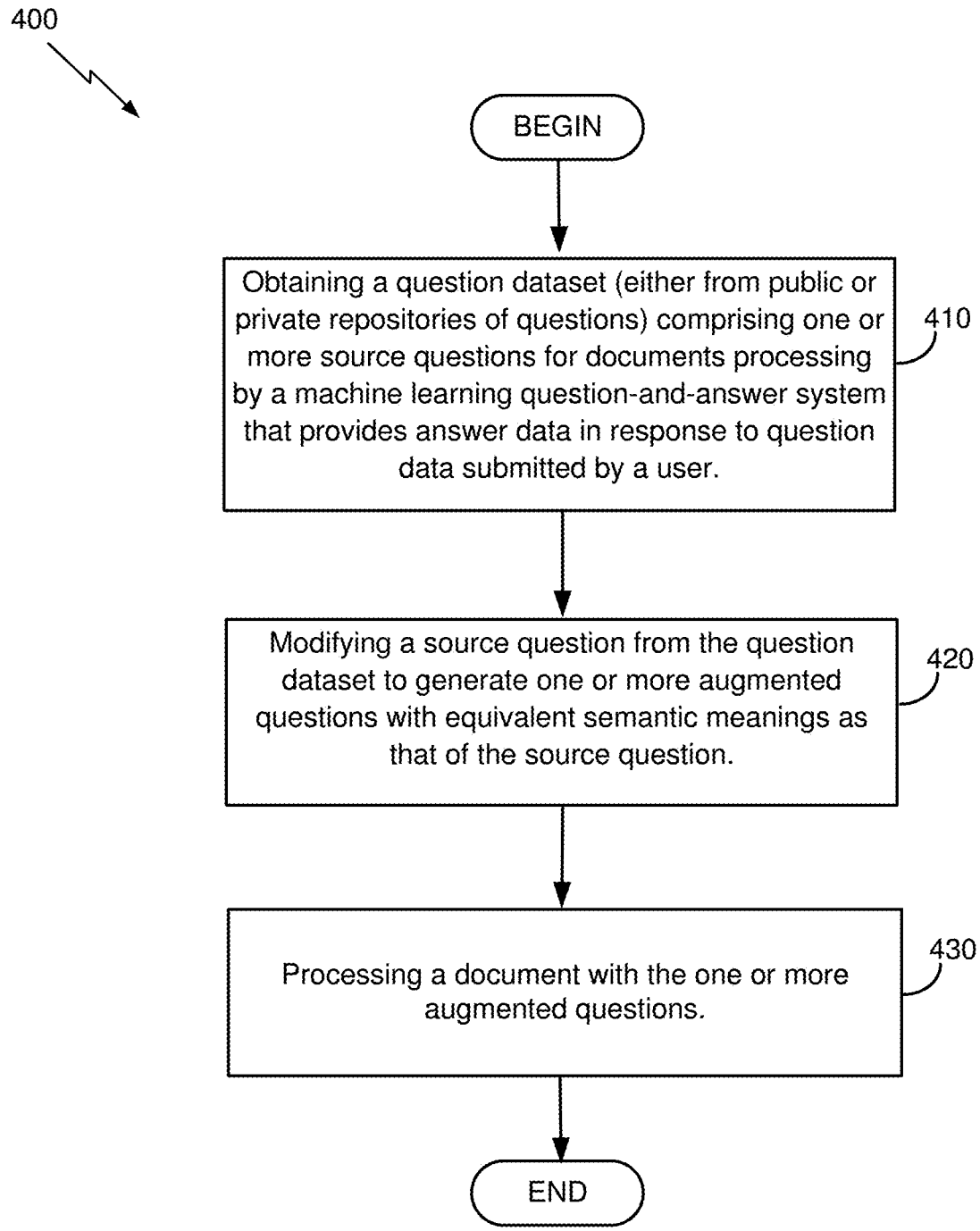
FIG. 4 is a flowchart of an example procedure for document processing (particularly during training and ingestion time) of a machine learning question answering system, and for ingestion of documents.

With reference next to FIG. 4, a flowchart of an example procedure 400 for document processing (particularly for training of a machine learning question answering system, and for ingestion of documents) is provided. The procedure 400 includes obtaining 410 a question dataset (either from public or private repositories of questions) comprising one or more source questions for document processing by a machine learning question-and-answer system that provides answer data in response to question data submitted by a user. The procedure 400 further includes modifying 420 a source question from the question dataset to generate one or more augmented questions with equivalent semantic meanings as that of the source question, and processing 430 a document with the one or more augmented questions.

In some embodiments, the procedure 400 may further include adding the one or more augmented questions to an augmented question dataset. Processing the document with the one or more augmented questions may include one or more of, for example, training the machine learning question-and-answer system using the document and the one or more augmented questions, and/or ingesting the document with the one or more augmented questions, subsequent to completion of the training of the machine learning question-and-answer system, to generate an ingested document that is searchable by the machine learning question-and-answer system.

In various examples, the procedure may further include analyzing the source question to determine specificity level for the source question. Analyzing the source question may include one or more of, for example, determining a word count for the source question, determining intent associated with the source question, and/or classifying the source question using a machine-learning question specificity model. Analyzing the source question may include determining the source question is one of overly verbose or overly terse based on a comparison of the determined specificity level to one or more specificity threshold values. Modifying the source question may include simplifying the source question, in response to a determination that the source question is overly verbose, to exclude one or more semantic elements of the source question to generate a terse question with an equivalent semantic meaning to the source question. Simplifying the source question may include excluding the one or more semantic elements of the source question according to one or more of, for example, a term-weighing scheme to assign values for words appearing in the source question, and/or one or more natural language processing (NPL) rules applied to the source question. The term-weighing scheme may include a term frequency-inverse document frequency (TF-IDF) scheme. In such embodiments, simplifying the source question may include computing weight values for the words appearing in the source question according to the (TF-IDF) scheme, and removing one or more of the words appearing in the source question based on the computed weight values, and subject to the NPL rules.

In various examples, the source question may include unstructured keywords, and modifying the source question may include expanding the source question, in response to a determination that the source question is overly terse, to include structural components for the unstructured keywords. Expanding the source question may include determining a statement of intent and/or other contextual information associated with the keywords of the source question, and adding to the source question semantic structural components determined based on the statement of intent and/or other contextual information.

As noted, in some embodiments a generative LLM (such as ChatGPT, or some proprietary large language model) may be used to generate question variants with similar semantic meaning as the source question being modified. In such embodiments, modifying the source question may include generating a question variant message comprising the source question and one or more required output characteristics for a resultant augmented question paraphrasing of the source question, and providing the question variant message to a generative large language model system configured to generate a resultant augmented question based on the source question and the one or more required output characteristics. As noted above, in some implementations the generative LLM engine(s) can be tasked in generating most (or all) of the augmented questions to be used, in which case the one or more required output characteristics may also include one or more parameters to specify whether, for example, the generated augmented question is to be a stripped (tersified) version or an expanded version (or retain the same level of verbosity) of the question being inputted to the generative LLM engine. Additional parameters could include verification parameter(s) to verify the requirements/constraints that resultant augmented questions need to conform to.

In some examples, generated augmented questions (produced by any one of the different processes described herein in relation to FIG. 3) may be iteratively re-fed to the input of the query-producing process to further produce possible question variants (thus improving the efficacy and robustness of the training and ingestion operations of the searching system). In such examples, the procedure 400 may further include iteratively modifying the one or more augmented questions to generate additional sets of augmented questions with similar semantic meanings as that of a preceding set of augmented questions. As discussed herein, this iterative process may continue until some condition or constraint (e.g., based on an information diversity criterion) is satisfied, or may terminate after some pre-determined number of question augmentation iteration/cycles have been completed. The variants produced may be, in some examples, vetted by a verification process to ensure, for example, that the variants meet some linguistic and grammatical constraints, that all variants are sufficiently different from each other, etc.

4 Auto Metadata Tagging

Embodiments described herein are directed to automatic inclusion (i.e., appending or tagging) of contextual information (labels/metadata, such as the file or document names, section headings, user-related information, concepts determined from ontologies, and so on) to content portions of a document, and subsequently filtering or evaluating Q-A search results based, in part, on matching current contextual information added to (or associated with) a query, and the contextual information previously added to the content portions. The tagging of content portions defines a contextual "scaffolding" built around individual content portions of a document to facilitate the searching process, and promote better matches. The metadata tagging implementations can be performed manually or automatically to append contextual information to various content portions (optionally in some selective, controlled manner). Contextual information can be added to both content (during ingestion time), and to the query (during inference/search time), and can be used to filter search results based, in part, on the level of matching between query-related contextual information and previously included (appended or tagged) contextual information added to the content portions. The filtering of search results can either be used to weigh the results (e.g., reduce or increase the match score) or to eliminate certain results as likely not being relevant to the query. Accordingly, various embodiments described herein include a proposed framework for tagging content that is made available to be searched (e.g., using the question-answering information retrieval system implemented through the document processing agent 110 of FIG. 1) to improve the quality and efficiency of subsequently submitted searches. The proposed tagging operation can be realized using the document ingestion engine 126 (e.g., through one or more pre-processing processes performed on source content being ingested), while the searching operations may be realized using, for example, the query processing module 136 of the Q-A system 100. The framework may thus include a processor-based controller, coupled to memory devices, configured to determine contextual information associated with a document comprising multiple content portions, and tag one or more of the multiple content portions with metadata elements determined based on the contextual information (e.g., the contextual information is converted to metadata that typically has some pre-defined structure). By tagging content (that is added to, for example, the repository 140) with contextual information data from the document, answer data may be identified in response to query data submitted (at a later point) by a user based, in part, on the metadata elements tagged to the one or more of the multiple content portions of the document.

Getting from a query to the most relevant response requires more information than is in either the query or the data itself. Neither lives independently—both are in contexts. For a query, the context can include the dialog up to the point of the query and a profile of the user. Context for the data can include the source of the data, information provided by data owners, information elsewhere in a document, such as title and headings, information about the creation of the data, such as author and date, and so on. Such information is important for getting accurate, relevant answers. Additional details regarding the use of contextual information in Q-A system is provided, for example, in WO 2021/263138, titled "Document Processing and Response Generation System," and in U.S. Ser. No. 18/083,733, titled "Contextual Clarification and Disambiguation for Question Answering Processes," the contents of which are incorporated by reference in their entireties.

The proposed solutions described herein are configured to discover and attach the appropriate metadata to content, and then extract and retain that data from the user context in order to use it to improve search relevance (when a query/search is submitted). There are four principal steps to the metadata tagging and search process: 1) designing or constructing an ontology of types and values of the relevant information required, 2) discovering information in the content or extracting it from relevant sources to assign it as metadata to the content being queried, 3) extracting information from the context and/or query at retrieval time, and 4) using that data to improve the searching operations and relevance of the results.

4.1 Ontology-Based Contextual Information

As noted, one way to discover contextual information associated with a particular content portion is to determine a concept (e.g., in the form of a category-value pairing or tuple) associated with the content portion. An important aspect of the ontology-based processing is to capture the important dimensions in a domain and the relationship among them. Some of these are general across a domain (such as "operating systems" domain, since a procedure is often different depending on whether it is being done on MacOS or Windows) or specific to a company (such as a hierarchy of product types), or some other type of entity. Frequently, pre-determined ontologies for different subject matters (arranged as a list of concepts, or as a hierarchical data arrangement) are available, and upon determining a relevant ontology for the particular content portion (or to the document that includes that content portion), the relevant ontology is retrieved. Relevance of an ontology to a document (or a portion of the document) can be determined using machine learning relevance model, based on keyworks that may appear in a summary of the document, based on information directly provided by a user as to which subject matter (or ontology) the document is related to, or based on other pieces of information.

In various examples, the identification of an ontological concept(s) can be accomplished, for example, using a machine learning (ML) engine for concept identification. Such an ML engine may be a separate/independent system from the machine learning engine performing the query on the Q-A system 100 (through, for example, a machine learning system implementing a vector transformation mapping a natural language query into an embedding/vector space). A resultant modified query terms that include contextual information (such as an ontological concept) can then be processed by the query processing module 136 of FIG. 1 (e.g., transforming the modified query into a vector representation in an embedding space implemented according to one or more vector transformation language framework such as BERT). An ontology of concepts can be as specific or as coarse as desired, depending on the desired implementation and availability of training data and ontologies.

Metadata elements can be identified in order to match a user in a particular situation to an answer in the content. In various examples, ontologies may define a hierarchy of contextual information. For instance, a product (such as a computer) may define a top level. That product may be related to different series, which are defined at a lower level, and each series may have multiple model families, which in turn are associated with specific models defined in a lower level below the families level. At the lowest level (the leaves of the hierarchical tree) a product ontology may include serial numbers for each of the models. The elements for the metadata may be category-value pairs, e.g., a label from a pre-determined ontology or library of concepts, followed by a value that may be representative of some specific sub-label on a spectrum defining the label that was selected. In some examples, the values paired with a determined category label may be a category label at a lower hierarchical level to that of the determined concept.

The information in the ontologies can thus be used to tag content portions depending, in part, on the semantic nature of the content (as may be discovered through, for example, a machine learning model to recognize the semantic concepts in a content portion). Semantic meaning identified in the content can then be used to select information from the ontology to tag some or all of the content portions of the source content. The tagging of content portions with ontological labels can subsequently be used to enhance the quality of a search by not only performing a semantic match between a question and an answer, but also matching based on the tags (e.g., matching a category label determined from a query, to content that was tagged with the same or similar category label). The ontologies used for metadata tagging can either be provided by a user or can be constructed automatically (e.g., to generate a hierarchical ontology structure that arranged concepts or categories in a tree like structure where the most specific categories and their values constitute the leaves of the tree). Ontologies can be constructed/generated automatically from an entity's available documentation of its products, services, and technology, e.g., using a company's catalog of products and services to generate a hierarchical ontology that defines the relevant products, services, and concepts of the company, and how they relate to each other (e.g., what models are associated with a particular product line). Some contextual information can be inferred based on the content and/or ontologies provided.

Figure 5:
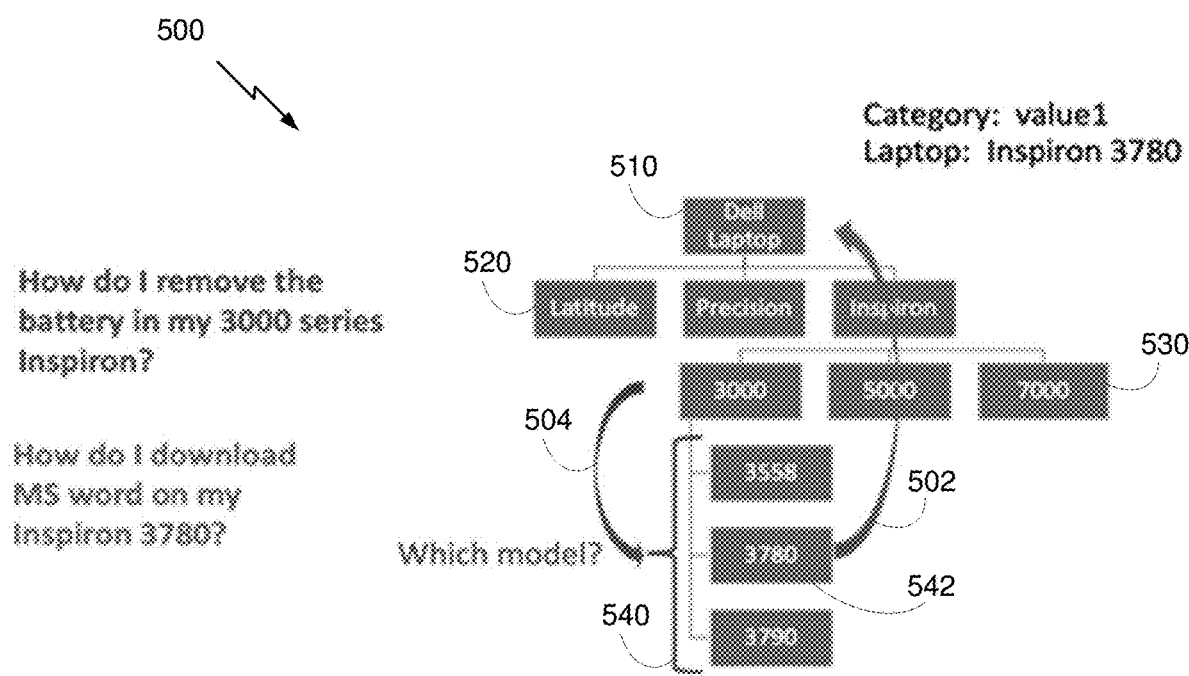
FIG. 5 is a diagram depicting part of an example hierarchical arrangement of a product (in this case, laptops) that is used for automatic metadata tagging.

Consider the example of FIG. 5 showing a diagram 500 depicting part of an example hierarchical arrangement for a product (in this case, laptops). This particular type of product may be associated with different families (Dell Inspiron vs. Dell Precision), and each such family may be associated with multiple series (3000, 5000, and 7000 for the Inspiron family). Each such series may, in turn, have multiple different models (e.g., Dell Inspiron 3558). Different types of information can be associated with different levels of the hierarchy. Suppose that a particular content portion is analyzed to assign it a concept that represents that the type of general product, e.g., one of a printer, a monitor, a tablet device, a laptop, a desktop, or any other type of product that may cover the range of products that some particular computing company (for example, Dell™) manufactures or sells. Assume that it is determined that the particular content portion being analyzed deals with laptops (as may be determined by a machine learning ontology model). In this example, the category label that would be selected for the content portion may be "Laptop" (as shown in the right-top part of the diagram 500). The category label may next be assigned a particular value representative of a more detailed concept description of what the particular content portion pertains to. The same or different machine learning ontology model may be used to map the content portion to one of the concepts in the hierarchy shown in the diagram 500. In this example the concept value is determined to be "Inspiron 3780" and thus the ontology-derived "category:value" pair (2-item tuple) is "Laptop: Inspiron 3780." It is to be noted that the ontology (e.g., implemented as a machine learning classifier) represented by the diagram 500 may have been retrieved after it was determined, using a top level ontology (to first map a content portion to one of several general product types) that the particular content portion analyzed relates to laptops. The lower-level ontology retrieved is then used to compute a value to be paired with the determined top-level concept (if one of the sub-concepts depicted in the lower-level ontology cannot be matched to the content portion, a default value may be assigned to the category label). The process of determining the category tuples can continue, depending on the desired level of specificity, for further sub-level ontologies (e.g., a determination of "Latitude" as the value for the "Laptop" category may cause retrieval of another ontology relating to Latitude laptops), or the concept identification process may stop at the level shown in FIG. 5. In some embodiments, the value paired with a label may be computed according, for example, to some closeness criterion between the label identified as representative of a content portion and the content (e.g., the value paired with the category label may be a numerical value indicative of closeness of the category label to the content portion).

A hierarchy of categories can support clarification dialogs and other means of getting from some concept to the key category value pair. An ontology may include a list of types (or categories) and values that are relevant and that will provide the scaffolding in the documentation that will be extracted from the queries. Discovered information can be assigned to multiple portions of the content (and possibly assigned throughout the content). Discovered information may be used to tag multiple (and possibly all) content portions/chunks of a document when the information has an importance level exceeding some threshold. For example, if the discovered information includes a concept (in the form of a category label, and an associated value), the importance of the concept may be indicated by its hierarchical position in the ontology. Contextual information with a high importance value (be it an ontology concept, information extracted from the content such as document headings and markers, and so on) may be tagged to multiple (and possibly all) content portions, while less important concepts/category labels (whose hierarchical position may be at a hierarchical tier that is lower than some threshold value) may be tagged only to the content portion (and possibly closer neighboring portions) in which the contextual information was discovered.

As will be discussed in greater detail below, at retrieval time, the query contextual information is compared to the content contextual information (i.e., the metadata tags). The query contextual information can be extracted from the context of the query (e.g., recently used contextual information, username, user group, etc.) at the time of the interaction (i.e., query time), or directly from the query (if contextual information was directly embedded into the query as augmented query data). Query contextual information may also include an ontology label similar to the one used to tag content.

Ontologies can also be used to define a hierarchy of intents. For example, a piece of software, listed in an ontology, is an item that typically gets downloaded by a user. Therefore, the piece of software may be associated (at the same or at a lower hierarchical level of the software) with a value of "download" and content associated with the piece of software can be tagged with that value. Conversely, a hardware product (e.g., a memory chip) is an item that needs to be bought, and thus ordered, and therefore that hardware product may be associated with a contextual intent of "ordering" (a concept can be associated with multiple intents). There may be a lot of linguistic significance to the specific ontological level that is determined to be associated with particular content. The nature of identified objects can themselves suggest implicit contextual information about the object.

The ontology of FIG. 5 can also be associated with intent information (although not shown in FIG. 5). In the example of FIG. 5, the concept of how to download MS Office might be associated at the laptop level. Lower hierarchical levels of the ontology of FIG. 5 may, on the other hand, be associated with various types of troubleshooting intent concepts. For example, the concept of how to change a laptop's battery may be associated with the model level of the hierarchy, while troubleshooting some other particular problem might be associated with the series level entries of the ontology. Users do not necessarily know which level they should be asking about, so if a user submits a query asking how to download MS Office on the Inspiron 3780, the mention of the laptop can cause the search engine to prefer answers that specifically mention this model and miss the general procedure. As a result, the identified query answers for a query for a software downloading procedure that includes a specific model may results in a relatively small number of answers and/or answers with matching scores that are below a required threshold (or alternatively, the searching operations may yield an insufficient number of answers that have respective matching scores exceeding the required threshold).

The use of ontology concepts to tag content portion can mitigate some of the challenges associated with searching content based on functional intent. Since, for this example, the downloading procedure of the MS Office suite is generally discusses in relation to the laptops, rather than specific families, series, or models, queries that include specific functional intents may be processed by matching the query intent (e.g., "how to download") to metadata elements of content portions, in which the metadata element includes the intent indicated by the query, or includes an ontology concept that is associated with the intent indicated in the query. That is, using an ontology similar to the one shown in FIG. 5, a content portion may have been determined (or mapped) as being associated with a concept of laptop. If the content portion does not discuss a s specific laptop brand, family or model, then an intent associated with the top level entry (e.g., the node 510) of the example ontology 500 (e.g., the functional intent may be downloading apps or programs) may be used to tag the content portion. However, if the ontological analysis performed on the content portion determined that the content portion is more specifically associated with an Inspiron 3780 laptop concept, the content portion may have been tagged with an intent associated with the entry/node 542, or with a more generalized intent associated with the level 540 of the ontology 500 (e.g., "how to configure the screen"). The tagging of concepts and/or intents associated with the ontological concepts can thus direct the query to answers that discuss downloading, but do not mention a model a name, even if the query specified the model name.

Alternatively and/or additionally, in various examples, a content portion may also be analyzed to determine function or structure concepts/categories associated with the content portion. For example, a particular content portion can be analyzed (e.g., by a machine learning model that may be different than the ontological model described above) to classify the content into one several categories that describe the type of information (rather than subject matter) that the content pertains to. Examples of information type categories that the analysis procedure (typically performed during ingestion-time, but may be performed at later times, including during run or search time) include "procedure" (e.g., some action or operation performed in relation to the subject matter concepts associated with the content portion), "definition," "specifications," "recommendation" (as may be determined by a machine learning classifier, or via a linguistic analysis looking for keywords such as "recommendation," "suggestion," etc.), "time frame," "person/department," and other types of information that the content portion may encompass. The identified information type for the content portion can then be used to tag the content portion (e.g., by adding a metadata to the source content of the content portion or to the ingested representation of the content portion), or to include the information type as part of the content that is to be ingested (e.g., converted to a vector space representation using a language transform model). For example, a content portion discussing a procedure to replace a lap-top battery may be classified as a "procedure" information type, whereas a content portion discussing a specific battery required for a particular laptop may be classified as a "specifications" information type. In some situations, a content portion may include multiple types of information, and thus the content portion may be tagged with every appropriate classification category that the content portion pertains to. In situations where only one classification is allowed, a classification or relevance score may be generated for each classification (e.g., based on a relevance criterion), and the information type with the highest score can then be used to tag the particular content portion).

Subsequently, at search time, a question-based query submitted by a user may undergo a similar analysis as that performed on the content portion. Thus, a machine learning classification model, or some other type of lexical or natural language processing analysis, is performed on the question comprising the query data to determine a likely question type that is analogous to the information type classifications used for content portions. Accordingly, here too, the analysis may yield a classification(s) such as, for example, "procedure," "definition", "specifications," "recommendation," "time frame," "person/department," etc. For example, a question such as "How do I replace the battery?" may be classified as relating to a "procedure" type question, whereas a question such as "which battery can i use in my laptop xxx?" would be classified as a "specifications" type question.

Having determined the question type classification for the query, the searching procedure may proceed by, in some embodiments, searching for appropriate answers from content portions whose information type classification matches the question type. In the example of the question of "How do I replace the battery?" that yielded a classification of "procedure," the searching operation may focus on or prioritize searching ingestion content portions that have been tagged with an information type of "procedure." As noted above, the searching may also focus on content portions that relate to the ontological concept of battery (e.g., focusing on model level ontological terms of a laptop-based ontology), and otherwise match question-related contextual information to contextual information included in tagged metadata elements of the content portions being searched.

Thus, in various examples, for the proposed tagging framework discussed herein (comprising a processor-based controller coupled to memory devices), the processor-based controller configured to determine the contextual information may be configured to determine one or more concepts, from an ontology of concepts determined to be relevant to the document, representative of semantic meaning of a particular content portion from the one or more content portions. In such embodiments, the controller configured to determine the one or more concepts representative of the semantic meaning of the particular content portion may be configured to determine, for each of the one or more concepts, a concept tuple comprising a category label and a respective category label value determined from a plurality of values associated with the determined category label.

In some examples, the controller configured to determine the one or more concepts representative of the semantic meaning of the particular content portion may be configured to determine intent-of-use concept associated with the particular portion, the intent-of-use concept being representative a common activity or use associated with one or more of, for example, the particular content portion and/or at least one of the one or more determined concepts for the particular portion. In some implementations, the controller configured to determine the one or more concepts may be configured to determine the one or more concepts based on a machine learning ontology model configured to generate predicted labels, representative of the one or more concepts, in response to inputting at least part of the particular content portion to the machine learning ontology model.

4.2 Extracting Contextual Information from Other Sources

In addition to determining concepts, as described above, contextual information (based on which data elements are derived to tag or complement data content) can be identified in other ways. For example, people organize their files into folders and those folders identify or suggest some categories. Those folders may be associated with different versions of a particular item (e.g., folder 1 corresponds to version one, folder 2 corresponds to version 2, etc.) which also provides contextual information. Other sources of contextual information include, for example, tags embedded in HTML objects, features that are automatically generated when a document is generated (e.g., author, date, and time the document was created, etc.) In additional examples, the users themselves may expressly provide contextual information (e.g., "This is an X, and this is a Y"), and it can thus be inferred that that information is especially important (because the user went to the trouble of specifically providing that information), and therefore that information (or associated information defined in an ontology) should be added to the metadata to tag the appropriate content portions.

Thus, a second stage of the metadata tagging framework (which may be performed sequentially or concomitantly with performance of the ontology-based first stage) includes extracting express or implied contextual information and assigning metadata, derived from that extracted contextual information, to content portions. Contextual information, to be added as metadata, is defined broadly. Contextual information associated with a query can be similarly broadly defined, and can thus allow a big range of information to be used in matching queries and content data (to compute matching scores, or filter out certain data portions).

Assigning the appropriate metadata to content may be done in a number of ways. In some cases, it can be done entirely automatically, such as recognizing titles and headings in documents or using an entity extraction process to pull the information from the content. In others, semi-supervised methods can be used, for example, pointing the system to specific locations for specific kinds of metadata, such as elements of the URL or file path, tags embedded in html, or data associated with documents, such as creation date. In yet other examples, the information has to be explicitly supplied, for example by data owners creating tables associating specific files with specific category/value pairs to be assigned in the metadata.

As noted with respect to the concept-determined contextual information, some contextual information, such as a title of a document, heading, special instructions or warnings (e.g., "boiler rated to operate at a maximum of 30 PSI") etc., may be important enough (in order to obtain good answers to queries or to avoid dangerous or inappropriate answers) that that information can be used to tag every single paragraph (content portion) of the document (or at least some large percentage of the content portions). By tagging every (or most) portion with that information, important contextual information can be placed in closer proximity to the content portions of the source document. Thus, in some examples, the derivation of tagging elements to associate with the content portion may also include determining importance level of a particular contextual information item. The importance level of contextual information items can be defined according to various rules that designate certain contextual information items as being important (e.g., in terms of facilitating searching), and other contextual information items as being less important. Such rules may include pre-determined sets of rules developed over time for large sets of data. The importance level rules may evolve over time, thus requiring that the rules be occasionally updated. In some embodiments, the importance rules can be implemented through a machine learning model that yields importance values for various contextual information items/elements, in response to input data that includes the contextual information items (or some subset thereof) and content portion(s) associated with those contextual information items. Based on the computed importance levels for the various contextual information items, items with low importance values (e.g., below some low-value threshold) may be disregarded (i.e., they do not need to be used to derived metadata tags). Items with high importance values (e.g., exceeding a high-value importance value), such as headings and titles in a document, may be used to tag several (and in some cases all) content portions of the document. For example, it may be desirable to preserve knowledge that a particular passage in a document is part of a particular section or chapter in the document, in which case all the content portions (chunks) in a particular section may be tagged with a metadata element representative of the section heading of the particular section. Items with medium-level importance values (e.g., between the low-value and high-value threshold) may be used to locally tag content portion (e.g., the content portion associated with the particular contextual information items, and/or some neighboring content portions).

Accordingly, for the proposed tagging framework discussed herein (comprising a processor-based controller coupled to memory devices), the processor-based controller configured to determine the contextual information may be configured to determine one or more of, for example, document-related contextual information and/or content-embedded contextual information included within content of the document. Examples of document-related contextual information may include one or more of, for example, storage-information representative of storage location of the document and/or origin information representative of creation information of the document. Examples of storage information may include a network address corresponding to the source location of the document and/or a file path for the document within a storage device. Examples of origin information may include one or more of, for example, date of creation of the document, time of creation of the document, authorship of the document, and/or version number of the document. Content-embedded contextual information may include one or more of, for example, tags embedded in HTML objects within the document, user-inserted non-renderable information included in the document (e.g., information that would generally not be presented on a user interface when the document content is presented, even though the user who created the content added that information to, for example, capture some important observation), or content headings and markers.

As noted, the importance of certain contextual items may inform a decision to tag several content portions with elements derived from those important contextual items. Thus, in some examples, the controller configured to determine the contextual information associated with the document may be configured to determine high-importance contextual information associated with one of the multiple content portions of the document, and tag the one of the multiple portions of the document and at least one additional portion of the multiple content portion with metadata derived based on the determined high-importance contextual information.

In various embodiments, metadata elements can either be used to tag a content portion, or to have the information directly incorporated into the content (as renderable or non-renderable content data). Therefore, in such embodiments, the controller configured to tag the one or more of the multiple content portions with the metadata elements (determined based on the contextual information) may be configured to perform one or more of, for example: a) include a metadata element determined for a particular content portion as a separate data structure linked to the particular content portion, or b) add the metadata element for the particular content portion into the particular content portion to generate a resultant combined content portion. When contextual information is incorporated into the actual content (whether in renderable or non-renderable form), identification of answer data to the query submitted in relation to the document requires the controller to determine a matching level between the query data and the resultant combined content portion comprising the content portion and the added metadata element.

4.3 Query Contextual Information and Searching Operations

Tagging content portion with data elements (e.g., metadata elements) derived based on contextual information (by determining an associated ontology concept(s) to content portions, or from available sources of contextual information) is generally performed during ingestion time when a source document is processed to convert it into a searchable document. The tagged data elements can further facilitate searching operations for a later executed query submitted by a user. Under one approach, the query data is used to identify not only matches between the content searched and the query language, but also between the tagged data and the query language. Under a second approach, contextual information for the query can be used to determine potential responses by matching determined query contextual information to the contextual information of content portions and/or matching the query contextual information to content portions.

Thus, under the proposed framework, the searching stage includes first extracting, or otherwise determining, contextual information associated with the query. In some cases, the user explicitly includes the information in the query and the query processing has to extract it using, for example, a grammar or model built in advance. In various examples, contextual information can be extracted from a previous query, or may be passed in with the query from an outside source, or may be available in a "user model." There also might be default values set, such as constraints like "most recent." In some cases, the system can appreciate that a particular piece of information is required to answer a question and the user is explicitly queried for that information (as further discussed in U.S. Ser. No. 18/083,733, entitled "Contextual Clarification and Disambiguation for Question Answering Processes").

In situations where the query submitted is overly-terse, and may be lacking a statement of intent (or some other appropriate query-formulating wording), the question-answering system (e.g., through the interactive user query interface 130 or through the query processing module 136 depicted in FIG. 1) may be implemented to modify the query to fill the missing intent, or other information that may be needed to have a properly defined query/question for processing by the query processing module. For example, supposed that the user submits a terse query such as "Dell laptop." This query lacks a statement of intent, and would result, if executed, in an unwieldy number of responses. However, if previously submitted queries by the user were directed to buying (shopping) various other computing devices, the question-answering system may infer (e.g., using a machine-learning system, a rules engine, or some other implementation) that the user is seeking shopping information with respect to the "Dell laptop" that was included in the submitted query. In this example, the query extension process may derive an extended, supplemental query of, for instance, "how much does a Dell laptop cost in stores near me?" or "where can I buy a Dell laptop near me?" Other examples of contextual information that can be used to modify the query (e.g., to add query-formulating expressions) include contextual data associated with the query or user (such as location information, personal and device information associated with the query submitted or the user, etc.), information associated with recent query transactions (including the query text of recently queries submitted by the user or a group of users), information captured through various sensors on devices used by the user (e.g., image information showing the scene being viewed by the user, or showing captured barcode or QR codes), and so on.

In yet further examples, contextual information may also be inferred through the use of a relevant ontology, that may be similar to the one that was used to determine ontology concepts to tag content portion of the document (or set of documents) that are now to be searched. Thus, in such examples, available contextual information and/or a machine learning model may be used to identify the broad subject matter that the query relates to. The determination of the broad subject matter (e.g., computing products manufactures or sold by some particular company) can then be used to determine a relevant ontology that is to be used to generate concepts associated with the query (such an ontology may be implemented, as noted above, as one or more machine learning models that are configured to output concepts, or category labels, associated with one or more different hierarchical levels of the ontology). The submitted query data, along with one or more available contextual data items (depending on what the input of the machine learning model is expecting to receive), are provided to the ontology model, which then outputs, in some examples, a "category: value" tuple. The "category:value" tuple consequently becomes another piece of query information that is used to perform the searching operation on the data collection. As will be discussed in greater detail below, the query-related ontology concept(s) generated/predicted by the model can be used, along, with the other contextual information items to either filter out certain search results that would have been produced without the use of the contextual information (e.g., by excluding responses/answers whose associated tagged elements do not match some or all of the query contextual information elements), or by using the contextual information (including, for example, determined query ontology concepts) to score the matches. For instance, returned answers associated with tagged elements that poorly match the contextual information determined for the query will be downweighed or scored more poorly than what their scores would be based strictly on matching the query data to the content.

Having determined query contextual information, the next stage involves using the determined contextual information to identify and return more relevant results. Information captured from the query or context can be used in multiple ways. One way is to apply a strict filter on the content. That is, only data tagged with the matching metadata is returned to the user. This can be a strict match, or it can disallow conflicts (e.g., same category, different values) but also return anything not tagged with that category, such as general information. Another way is to incorporate the information into the search itself, for example, appending this data onto the query and letting the IRQA (information retrieval for question answering) procedure/algorithm provide the best matches (e.g., highest scoring matches). Under the latter approach, the process includes determining search results for a query augmented with contextual information, and computing matching scores for the search results based, in part, on the matching level between the contextual information in the query and the contextual information appended to content portions of a searchable document being searched. Presumably, queries and content portions that share a greater level of contextual information will be associated with higher matching scores.

To illustrate operations of the proposed metadata tagging framework, consider an example where the user is submitting a query asking for information about a certain laptop model, and that laptop model is associated with five different variants. The Q-A system may also determine that in a previous query submitted by the user a specific one of the five variants was mentioned. In a situation where contextual information is used to filter out answers, answers that include metadata tags with a category label matching the laptop model specified in the query, but not matching the specific variant previously specified by the user will be filtered out. Alternatively, instead of filtering out answers associated with metadata tags that do not exactly match the contextual information available (e.g., the specific laptop model variant mentioned by the user in an earlier query, or some other information like creation date/time value that would favor content that is more recent), the contextual information can be used to compute the matching scores for answers that are otherwise identified as providing relevant information (based on semantic similarly, e.g., determined in a vector transformed domain with matching scored computed using, for example, vector distance metrics such as a transform-based distance (TBD) scores), with answers that are associated with metadata tags that more closely match the current query contextual information being scored more favorably.

An example of contextual information that may be used to filter out answers rather than to influence the matching score is location information for the user (or device) submitting the query. Suppose the user is asking for content that may have been tagged as confidential. In this scenario the Q-A system may not allow (i.e., it will filter out) delivery of answers to a user located in a public place (e.g., in a café) with no VPN, but may allow delivery of the result if the user is at the office or at home. On the other hand, questions about non-sensitive (or non-confidential) information may result in the location information being used to score the answers, but will not filter out any answers. For example, an HR-related question (e.g., "How much time do I get for maternity leave?") can be delivered to any location where the user is located. However, answers to HR-related questions can be location-dependent (there would be a different answer for users living in "Massachusetts" than for users living in North Carolina), and thus the particular location of the user (e.g., if the user lives in Massachusetts) will determine, in part, the score of potential answers (answers that are tagged with the metadata Massachusetts or mention in their respective contents "Massachusetts") will be scored more favorably for a user associated with Massachusetts (according to a scoring scheme that takes closeness of metadata matches into account). In this example, because the query relates to an HR issue it does not matter where the user is submitting the query from, but the home state of the user might matter (and thus the user's location is important to the extent that it provided a clue as to what state the user lives in).

As noted, in various examples, contextual information may be directly added (baked-in) to a query, and so the Q-A system (e.g., a query processing engine/module) may modify a submitted query to include query terms derived from contextual information. In the HR question example above, the query processing engine may directly add the word "Massachusetts" to the query "How much time do I get for maternity leave?" upon determining that the user submitting the query is currently located in Massachusetts.

Thus, under the proposed contextual information framework described herein, contextual information is merged into questions and answers to improve searching performances. Such contextual information may be discovered from various implicit sources, e.g., location information such as a user's IP address, positioning data determined on the user's mobile device (e.g., GPS information), previously submitted queries, and so on. Additionally, some contextual information may be determined from ontologies (based on user provided classifications, or based on automatic determination of the appropriate labelling for a content portion using the terminology defined in the ontologies used). As noted, ontologies may be provided as hierarchical (tree-like) arrangements in which the labels selected for tagging the content corresponds to one of the nodes (an interior node, or a leaf node) in the hierarchical arrangement.

Accordingly, for the proposed framework discussed herein (comprising a processor-based controller coupled to memory devices), the processor-based controller (e.g., implementing the query processing module 136 and/or the interactive user query interface 130 of FIG. 1) may further be configured to receive, at a time instance following the tagging, the query data submitted by the user, determine query contextual information associated with the query data submitted by the user, and determine the answer data based, in part, on matching levels of the query contextual information to the metadata elements tagged to the one or more multiple content portions of the document. The controller configured to determine the answer data may be configured to exclude from the answer data at least one of the tagged content portions in response to a determination that the respective metadata elements of the at least one of the tagged content portions do not match at least part of the query contextual information.

In some examples, the controller configured to determine the answer data may be configured to compute matching scores based, in part, on closeness of the query contextual information to the respective metadata elements of the tagged one or more content portions, and rank at least some of the tagged content portions based on the respective matching scores for the tagged one or more content portions. In various embodiments, the metadata elements may include one or more concepts from an ontology of concepts relevant to the document. In such embodiments, the controller configured to determine the query contextual information and to determine the answer data may be configured to determine query concepts, from the ontology of concepts determined to be relevant to the document, representative of semantic meaning associated with one or more query terms of the query data, and to determine the answer data by matching the query concepts to the one or more of the multiple content portions tagged with the metadata elements comprising the one or more concepts from the ontology.

The controller configured to tag the one or more of the multiple content portions with the metadata elements determined based on the contextual information may be configured to add at least some of the metadata elements to respective at least some of the multiple content portions. In such examples, the controller configured to determine the query contextual information and determine the answer data may be configured to modify the query data to include augmented query terms derived from the query contextual information, and determine matches between the modified query data and the at least some of the multiple content portions with the added respective at least some of the metadata elements.

4.4 Overall Operation

Figure 6:
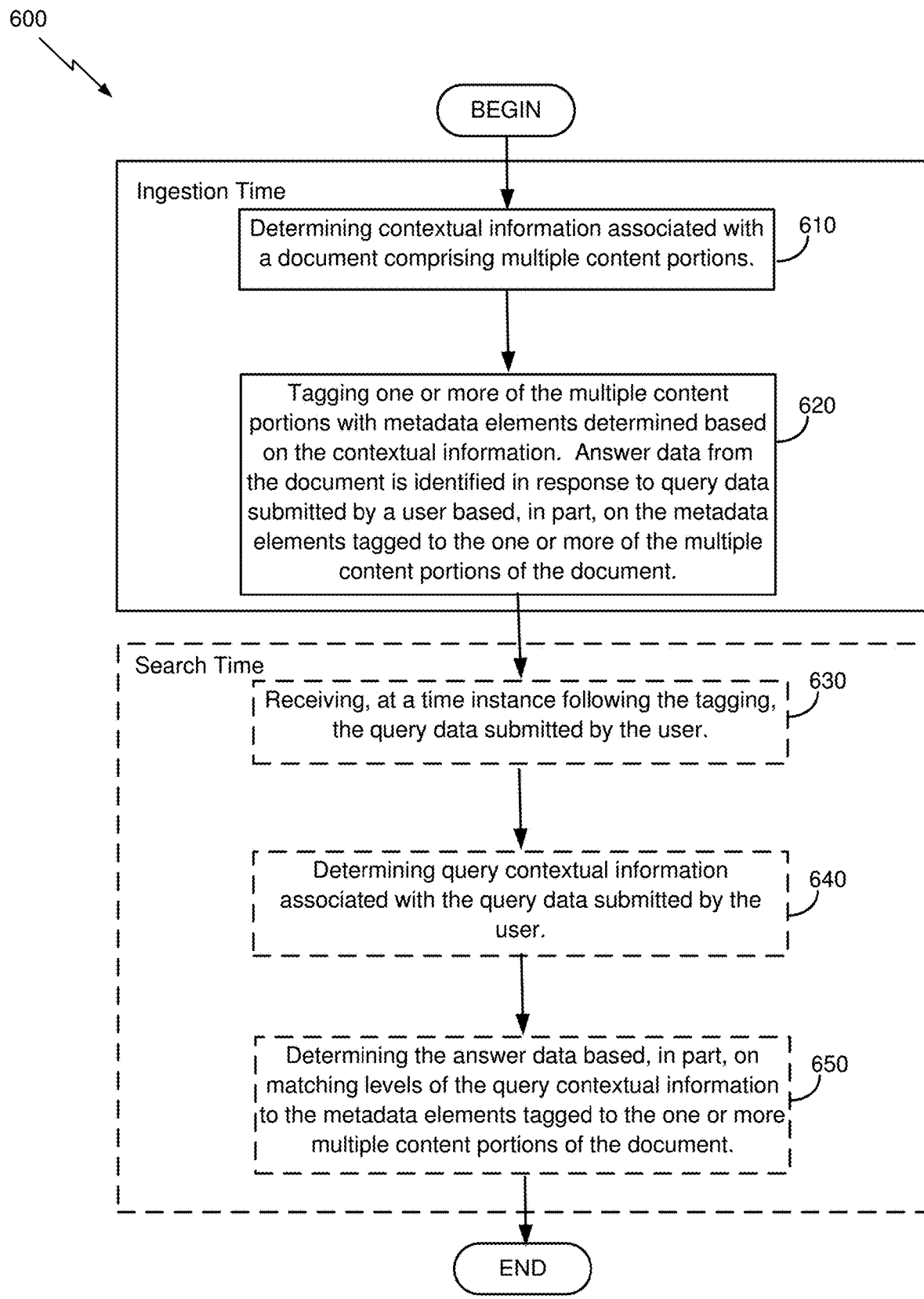
FIG. 6 is a flowchart of an example procedure for facilitating content searching through tagging of searchable content.

With reference now to FIG. 6, a flowchart of an example procedure 600 for facilitating content searching through tagging of searchable content (e.g., ingested according to a language transform model, and stored on a repository such as the DOM repository 140 of FIG. 1) is shown. FIG. 6 illustrates two main stages of operation, with the first one being the ingestion time stage (comprising blocks 610 and 620, during which metadata tagging of a document's content portions takes place) and the search time stage (comprising blocks 630, 640, and 650, during which search and answer data generation operations take place). The two stages are typically independent of each other, with new content (or even existing content) occasionally being tagged with relevant metadata, while the searching stage can be performed at any time to search for matches based on previously tagged content. In other words, tagging operations at some time instance is not needed in order to perform searching operations at that time instance. The inclusion of the two stages in FIG. 6 is done for convenience and illustration purposes only.

Starting with the ingestion time stage, the procedure 600 includes determining 610 (e.g., during ingestion time, when a source document is processed to convert it into a searchable document) contextual information associated with a document comprising multiple content portions, and tagging 620 one or more of the multiple content portions with metadata elements determined based on the contextual information. Under the approach implemented via the procedure 600, answer data from the document is identified in response to query data submitted by a user based, in part, on the metadata elements tagged to the one or more of the multiple content portions of the document.

As noted, different types of contextual information can be used to derive data elements for tagging the content being processed. One type of such contextual information is representative ontological content determined relevant to the subject matter of the content being processed. Thus, in various examples, determining the contextual information may include determining one or more concepts, from an ontology of concepts determined to be relevant to the document, representative of semantic meaning of a particular content portion from the one or more content portions. In such examples, determining the one or more concepts representative of the semantic meaning of the particular content portion may include determining, for each of the one or more concepts, a concept tuple comprising a category label and a respective category label value determined from a plurality of values associated with the determined category label. Determining the one or more concepts representative of the semantic meaning of the particular content portion may include determining intent-of-use concept associated with the particular portion, the intent-of-use concept represents a common activity or use associated with one or more of, for example, the particular content portion, or at least one of the one or more determined concepts for the particular portion. In some embodiments, determining the one or more concepts may include determining the one or more concepts based on a machine learning ontology model configured to generate predicted labels, representative of the one or more concepts, in response to inputting at least part of the particular content portion to the machine learning ontology model.

Other types of contextual information may also be used to derive data elements (metadata) to tag content portions. For example, determining the contextual information may include determining one or more of, for example, document-related contextual information, or content-embedded contextual information included within content of the document. The document-related contextual information may include one or more of (for example) storage-information representative of storage location of the document and/or or origin information representative of creation information of the document. The storage information may include a network address corresponding to source location of the document and/or a file path for the document within a storage device. The origin information may include one or more of, for example, date of creation of the document, time of creation of the document, authorship of the document, and/or version number of the document. The content-embedded contextual information may include one or more of, for example, tags embedded in HTML objects within the document, user-inserted non-renderable information included in the document, and/or content headings and markers.

In some situations, the nature of the tagging operation may be based on how important certain contextual information is (e.g., whether the contextual information is of local importance or is more extensive and affects a more significant part of the content). In such situations, determining the contextual information associated with the document may include determining high-importance contextual information associated with one of the multiple content portions of the document, and tagging the one of the multiple portions of the document and at least one additional portion of the multiple content portion with metadata derived based on the determined high-importance contextual information.

In another example, tagging the one or more of the multiple content portions with the metadata elements determined based on the contextual information comprises one or more of, for example, including a metadata element determined for a particular content portion as a separate data structure linked to the particular content portion, and/or adding the metadata element for the particular content portion into the particular content portion to generate a resultant combined content portion, with identification of answer data to the query submitted in relation to the document including determining a matching level between the query data and the resultant combined content portion comprising the content portion and the added metadata element.

As some time instance (independent of the time instance when the ingestion time operations were performed), the procedure 600 may further include receiving 630, at a time instance following the tagging, the query data submitted by the user, determining 640 query contextual information associated with the query data submitted by the user, and determining 650 the answer data based, in part, on matching levels of the query contextual information to the metadata elements tagged to the one or more multiple content portions of the document.

In various examples, determining the answer data may include excluding from the answer data at least one of the tagged content portions in response to a determination that the respective metadata elements of the at least one of the tagged content portions do not match at least part of the query contextual information. In some embodiments, determining the answer data may include computing matching scores based, in part, on closeness of the query contextual information to the respective metadata elements of the tagged one or more content portions, and ranking at least some of the tagged content portions to the query based on the respective matching scores for the tagged one or more content portions.

The metadata elements may include one or more concepts from an ontology of concepts relevant to the document. In such embodiments, determining the query contextual information may include determining query concepts, from the ontology of concepts determined to be relevant to the document, representative of semantic meaning associated with one or more query terms of the query data, and determining the answer data may include matching the query concepts to the one or more of the multiple content portions tagged with the metadata elements comprising the one or more concepts from the ontology.

In various examples, the metadata elements may include one or more information type classifications selected from one or more information type categories. In such examples, determining the query contextual information may include determining a question type classification representative of information type, from the one or more information types categories, the user is searching for, and determining the answer data may include matching the question type classification for the query data to information type classifications for the one or more of the multiple content portions tagged with metadata elements comprising the information type classifications.

Tagging the one or more of the multiple content portions with the metadata elements determined based on the contextual information may include adding at least some of the metadata elements to respective at least some of the multiple content portions (i.e., into the body of the content portion so that the contextual information becomes parts of the content within the portion structure). In such embodiments, determining the query contextual information may include modifying the query data to include augmented query terms derived from the query contextual information, and determining the answer data may include determining matches between the modified query data and the at least some of the multiple content portions with the added respective at least some of the metadata elements.

5 Cleansing and Normalization

Embodiments described herein are directed to automatic curation and normalization transformations/conversions of the content in original documents in order to improve the accuracy of a question answering system.

In order to perform an effective search, documents should be converted into retrieval views which include, for example, paragraphs of plain text (or some other searchable representation). The journey from original documents to retrieval views may be enhanced by including some curation (through removal, or down-weighing of content determined to have low importance) and canonicalization of the content in order to increase the accuracy of the retrieval process.

Documents may arrive in a variety of original formats, including PDF, HTML, PPT, and DOCX. Extracting the text from each of these requires format-specific processing to generate a plain-text representation of the content (this may be followed by transforming the resultant document into another representation using, for example, a transform-based language model). The goal in a generic QA system is to preserve the entirety of the content for search. However, some of that content may be undesirable as an answer, and yet may get a high score from a transformer-based model (which in turn may result in using that content in the output provided to a user). For example, if a table of contents includes "Ways to Harvest Corn . . . . Page 7," it may score well to a question like "What are the best ways to harvest corn?" Returning the table of contents entry as the answer is frustrating to the user and gives the impression that the system has a low level of understanding.

Determining the potential searchable importance of content elements of a document can be performed based on several techniques, including visual structure analysis and language model analysis applied to the content elements. For instance, and with reference again to the above 'table of contents' example, the content elements can be recognized as a table of content entry based on their visual structures (even when converted to a plain text representation, or some other normalized representation) that includes a textual element on the left hand side (for an English-based content) followed by a number of dots, followed by numbers on the right side, with all the content of neighboring elements (spanning several lines of the document being processed) all formatted in a table like structure. In another example, content that includes the sequence of "dot space, dot space, dot space" is likely to correspond to a table of contents entry. Determination that the content, in this example, belongs to a table of content can also be made using a language model applied to the content.

There are various types of content that may need to be excluded. Table of contents is one example. Another example is a textbook in which chapters end with quizzes that include multiple choice questions. Such quizzes often do not inherently have semantically important information (for example, if a user asks a question to the system that happens to be one of the multiple choice questions, the user could get back, as an output answer, one or more of the multiple choice answers). Another example of potentially low information content that should be suppressed or removed relates to foreign languages content (at least when the Q-A model operates primarily on English content). For instance, returning an answer that is in a foreign language for an English-based query might be considered unsatisfactory for the user. Thus, for certain applications, detecting, by the language model or a rule-based analysis, that a content item/element is in a foreign language will result in removal of that content item or its downweighing. Yet another example of relatively low importance content is content recognized (determined to be) serial numbers. There are many other examples of content data that, for the purpose of efficiently performing a search it would be desirable to remove such content data so that, when a query is submitted, the Q-A system will have already removed (or down-weighed) low-importance content.

In various examples, determination of the importance of particular content (so that that particular content can be weighed appropriately, or even removed from the searchable content) can be based on a combination of processes or criteria applied to the content. For instance, in the above 'Table of Contents" example, both the visual structure information and the language model can be combined (according to some weighing technique or algorithmic process) to yield a determination that, using the independent visual processing results and the language model processing, the particular content element is likely a table of contents entry (and can thus be removed from the searchable content, or weighed down). Thus, the approaches described herein determine based on language model/visual processing (or some other type of analysis) which portions of content data are unlikely to form a useful answer, and in response to that determination down weight such portions or entirely exclude them. It is to be noted that for certain types of documents (e.g., HTML, Word documents, etc.) there may be additional or different processing paths (e.g., based additionally on formatting information/metadata included with HTML document) that may not be available for standardized documents such as PDF.

Accordingly, the solutions described herein include approaches to perform a curation of the content, in which portions which are deemed unlikely to form a useful answers to questions are down-weighted or excluded entirely from the final document that is to be searched. Examples of such content include tables-of-contents, page numbers, foreign language texts, copyright information, and bibliographies. A combination of language model scores and visual processing is used to identify these elements within the unfiltered content. Any element that is labeled according to an undesired content label is either down-weighted or discarded completely prior to assembling the document to be searched at run-time. If down-weighting is used, then the score associated with any answer coming from a down-weighted portion of the document is reduced, thereby encouraging answers from other parts of the document.

As noted, the original format of the input document might indicate the specific processing steps to be applied to arrive at the curated content. For example, for HTML a webpage is first rendered in a virtual, headless browser, and style information is computed for each element on the page. After the source HTML has been expanded to include external style labels, the expanded file is downloaded and preprocessed to ensure validity and to preserve inline formatting. The HTML may then be parsed into an element tree, which is recursively explored to create a flattened list of high-level elements, defined according to a combination of hard-coded rules and configurable CSS selectors. All container elements that do not themselves serve semantic functions are replaced by their contents. Once a list of high-level elements has been created, a final post-processing step runs to further ensure HTML validity and re-apply inline formatting. At this stage any elements may be removed or down-weighted based on their tags.

PDF files, by contrast, undergo a visual processing step in which various structural elements such as headings, tables, and footnotes are identified based on their appearance. Any items which are tagged with undesirable tags such as "table of contents" may be down-weighted or discarded. Other vision labels elements that are currently supported include "ToC," "caption," "copyright," "endnote," "figure," "footnote," "header_footer," "heading," "icon," "image," "index," "list," "other," "paragraph," "references," "side_box," "table," "title." The following are examples of what may be considered "undesirable" that can be filtered out: ToC, header_footer, endnote, footnote, copyright, index, side, box, references, etc.

A language model (e.g., implemented using a machine learning system) may be used to discover irregular texts, including foreign languages. In various embodiments, any text that does not score above some minimum threshold in a general English language model is discarded or down-weighted.

Another issue which drags down searching accuracy is the inconsistency between textual forms referring to the same concept. The inconsistency may arise in large part due to different persons authoring different parts of the original document over a large time and/or geographic window. For example, some authors may refer to a personal computer as a 'PC' whereas others may use the surface form 'P.C.' Such discrepancies in the text may lead to undesired score fluctuations.

Thus, in addition to the curation of the content, it may also be advantageous to canonicalize the document in order to map variations such as "PC" vs. "P.C." to a uniform format. In order to perform this operation, a canonical form is defined for a variety of terms as well as the variations which should map to it. Any time one of the non-standard varieties is encountered, it is mapped to the canonical term. As noted, the reason that a particular term of wording may show up in different formats within a document is that the document may have been authored by multiple people in multiple geographies at multiple times, so it is hard to keep a standard version of things.

Canonicalization can be implemented by defining rules to apply to various textual representations, such as requiring all acronyms to be converted to a form that does not have any dots, or identifying certain equivalent terms and mapping them into a single term. In some embodiments, canonicalization (normalization) is initially applied to content in the document, but for consistency may also need to be applied to the queries. Canonicalization can also be implemented as a machine learning model.

Another example of a canonicalization operation is to convert different references to an entity into a single uniform reference (such as a pronoun). Consider, for example, a paragraph in a document discussing former IBM CEO Ginni Rometty. The paragraph could provide information that specifically references Rometty, but may also use pronouns when providing certain information items (e.g., the document could say "She was 54-years-old when she became CEO of IBM."). These differences between the references to the entity could cause problems when a user submits a Q-A search asking, "when did Rometty become CEO of IBM?." Canonicalization of the document to resolve such entity references into a common entity reference can mitigate the problem because contextual processing (extracting semantic contextual meaning) improves if the right word is being used both in the question and in the answer. While there is more flexibility in transforming a questions according to these canonicalization rules, transforming the source content (as part of the ingestion process) also helps to achieve better semantic matching.

In some embodiments, canonicalization operations can also be used to paraphrase content, or alternatively to transform (via vectorization operations) content so as to capture variations of different semantically equivalent contents.

Normalization operations may be performed concomitantly with curation operations (although they are generally implemented as different processes). These two types of procedures can be applied during document ingestion to clean up the document (generally before a language transformation model is applied to the document to convert the document into searchable form). Thus, a particular portion of the document may be separately processed by the curation and normalization procedures to determine, for example, whether the content is located at an important part of the document, and/or to determine if there are any content portions that are presented in an atypical manner (e.g., acronyms presented with dots between the letters).

The proposed framework implements procedures to identify (e.g., based on structures and formatting of content in a document) content in different parts of the document that have low information value using rules (e.g., to detect certain structural patterns) or learned behavior (implemented, for example, via a machine learning language model). For example, an implemented rule may specify how to recognize a Table of Contents (e.g., identified based on certain structural characteristics). Alternatively, the relatively low importance of content found in a Table of Content section of a document may be established according to a learned behavior (e.g., through training and/or as a result of feedback from users rating answers derived from Table of Contents portions of the document as being unsatisfactory). Similarly, visual parsing or structure in a document for different document portions (i.e., analyzing where a content element is located and/or what it looks like) can lead to rules or learned models that identify, for example, a footer at the bottom of the page, bibliography entries, or a section in the documents that includes a copyright notice, as being locations (in the document) that generally do not hold content with high information importance. These types of content (footer, bibliographical entries, etc.) typically have specific formats thar are relatively easy to detect, and to take appropriate action. Content in such locations can be de-weighted (relative to content in more central locations in the body of the document) or excluded from the searchable document object (e.g., excluded from DOM objects that are processed in some implementations).

While models can be developed to detect certain content elements (footer, table of contents, bibliographical entries, etc.), the corresponding action to be taken with respect to such identified elements typically may need to be decided by a user or an administrator. For example, a general decision on whether to exclude or de-weight (and by how much) a particular content element may need to be decided at design time.

It is to be noted that, in various examples, the curation and normalization operations performed on the source content result in a searchable document on which searching is performed, but the source document is still preserved so that the user may be provided with original content when presented with the search results. Thus, in such examples, a document object (e.g., a DOM object) may include a normalized, canonicalized retrieval view (and may be provided in the text-based form, as well as in the vectorized representation of that retrieval form), and may also include an appropriately visually pleasant display view. In some examples, that display view may include content configured for specific application (PDF application or PowerPoint application). The display view may also include, alternatively or additionally, content that is formatted according to simplified HTML (generally used with the Q-A portal) that defines a single uniform presentation format to replace the more complex HTML or PDF formats (or some other complex format). Using a simplified HTML for output display views mitigates alignment issues that result from having to output the original content based on the search results determined from the retrieval view. However, the simplified HTML view does not reconstruct the original content, but instead provides a single, user-friendly viewing representation (e.g., a visually pleasing rendering, but not an exact reproduction of the original content).

Further details regarding the cleansing and normalization framework described herein are provided with reference to FIG. 7, showing a flow diagram of an example cleansing/normalization framework 700. The framework 700, which typically performs its cleansing/normalization operation on pre-ingested source documents, may be implemented by the document ingestion engine 126 depicted in FIG. 1, and executed as one of the pre-processing procedure discussed with respect to the document ingestion engine 126. As noted, the cleansing/normalization procedure are configured to analyze a source document, and identify portions that should be removed (excluded) from the source document (if it is determined that leaving those portion would reduce the quality of searches), or alternatively identify whether certain unimportant portions (e.g., from an answer searchability perspective), such as appendix materials, footnotes, etc., should be down-weighted so that search responses that include those portions have a lower matching score (thus giving preference to content found in more important parts of a document). Based on this analysis, an edited source document (which may be a new document, different from the source document, or a modified version of the document) is generated as resultant edited source document. Accordingly, the cleansing/normalization framework 700 is configured to receive (e.g., via the server interface 120 of FIG. 1) source content for a source document, determine (e.g., using a processor-based controller coupled to memory devices, which may be implemented as part of the ingestion stack, including the server interface 120 and/or the document ingestion engine 126 depicted in FIG. 1) required editability for at least one portion of a plurality of different portions of the source content based on one or more of, for example, relative location of the at least one portion in the source document, visual structure of the at least one portion, and/or lexical structure of the at least one portion. The cleansing/normalization framework 700 is further configured to generate a resultant edited source document with content derived based on at least one portion of the source content and the respective determined required editability for the at least one portion. The resultant edited source document is provided to downstream information retrieval system processing (depicted in FIG. 7 as blocks 730-750). Such downstream processing includes other ingestion-type processing, such as segmenting the edited source content into chunks that can be transformed into a vector space according to one or more language transform models (e.g., BERT).

As shown in FIG. 7, a document with source content 702 is received (e.g., retrieved from some document repository, or sent by a user for pre-processing and ingestion), and is forwarded to document analysis unit 710. Optionally, prior to commencing document analysis processes, a document type controller 720 first determines what type of document (e.g., text-document, HTML document, PDF document, etc.) the source content 702 is. Because different document types have different visual structures and document rendering characteristics, the identity of the specific document type informs about how the document is structured (or how it is meant to be analyzed), and thus how the source document should be analyzed and how a resultant edited content should be generated. In some examples the document type controller may identify the document type according to metadata associated with the source content. Alternatively and/or additionally, the document type controller 720 may perform an analysis (algorithmic or through a machine-learning model) on a small portion of the source content to determine how the content is formatted and/or encoded.

The document type information can be used to either adjust the behavior of the document analysis processes (e.g., the processes 720-750), or to select appropriate analysis processes or analysis-needed data from a library/repository of the analysis processes or analysis-related data sets (e.g., analysis rules). For example, if the source document is determined to be a PDF document, special visual structure analysis rules may be needed to determine how and where the content is being rendered, determine if there are any formatting codes that are not themselves the content that needs to be analyzed, and so on. In this example, the document type controller 720 (or some other control model) may retrieve or launch/invoke specialized PDF-based rules or processes to analyze the PDF content. Similarly, a PDF-based language model analyzer may be invoked in response to the determination that the content to be analyzed is PDF content. Thus, in various examples, the cleansing/normalization framework 700 is configured to determine a document type (from a plurality of types) associated with the source document, and select a set of pre-determined rules (e.g., to analyze content to determine importance levels of various portions, and/or make other content editing decisions) from a plurality of sets of pre-determined rules based on the determined document type associated with the source document, and/or to select a machine learning language model (e.g., to likewise determine importance level of various portions, and/or make other content editing decisions) from a plurality of machine learning language models based on the determined document type associated with the source document.

In some situations, the identification of the content as being of some specific type may require additional specialized processing not needed for other document types. For example, if the document type controller 720 determines that the source content 702 is an HTML content, it may launch a process to expand the HTML content in a virtual browser (in which external style labels are added). Next, the HTML-related process parses the expanded content into an element tree and purges container elements that do not serve semantic functions.

With continued reference to FIG. 7, analysis of the content may be performed along multiple concomitant tracks that execute content analysis processes (as noted, the content analysis processed may have been selected, or adjustably configured, based on the content/document type). The analysis processes scan the content to analyze the content and to make editing decisions (e.g., the required editability of various content portions) that are used to generate a resultant edited source document (or to modify the source content 702 according to the editing decision). Required editability for a particular portion is determined if the content portion analyzed would otherwise reduce the quality of search results during execution of a user-submitted query at search time.

One example of determining required editability content portions is to determine information importance level (e.g., semantic importance level) for a particular content portion. As noted above, certain portions of the content (e.g., table of content entries) may be semantically unimportant even if they do happen to linguistically include words that match to the query. Accordingly, the rules-based content analyzer 730 and the language model-based content analyzer 740 may each be configured to determine for a particular content portion, based on the content portion's relative document location and/or its visual structure, what that portion's information importance level is. It is noted that the analyzers 730 and 740 may be configured to consider different factors for the various portions, or simply to independently analyze a particular portion and have the determined information importance levels separately determined by two processes combined or weighed in some manner (e.g., taking the average or weighted average of the scores produced by either process for a particular content portion). It will also be noted that multiple rules-based content analyzing processes and language-model-based content analyzing process may be run simultaneously, with each of the running processes either implementing different analysis criteria (e.g., to determine information importance level for the particular content portion), or analyzing different parts of the source content (to improve concurrency performance).

For the example analyzers 730 and 740, the analysis may produce, for a particular content portion, an information importance score (e.g., a composite importance score based on the output of each of the analyzers analyzing the information importance level for the particular content portion). In some embodiments, the information importance score can then be compared to an importance threshold to determine whether to include or exclude the content portion from the resultant edited source document 752. If the importance score is less than or equal to the importance threshold, a decision may be made to exclude the content portion (for example, the portion is a table-of-content that does not contain answer information to question, but may nevertheless be outputted as a candidate response if left in the content).

In some embodiments, if it is determined that the information importance score exceeds the importance threshold cause, the information importance score is next compared to a second threshold (a down-weight threshold) that is used to determine whether the content portion, even though it is important enough to keep in the edited source content, should nevertheless by associated (tagged) with a search-weight that would result in a down-weighting of search results that match to the particular content portion (in its ingested representation) during search time. If it is determined that the information importance score exceeds the second threshold, the particular content portion may be kept in the resultant edited source document 752. However, if the information importance score is less than or equal to the second threshold (but higher than the first threshold), the particular content portion is kept in the resultant edited source document 752, but it becomes associated (through a tag, or a link to another document) with a search weight to down-weigh matching scores computed during search times and that match to the particular content portion.

As described herein another example of content analysis processes to determine required editability of content portions (to cleanse/normalize source content) is illustrated by the semantic normalizer 750 of FIG. 7. The semantic normalizer 750 is configured to analyze the source content and find semantically equivalent terms (e.g., CEO is the semantic equivalent of Chief Executive Officer) that often are used interchangeably, and can thus reduce the search quality (due to lexical inconsistency between terms that are otherwise used interchangeably). Thus, the semantic normalizer 750 (also implemented as part of the ingestion stack that include the server interface 120 and the document ingestion engine 126; the semantic normalized may be realized as a rules-based process, and/or as a machine learning process) is configured to determine semantically equivalent terms used within the source content, and generate the resultant edited source document with multiple occurrences of a uniform normalized term to replace the semantically equivalent terms. For example, in a situation involving equivalent acronyms (one occurrence spelling the term "CEO," while another occurrence in the same source content using "C.E.O."; i.e., with periods after each letter), the semantic normalizer is configured to identify different instances of equivalent acronyms within the source content, and replace the different instances (in the resultant edited source document 752) of the equivalent acronyms with a single uniform acronym representation of the different instances of the equivalent acronyms. In another example, the semantic normalizer 750 identifies that the source content uses different representations for a particular entity. The semantic normalizer is thus configured to replace the instances of different representations of the particular entity with a uniform entity representation. It will be noted that in some situations it may also be necessary, during search time, to replace certain semantic terms appearing in the query with the uniform (canonicalized) term that was determined during the cleansing/normalization process described herein.

Other cleansing/normalization processes to determine required editability of various content portions may also be used in conjunctions with the processes illustrated by the blocks 730-750. After generating the resultant edited source document 752, this edited content is forwarded to downstream processes (represented by the block 760) to perform additional ingestion-time (and/or training time) processing.

With reference next to FIG. 8, a flowchart of an example document processing procedure 800 (to perform cleansing and normalization operations) is shown. The procedure 800 includes receiving 810 source content for a source document, and determining 820 required editability for at least one portion of a plurality of different portions of the source content based on one or more of, for example, relative location of the at least one portion in the source document, visual structure of the at least one portion, and/or lexical structure of the at least one portion. The procedure 800 further includes generating 830 a resultant edited source document with content derived based on at least one portion of the source content and the respective determined required editability for the at least one portion, with the resultant edited source document being provided to downstream information retrieval system processing.

In various examples, determining required editability for the at least one portion may include determining information importance level for the at least one portion based on one or more of, for example, the relative location of the at least one portion in the source document, the visual structure of the at least one portion, and/or lexical content of the at least one portion (e.g., whether the content is provided in a foreign language). The relative location of the at least one portion may include one or more of, for example, a document table of content location, a document footer location, and/or a document bibliography location. Generating the resultant edited source document may include modifying the source document to produce a modified source document based on the determined information importance level for the at least one portion. Determining the information importance level may include one or more of, for example, applying predetermined rules to one or more of the plurality of different portions, and/or applying a machine learning language model to the one or more of the plurality of different portions to derive the information importance level for the at least one portion.

The procedure 800 may optionally include determining a document type, from a plurality of types, associated with the source document. In such embodiments, applying the pre-determined rules or applying the machine learning language model may include selecting a set of pre-determined rules from a plurality of sets of pre-determined rules based on the determined document type associated with the source document and/or selecting the machine learning language model from a plurality of machine learning language model based on the determined document type associated with the source document.

Generating the resultant edited source document may include computing, for the at least one portion, an information importance score, and in response to a determination that the information importance score for the at least one portion is greater than an importance threshold value, including the at least one portion in the generated edited source document. The procedure 800 may also include excluding the at least portion from the resultant edited source document when the computed information importance score is less than or equal to the importance threshold value. In various examples, the procedure 800 may further include deriving a search weight based on the information importance score for the at least one portion when the information importance score is greater than the importance threshold value, but less than or equal to a down-weight threshold, with the search weight associated with the at least one portion being used to compute one or more matching scores for one or more search results determined using the at least one portion in response to a query submitted by a user.

As noted, in various embodiments, the framework also performs normalization operations (canonicalization). In such embodiments, determining required editability for the at least one portion may include determining semantically equivalent terms used within the source content, and generating the resultant edited source document with multiple occurrences of a uniform normalized term to replace the semantically equivalent terms. Determining semantically equivalent terms may include identifying different instances of equivalent acronyms within the source content. Generating the resultant edited source document with the multiple occurrences of the uniform normalized term may include replacing the different instances of the equivalent acronyms with a single uniform acronym representation of the different instances of the equivalent acronyms. In some examples, determining semantically equivalent terms may include identifying instances of different representations of a particular entity. In such examples, generating the resultant edited source document with the multiple occurrences of the uniform normalized term may include replacing the instances of different representations of the particular entity with a uniform entity representation.

6 Resource Auto Scaling, and Dynamic Selection of Negative Examples for More Effective Training of QA Systems Embodiments of the document processing framework described herein include processes and implementations to auto-scale the performance of the Q-A system, based on availability of resources, in terms of adjusting the extent of a Q-A searching during runtime. Autoscaling of resources can also be performed to adjust the extent and scope of the training of the query/search engine of the Q-A framework.

To take the training-time example (i.e., adjusting the extent of training), in order to overcome the tradeoff between training speed and Q-A performance resulting from use of negative Q-A pairs to train, a "negative selection" (or NS) phase is introduced into the training process. The NS phase is configured, for certain examples, to efficiently select a reduced "active set" of negatives from a large "negative pool" that include negative examples evaluated or approximated to, for example, have the highest scores under the current Q-A model. This reduced, active set of negatives (rather than the entire negative pool) are then used to further train the current QA model. In addition, the implementations also include the use of a "short-answer-aware" approach to more effectively select highly confusable negatives for the negative pool, which also significantly boosts training efficacy. In this example, the proposed approach provides more realistic training data, and closes the gap between training and user queries encountered during deployment, thus improving QA system performance.

As noted, the autoscaling approach also includes adjustment of the scale of a runtime Q-A search for a query submitted by a user. Consider a situation in which, while running the Q-A system (i.e., during use-time or inference-time) there is an unexpected sudden load increase (e.g., hundreds or thousands of users are seeking to use the system, either at a local server or at a cloud server serving multiple clients each having hundreds or thousands of users). Under such circumstances, processing needs to be sped up (in order to handle the surge in demand) but without damaging/harming the search performance too much. To that end, the Q-A may be implemented with a so-called "DM knob" (controlled by a technician/administrator, or controlled automatically based on a machine learning or algorithmic process) to adjust the operation and performance of the Q-A framework. For example, as discussed in WO 2021/263138, embodiments of the document processing framework include use of a coarse searching cycle (iteration) to determine potential candidate answers for a particular query (in the form of documents or parts of documents). The fast-match results (identifying promising documents or paragraphs within a certain document, or within a collection of documents) are then used to guide fine-detail searching to more narrowly pinpoint suitable answers to the submitted queries/questions. The DM knob is a mechanism configured to reduce the size of the list that is provided to perform a detailed match (i.e., fewer candidates), with the size of the resultant list from the fast search adjusted depending on the load and resource availability. If the size of the list needs to be reduced, the Q-A system may select the top N answers resulting from the fast search (the top answers may be determined based on a similarity or relevance score computed for resultant Q-A pairs). Alternatively, attributes of the fine-detail search can also be adjusted in response to a change in the availability of computing resources (e.g., restrict the number of possible candidates to be identified by the fine-detail search to M).

In the DM knob implementations, if there are lots of resources, the system has enough time to perform a detailed match for a bigger list of coarse answers. Conversely, there are fewer computational resources (e.g., this might depend on the time of the day, with peak times, such as mid-afternoon when more users are submitting queries, causing a decrease in the number of coarse search results), the system may automatically adjust (i.e., auto-scale) to crank down the resources allocated to performing fast searches so that fewer results (potential candidates) are identified for which detailed searching needs to be performed (i.e., only the top N fast search results are used for further processing). In other examples, other use-time performance parameters (e.g., relating to the extent of performing fine/detailed search, or to other operational aspects of the Q-A system) may likewise be adjusted based on availability of resources (resulting from variations to the numbers of users or searches handled by the system).

Another way to adjust resource use is to control/constrain the training or ingestion load that is required for the Q-A system. Training a machine learning engine (implementing machine learning models such as the language transform models implemented for question-answering functionality) requires training samples defining the ground truth. Those training examples include positive examples (comprising input data that results in desirable output data that the Q-A, once trained, should predict), and negative examples comprising input data that results in incorrect or undesirable output that cause the learning model, once trained, to predict, in response to runtime input similar to the negative examples, output distinguishable from the predicted output for positive examples. The use of negative content helps improve the performance of a machine learning system in that it facilities defining output behavior of a machine learning model that is distinguishable from the output behavior resulting from runtime output resulting from runtime input similar to the input of positive examples.

While the use of negative content to train a machine learning system (e.g., by processing the training content according to, for example, a maximum mutual information (MMI) objective function mechanism) improves the predictive behavior of a machine learning model, one challenge is to find good negative content in the face of limited resources constraints. Under an example approach, an efficient way to determine/identify suitable negative content (e.g., based on optimization performed according to MMI criteria). In example Q-A systems, the language model may be based on a transformer-based model (e.g., BERT, GPT3, T5, BART, etc.), trained on a large volume of data (e.g., the Stanford Question Answering Database, or Squad, and/or other question-answer repositories and privately collected and annotated data), and configured to convert input data into a vector representation (also referred to as an embedding) according to the trained model's parameters. It is to be noted that some transformer models have the property whereby they can be trained for a first task, but may be able to perform another task that is semantically related to the first task (such models focus on semantic content, and are less sensitive to lexical representation). As a simple example, consider a situation where a model is trained to pair countries with their capitals (e.g., Britain is matched to London, and France is matched/paired with Paris). In example models implementing semantically related tasks/concepts, an input A may yield an output B, while an input B may yield an output A. Such example models thus implement functional operations in which if you have something on the A side, and something on the B side, as long as A and B are semantically related to each other, it does not matter what is presented on the first side and what is presented (outputted) on the other side.

Example embodiments include a Q-A system that implements dynamic selection of training data that evaluates the suitability (goodness) of negative example training data (e.g., samples that should not be producing desired prediction output associated with the positive examples) to thus shorten the training loop. The use of dynamic selection also makes evaluation of a model more efficient since there are fewer (but better) negative examples, resulting in a better defined model (when operating in inference mode) that is generally faster and tends to have a lower memory footprint (requiring fewer parameters to define the learnt behavior of the model). The dynamic selection approach can use a large pool of negative examples, and evaluate online which examples in the pool the model is having problems with (e.g., to perform the correct classification, or predict the correct output). Under this approach, the examples that are determined (evaluated by passing it through the machine learning model, or by applying some algorithmic approximation process) to be the hardest (e.g., the N hardest, where N is some pre-determined threshold value) for the machine learning model to handle (i.e., the "hardest" or most "difficult" negatives) may be selected, and placed into the training loop (e.g., so that those examples can be re-run to allow further re-configuration of the learning model based on those difficult examples). For example, negative training records that are determined to result in relatively high matching scores (i.e., they produce a wrong classification or cause predictive behavior that is too close to the predictive behavior resulting from positive examples) can be placed into the training pool. With the dynamic selection mechanism an initial large negative examples pool can be made available because only a subset of the available examples will dynamically be selected. Alternatively, regular-sizes training pools of negative examples may be used and pared down to a smaller subset that identifies of hardest ("worst offenders") negative samples to train the machine learning model. The dynamic selection approach can thus game the speed performance trade-off to adjustably control the negative example pool size, while still achieving the best training performance (because the best examples are selected) for the existing resource constraints.

A question-answer machine learning system can thus be trained in a discriminative mode using training data that includes both the correct answers as well as imposters or distracting answers (the negative answers). The dynamic selection technique can evaluate negative examples using a process or model to approximate which negative examples produce the clearest, e.g., least ambiguous, predicted behavior that differentiates the negative examples from the behavior produced by positive examples, and/or to determine which examples produce behavior that is difficult for the machine learning model to properly handle, and thus may require reinforcement learning for those examples. The dynamic selection can accordingly reduce the number of negative examples needed to train the system. Those selected negative examples are then added to the pool. For a Q-A system, the training can then include selecting (matching) for a particular question question/answer truths, and possibly finding a handful of negative distractors that can be added to the pool to train the system to distinguish those representative distractors from the correct answers.

In various examples, the dynamic selection approach can be implemented so that at least some negative examples are selected following an evaluation (e.g., through an approximating function or process) performed in advance of the actual training (i.e., before passing them through the machine learning engine). The selected negative examples can include examples, selected in advance, that are evaluated/determined to produce clearly different output than what positive examples produce, and/or to select processed examples that caused the machine learning system to produce ambiguous output for which it would be desirable to re-run those examples to properly configure the predictive behavior of the model in response to the confusing negative examples. Advanced selection to pick negative examples ahead of time (e.g., in response to a determination of that computing resources are becoming scarce) can improve the performance of the machine learning system, e.g., in terms of more efficient use of resources and a more compact model, e.g., a model defined with fewer parameters). Alternatively or additionally, dynamically selecting at least some negative examples that, after being run by the machine learning system, produce output indicating the machine learning system is having trouble with those examples also helps improve the training process.

In situations where training resources are more plentiful (e.g., there is more time and computing resources to run a large number of negative examples), the inclusion of more negative examples from the negative example pool can improve the training process. However, having unlimited time and computing resources is generally impractical and therefore training the system on a large number of negative examples becomes either infeasible or extremely expensive. Accordingly, the dynamic selection mechanisms described herein provide a more optimal solution of doing the best under existing resource constraints by, for example, selecting negative examples that the machine learning model is having trouble with to populate the training loop. For example, in one training iteration the top N (e.g., N=10) distractors (e.g., negative examples that result in relatively high matching scores) are identified, and are selected to be used in a subsequent (e.g., the next) training iteration. During the current iteration a small subset of examples is used (e.g., randomly drawing question/answer pairs, generating some negative examples, selecting maybe the top 10 negative examples) to adjust (optimize) the machine learning parameters of the model in such a way that it optimally pushes the correct answer away from the negative answers in some general sense. As noted, the negative examples may be drawn from a reduced pool of examples (pared down from a larger pool according to some evaluation/selection criteria). Then negative examples drawn from this reduced pool that present difficulties to the model may be identified and recycled in subsequent iteration of the training loop. This mechanism results in hardware footprints that are significantly smaller than the hardware footprints that would have resulted had a larger pool of negative examples been used.

Thus, the approaches described herein realize improvements in training for negative examples, to make it more computationally feasible. The advantage of the dynamic selection of a reduced pool of negative examples, and/or the identification and recycling of difficult examples (e.g., selected from the reduced pool) improve the training performance of the machine learning Q-A system. The approaches and solution describe herein define a performance spectrum in which, at one side, the system can be trained on the entire pool of examples at the cost speed, and at the other side of the spectrum more efficient training is achieved by using a smaller pool (albeit a pool that is optimally selected in accordance with the techniques described herein).

Other examples in which the operational characteristics of the Q-A system are adjusted can include delaying the performance of tasks that are less time sensitive, e.g., preferentially allocating resources to execute queries, and devoting fewer resources for source document ingestion (where the party providing the source document is likely more tolerant of some delay before the source document is ingested and becomes available to be searched), assigning simple operations to other computing devices (e.g., using the computing resources of the parties submitting queries to perform some of tasks), etc.

With reference next to FIG. 9, a flowchart of a procedure 900 to adjust level of operations of a question-and-answer retrieval system (similar to the system 100 of FIG. 1) based on availability of computing resources is shown. The procedure 900 includes determining 910 available computing resources for a question-and-answer (Q-A) system configured to perform Q-A searches on stored content corresponding to one or more source documents. The computation of computing resources and their use (or conversely their availability) may be computed according to various system performance sensors or counters, such as processor-use counters (e.g., indicating, as a percentage, the level at which processors of the Q-A system are running), latency counters providing information about delays in completing various requested tasks, data transmission rates into and out of the Q-A systems, etc.

As further illustrated in FIG. 9, the procedure 900 additionally includes dynamically adjusting 920 operational characteristics of the Q-A system based on the determined available computing resources. Generally, current high use of computing resources will require an adjustment in the operational behavior of the Q-A system to try and balance its performance given the current scarcity of resources. The Q-A system seeks to control some of the high-level features of its operation in a way that reduces the computational effort it is using, while still achieving high performance, preferably without noticeable degradation to the speed and accuracy of the tasks being performed. As discussed herein, several such high level features the Q-A system can be regulated to contribute to a reduction in the computing resources being used at a minimal impact to the overall performance of the system include adjusting the searching functionality (e.g., by generating fewer matches during the coarse searching phase of its query-handling operations), adjusting the manner and volume at which the system performs training operations (be it initial training, or intermittent update training), prioritizing tasks so as to give preferential treatment to some time-sensitive tasks (returning search result to users), while delaying less urgent tasks (e.g., delaying source document ingestion tasks for recently submitted documents that the submitting user would not expect to be immediately processed), etc.

More particularly, consider the example discussed above of using a DM knob to control the number of coarse search results that are provided to perform the subsequent fine-detail searching. In such examples, the Q-A system is configured, in response to a received query, to perform a coarse Q-A search of the one or more documents according to a coarse transform representation of the query and content of the one or more documents, and to perform a subsequent fine-detail Q-A search of the one or more documents according to determined search results of the coarse Q-A search using a fine-detail transform representation of the query and content of the one or more documents. In the event of a change in the availability of computational resources, dynamically adjusting the operational characteristics of the Q-A system may include adjusting number of determined results of the coarse Q-A search (for which the subsequent fine-detail search is to be performed) based on the determined available computing resources. In other words, when computational resources are in high use, the Q-A will return a lower number of coarse search results (e.g., top 20 results that have the highest matching scores) while still performing the same number of fine-detail searches for the reduced number of coarse-search results. The reduction in the number of coarse search results being returned is unlikely to greatly impact the quality of the searching operations since the user will likely still receive the best results. In some embodiments, the number of returned fine-detail matches may also be reduced as a result of a reduction in the availability of computational resources.

As further discussed herein, in various examples training-time operational behavior of the machine learning engines used by the Q-A system can be controlled to adjust for changes in the level of use of computational resources. An illustrative example of how training-time (be it the initial training or intermittent training occurring after the Q-A system has become operational) can be controlled is through the adjustment of the number of training examples that are used. While it would be desirable to use as many training examples as possible, this goal is often not feasible, and therefore careful selection of examples from a pool of training examples needs to be made. As discussed herein, one type of a training example that can have big impact on the performance of the Q-A system is the negative training example, i.e., examples that should result in predicted output that falls outside the set of desired outputs that would be produced by positive training examples. However, a common occurrence is that negative training examples that would be expected to yield output readily distinguishable from that produced by positive examples nevertheless produce confusing results that are either within the set of positive examples predicted output, or close to that set (according to some closeness criterion). It is therefore important, and a beneficial use of computational resources, to ensure that the configuration parameters of the machine learning engines used (e.g., the weights for a neural network type machine learning engine) are adjusted in response to confusing predicted output that is close to the desired output for positive examples.

Thus, consider examples in which the Q-A system may be trained, in part, using a training set that may include positive training data to generate expected positive training predicted output data of the Q-A system to be within a desired set of output data, and further may include negative training data to generate expected negative training predicted output data of the Q-A system to be outside the desired set of output data. In such examples, dynamically adjusting the operational characteristics of the Q-A system may include dynamically selecting from a pool of negative training examples an adjustable-size subset of one or more negative training examples based on one or more selection criteria (the set size of selected positive examples may also be regulated based on the availability of computational resources). Dynamically selecting the adjustable-sized subset may include increasing the adjustable-sized subset of the one or more negative training examples in response to an increase in an availability of the computing resources, or decreasing the adjustable-sized subset of the one or more negative training examples in response to a decrease in the availability of the computing resources.

Dynamically selecting the adjustable-size subset of the one or more negative training examples may include dynamically selecting the adjustable-size subset of the one or more negative training examples to include negative training examples determined to result in predicted output of the Q-A system that is within one or more pre-determined closeness matching levels to the desired set of output data. That is, negative training examples that are determined to be confusing (generating predicted output too close to what positive examples would generate) are placed into a subset of negative examples that should be run again, and for which configuration parameters of the machine learning engine(s) should be changed to cause the re-running of those negative training examples to yield output more distinguishable than that produced for positive training examples.

In various examples, a first training iteration may be run with a set (pool) of negative examples, and the confusing negative training examples from that set are placed into a subset that can be run again to resolve the confusing output (e.g., adjust the configuration parameters of the machine learning engine to produce distinguishable output). In other words, to identify confusing negative examples, actual training iterations are executed. Thus, in such examples, dynamically selecting the adjustable-size subset of the one or more negative training examples may include selecting from the pool of negative training examples processed by the Q-A system during a first training iteration one or more confusing negative training examples that produced predicted output, during the first training iteration, with a closeness level to the desired set of output data produced by positive examples satisfying a closeness criterion.

Alternatively, in various other examples, confusing negative examples can be identified through faster means, e.g., by feeding negative training examples during actual run-time (also referred to as prediction- or inference-time) to evaluate the resultant output, or through evaluating the negative training examples by an approximating function or model that can emulate/estimate the behavior of the machine learning engine. Accordingly, in such examples, dynamically selecting the adjustable-size subset of one or more negative training examples may include processing at least some negative examples from the pool of negative training examples according to a current configuration of a machine learning searching model of the Q-A system, and identifying based on output resulting from processing the at least some negative examples a pre-determined number of negative examples that produced output closest to the desired output expected to be produced using the positive examples. Processing the at least some negative examples according to the current configuration of a machine learning searching model may include applying the machine learning searching model in its current configuration to the at least some negative examples to produce respective predicted output by the machine learning searching model. Processing the at least some negative examples according to the current configuration of the machine learning searching model may alternatively include deriving the output based on an approximation of the behavior of the machine learning searching model in its current configuration. The procedure may further include populating the subset of negative training examples with the identified pre-determined number of negative examples, and performing a training iteration for the machine learning searching model of the Q-A system to adjust the current configuration of the machine learning searching model into a re-trained configuration that produces, in response to the identified pre-determined number of negative examples, re-trained predicted output that is farther away from the desired output expected to be produced using the positive examples than the output produced with the current configuration of the machine learning searching model.

7 Additional Embodiments

In implementations based on learning machines, different types of learning architectures, configurations, and/or implementation approaches may be used. Examples of learning machines include neural networks, including convolutional neural network (CNN), feed-forward neural networks, recurrent neural networks (RNN), etc. Feed-forward networks include one or more layers of nodes ("neurons" or "learning elements") with connections to one or more portions of the input data. In a feedforward network, the connectivity of the inputs and layers of nodes is such that input data and intermediate data propagate in a forward direction towards the network's output. There are typically no feedback loops or cycles in the configuration/structure of the feed-forward network. Convolutional layers allow a network to efficiently learn features by applying the same learned transformation(s) to subsections of the data. Other examples of learning engine approaches/architectures that may be used include generating an auto-encoder and using a dense layer of the network to correlate with probability for a future event through a support vector machine, constructing a regression or classification neural network model that indicates a specific output from data (based on training reflective of correlation between similar records and the output that is to be identified), etc.

The neural networks (and other network configurations and implementations for realizing the various procedures and operations described herein) can be implemented on any computing platform, including computing platforms that include one or more microprocessors, microcontrollers, and/or digital signal processors that provide processing functionality, as well as other computation and control functionality. The computing platform can include one or more CPU's, one or more graphics processing units (GPU's, such as NVIDIA GPU's, which can be programmed according to, for example, a CUDA C platform), and may also include special purpose logic circuitry, e.g., an FPGA (field programmable gate array), an ASIC (application-specific integrated circuit), a DSP processor, an accelerated processing unit (APU), an application processor, customized dedicated circuitry, etc., to implement, at least in part, the processes and functionality for the neural network, processes, and methods described herein. The computing platforms used to implement the neural networks typically also include memory for storing data and software instructions for executing programmed functionality within the device. Generally speaking, a computer accessible storage medium may include any non-transitory storage media accessible by a computer during use to provide instructions and/or data to the computer. For example, a computer accessible storage medium may include storage media such as magnetic or optical disks and semiconductor (solid-state) memories, DRAM, SRAM, etc.

The various learning processes implemented through use of the neural networks described herein may be configured or programmed using TensorFlow (an open-source software library used for machine learning applications such as neural networks). Other programming platforms that can be employed include keras (an open-source neural network library) building blocks, NumPy (an open-source programming library useful for realizing modules to process arrays) building blocks, etc.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or ±0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or ±0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Although particular embodiments have been disclosed herein in detail, this has been done by way of example for purposes of illustration only, and is not intended to be limit the scope of the invention, which is defined by the scope of the appended claims. Any of the features of the disclosed embodiments described herein can be combined with each other, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method for document processing, the method comprising:
    obtaining a question dataset that comprises one or more source questions for document processing by a machine-learning question-and-answer system that provides answer data in response to question data submitted by a user,
    analyzing the source question to determine a specificity level for the source question, wherein analyzing the source question comprises determining the source question is overly verbose based on a comparison of the determined specificity level to one or more specificity threshold values,
    modifying the source question from the question dataset to generate one or more augmented questions that have equivalent semantic meanings as that of the source question,
    processing a document with the one or more augmented questions,
    wherein modifying the source question comprises: simplifying the source question, in response to a determination that the source question is overly verbose, to exclude one or more semantic elements of the source question to generate a terse question with an equivalent semantic meaning to the source question, and
    adding the one or more augmented questions to an augmented question dataset.

2. The method of claim 1, wherein processing the document with the one or more augmented questions comprises one or more of:
    training the machine learning question-and-answer system using the document and the one or more augmented questions; or
    ingesting the document with the one or more augmented questions, subsequent to completion of the training of the machine learning question-and-answer system, to generate an ingested document that is searchable by the machine learning question-and-answer system.

3. The method of claim 1, wherein analyzing the source question comprises one or more of: determining a word count for the source question, determining intent associated with the source question, or classifying the source question using a machine-learning question specificity model.

4. The method of claim 1, wherein simplifying the source question comprises excluding the one or more semantic elements of the source question according to one or more of: a term-weighing scheme to assign values for words appearing in the source question, or one or more natural language processing (NPL) rules applied to the source question.

5. The method of claim 4, wherein the term-weighing scheme comprises a term frequency-inverse document frequency (TF-IDF) scheme, wherein simplifying the source question comprises:
computing weight values for the words appearing in the source question according to the (TF-IDF) scheme; and
removing one or more of the words appearing in the source question based on the computed weight values, and subject to the NPL rules.

6. The method of claim 1, wherein modifying the source question comprises:
generating a question variant message comprising the source question and one or more required output characteristics for a resultant augmented question paraphrasing of the source question; and
providing the question variant message to a generative large language model system configured to generate a resultant augmented question based on the source question and the one or more required output characteristics.

7. The method of claim 1, further comprising:
iteratively modifying the one or more augmented questions to generate additional sets of augmented questions with similar semantic meanings as that of a preceding set of augmented questions.

8. A method for document processing, the method comprising:
obtaining a question dataset that comprises one or more source questions for document processing by a machine-learning question-and-answer system that provides answer data in response to question data submitted by a user,
analyzing the source question to determine a specificity level for the source question, wherein analyzing the source question comprises determining the source question is overly verbose based on a comparison of the determined specificity level to one or more specificity threshold values,
modifying the source question from the question dataset to generate one or more augmented questions that have equivalent semantic meanings as that of the source question, and
processing a document with the one or more augmented questions,
wherein modifying the source question comprises: simplifying the source question, in response to a determination that the source question is overly verbose, to exclude one or more semantic elements of the source question to generate a terse question with an equivalent semantic meaning to the source question, and
wherein the source question includes unstructured keywords, and wherein modifying the source question comprises expanding the source question, in response to a determination that the source question is overly terse, to include structural components for the unstructured keywords.

9. The method of claim 8, wherein expanding the source question comprises:
determining a statement of intent and/or other contextual information associated with the keywords of the source question; and
adding to the source question semantic structural components determined based on the statement of intent and/or other contextual information.

10. A method for document processing, the method comprising:
obtaining a question dataset comprising one or more source questions for document processing by a machine learning question-and-answer system that provides answer data in response to question data submitted by a user,
analyzing the source question to determine specificity level for the source question,
wherein analyzing the source question comprises determining that the source question is overly terse based on a comparison of the determined specificity level to one or more specificity threshold values,
modifying the source question from the question dataset to generate one or more augmented questions with equivalent semantic meanings as that of the source question;
processing a document with the one or more augmented questions,
wherein the source question includes unstructured keywords, and wherein modifying the source question comprises expanding the source question, in response to a determination that the source question is overly terse, to include structural components for the unstructured keywords, and
adding the one or more augmented questions to an augmented question dataset.

11. The method of claim 10, wherein processing the document with the one or more augmented questions comprises one or more of:
training the machine learning question-and-answer system using the document and the one or more augmented questions; or
ingesting the document with the one or more augmented questions, subsequent to completion of the training of the machine learning question-and-answer system, to generate an ingested document that is searchable by the machine learning question-and-answer system.

12. The method of claim 10, wherein analyzing the source question comprises one or more of: determining a word count for the source question, determining intent associated with the source question, or classifying the source question using a machine-learning question specificity model.

13. The method of claim 10, wherein analyzing the source question comprises:
determining the source question is one of overly verbose or overly terse based on a comparison of the determined specificity level to one or more specificity threshold values.

14. The method of claim 10, wherein modifying the source question comprises:
simplifying the source question, in response to a determination that the source question is overly verbose, to exclude one or more semantic elements of the source question to generate a terse question with an equivalent semantic meaning to the source question.

15. The method of claim 14, wherein simplifying the source question comprises excluding the one or more semantic elements of the source question according to one or more of: a term-weighing scheme to assign values for words appearing in the source question, or one or more natural language processing (NPL) rules applied to the source question.

16. The method of claim 15, wherein the term-weighing scheme comprises a term frequency-inverse document frequency (TF-IDF) scheme, wherein simplifying the source question comprises:
computing weight values for the words appearing in the source question according to the (TF-IDF) scheme; and
removing one or more of the words appearing in the source question based on the computed weight values, and subject to the NPL rules.

17. The method of claim 10, wherein expanding the source question comprises:
determining a statement of intent and/or other contextual information associated with the keywords of the source question; and
adding to the source question semantic structural components determined based on the statement of intent and/or other contextual information.

18. The method of claim 10, wherein modifying the source question comprises:
generating a question variant message comprising the source question and one or more required output characteristics for a resultant augmented question paraphrasing of the source question; and
providing the question variant message to a generative large language model system configured to generate a resultant augmented question based on the source question and the one or more required output characteristics.

19. The method of claim 10, further comprising:
iteratively modifying the one or more augmented questions to generate additional sets of augmented questions with similar semantic meanings as that of a preceding set of augmented questions.

* * * * *